(12) United States Patent
Umeyama et al.

(10) Patent No.: US 10,889,449 B2
(45) Date of Patent: Jan. 12, 2021

(54) TRANSPORT SYSTEM AND MANUFACTURING METHOD OF ARTICLE

(71) Applicant: CANON KABUSHIKI KAISHA, Tokyo (JP)

(72) Inventors: Manabu Umeyama, Yokohama (JP); Hidetada Narahara, Kawasaki (JP); Shinichiro Takahama, Matsudo (JP); Takeshi Yamamoto, Fujisawa (JP); Koji Tomoda, Komae (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 16/129,013

(22) Filed: Sep. 12, 2018

(65) Prior Publication Data
US 2019/0092578 A1 Mar. 28, 2019

(30) Foreign Application Priority Data

Sep. 25, 2017 (JP) .................. 2017-183583
Sep. 25, 2017 (JP) .................. 2017-183891
Nov. 30, 2017 (JP) .................. 2017-230990

(51) Int. Cl.
*B65G 43/08* (2006.01)
*B65G 1/02* (2006.01)
(Continued)

(52) U.S. Cl.
CPC .............. *B65G 43/08* (2013.01); *B23Q 7/16* (2013.01); *B60L 13/03* (2013.01); *B65G 1/02* (2013.01);
(Continued)

(58) Field of Classification Search
CPC .......... B65G 43/08; B65G 1/02; B65G 54/02; G05B 19/4189; B23Q 7/16; B60L 13/03; H02K 41/00
(Continued)

(56) References Cited

U.S. PATENT DOCUMENTS 4,800,818 A    1/1989 Kawaguchi
6,876,896 B1 * 4/2005 Ortiz .................. B29C 66/4322
                                                                700/112
(Continued)

FOREIGN PATENT DOCUMENTS

CN    103931091    7/2014
CN    104411608    3/2015
(Continued)

OTHER PUBLICATIONS

U.S. Appl. No. 15/979,341, filed May 14, 2018 Inventors: Takeshi Yamamoto Title: Transport System, Processing System, and Control Method of Transport System.
(Continued)

*Primary Examiner* — Michael Collins
(74) *Attorney, Agent, or Firm* — Venable LLP

(57) ABSTRACT

An embodiment includes a plurality of transport modules forming a transport path on which a carriage that transports a workpiece travels, and a control unit that controls a position of the carriage on the plurality of transport modules based on a drive instruction, and the control unit corrects the drive instruction during carriage motion that is based on the drive instruction and stops the carriage.

19 Claims, 45 Drawing Sheets

(51) Int. Cl.
  *B23Q 7/16* (2006.01)
  *G05B 19/418* (2006.01)
  *B60L 13/03* (2006.01)
  *B65G 54/02* (2006.01)
  *H02K 41/00* (2006.01)

(52) U.S. Cl.
  CPC ......... *B65G 54/02* (2013.01); *G05B 19/4189* (2013.01); *H02K 41/00* (2013.01)

(58) Field of Classification Search
  USPC .................................................. 700/213–230
  See application file for complete search history.

(56) References Cited

U.S. PATENT DOCUMENTS

| | | | |
|---|---|---|---|
| 7,649,655 B2* | 1/2010 | Hori | B61B 3/02 |
| | | | 358/497 |
| 8,996,161 B2* | 3/2015 | Wernersbach | B61L 27/04 |
| | | | 700/230 |
| 9,363,936 B2* | 6/2016 | Kodama | H05K 13/08 |
| 9,365,354 B2 | 6/2016 | Takagi | B65G 25/04 |
| 9,621,097 B2 | 4/2017 | Takagi | H02P 25/06 |
| 10,364,103 B2* | 7/2019 | Tsai | B65G 43/00 |
| 10,511,247 B2* | 12/2019 | Mukai | H02P 6/006 |
| 10,625,948 B2* | 4/2020 | Fujii | B65G 35/06 |
| 2006/0220478 A1 | 10/2006 | Emoto | |
| 2013/0229134 A1* | 9/2013 | Sato | H02P 25/06 |
| | | | 318/135 |
| 2013/0297071 A1* | 11/2013 | Hediger | B25J 9/1674 |
| | | | 700/258 |
| 2014/0257554 A1* | 9/2014 | Takagi | H02K 11/21 |
| | | | 700/229 |
| 2015/0203135 A1* | 7/2015 | Wernersbach | B61L 27/04 |
| | | | 700/230 |
| 2015/0303841 A1* | 10/2015 | Suzuki | H02P 25/06 |
| | | | 318/38 |
| 2016/0355350 A1* | 12/2016 | Yamamoto | G05B 19/4189 |
| 2017/0008709 A1* | 1/2017 | Tomoda | B65G 54/02 |
| 2017/0117829 A1* | 4/2017 | Yamamoto | H02K 41/031 |
| 2019/0062066 A1* | 2/2019 | Tsai | B65G 43/00 |
| 2019/0092578 A1* | 3/2019 | Umeyama | H02K 41/00 |
| 2019/0131860 A1* | 5/2019 | Suzuki | H02K 41/031 |
| 2019/0329987 A1* | 10/2019 | Meschenmoser | B65G 37/02 |

FOREIGN PATENT DOCUMENTS

| | | |
|---|---|---|
| CN | 105142969 | 12/2015 |
| EP | 0452375 | 12/1992 |
| JP | S55-089132 | 7/1980 |
| JP | S56-108625 | 8/1981 |
| JP | H02-246705 | 10/1990 |
| JP | 7-299704 | 11/1995 |
| JP | 3249620 | 1/2002 |
| JP | 2009-220955 | 10/2009 |
| JP | 2013-102562 | 5/2013 |
| JP | 5753060 | 7/2015 |
| JP | 5912426 | 4/2016 |

OTHER PUBLICATIONS

U.S. Appl. No. 16/134,549, filed Sep. 18, 2018 Inventors: Nobuaki Fujii; Takeshi Yamamoto Title: Conveyance Apparatus, Conveyance System, and Method of Controlling Conveyance System.
U.S. Appl. No. 16/134,563, filed Sep. 18, 2018 Inventors: Hirohisa Ota; Takeshi Yamamoto; Satoru Deguchi; Takashi Shigemori; Kichinosuke Hirokawa; Ryota Okazaki Title: Transport System and Processing System.
U.S. Appl. No. 15/979,341, filed May 14, 2018.
U.S. Appl. No. 16/134,549, filed Sep. 18, 2018.
U.S. Appl. No. 16/134,563, filed Sep. 18, 2018.
Japanese Office Action dated Oct. 23, 2019 during prosecution of related Japanese application No. 2018-208399. (English-language machine translation included.).
Chinese Office Action dated Jul. 9, 2020 during prosecution of related Chinese application No. 201811114840.5. (whole English-language translation included.).

* cited by examiner

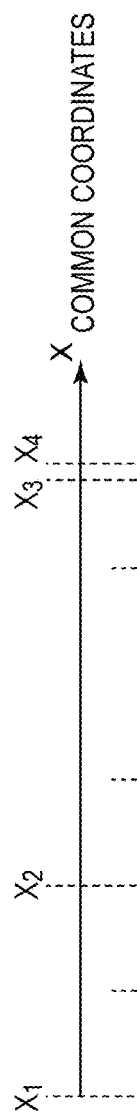
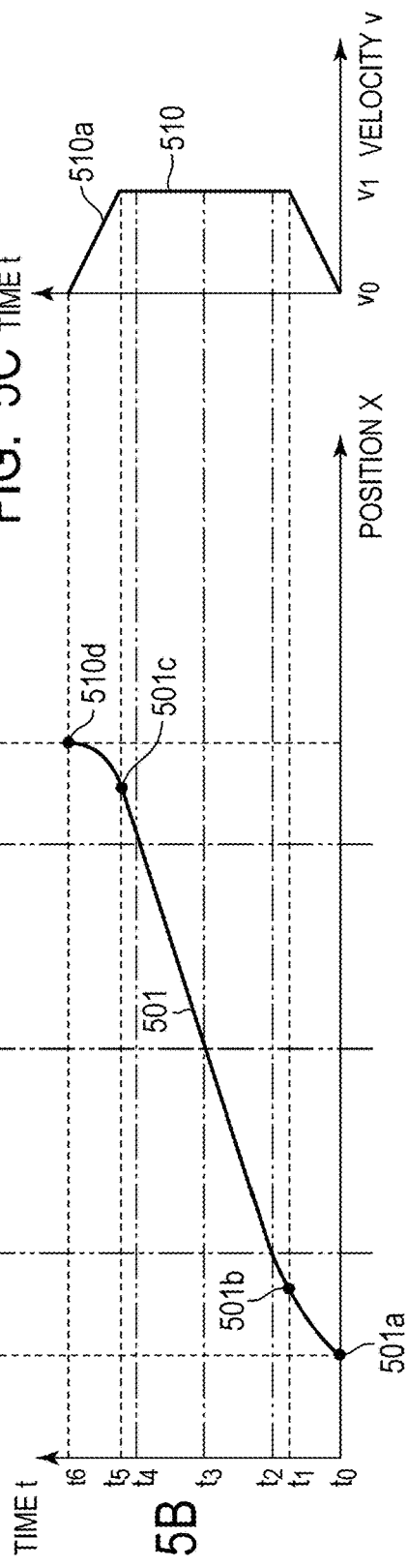

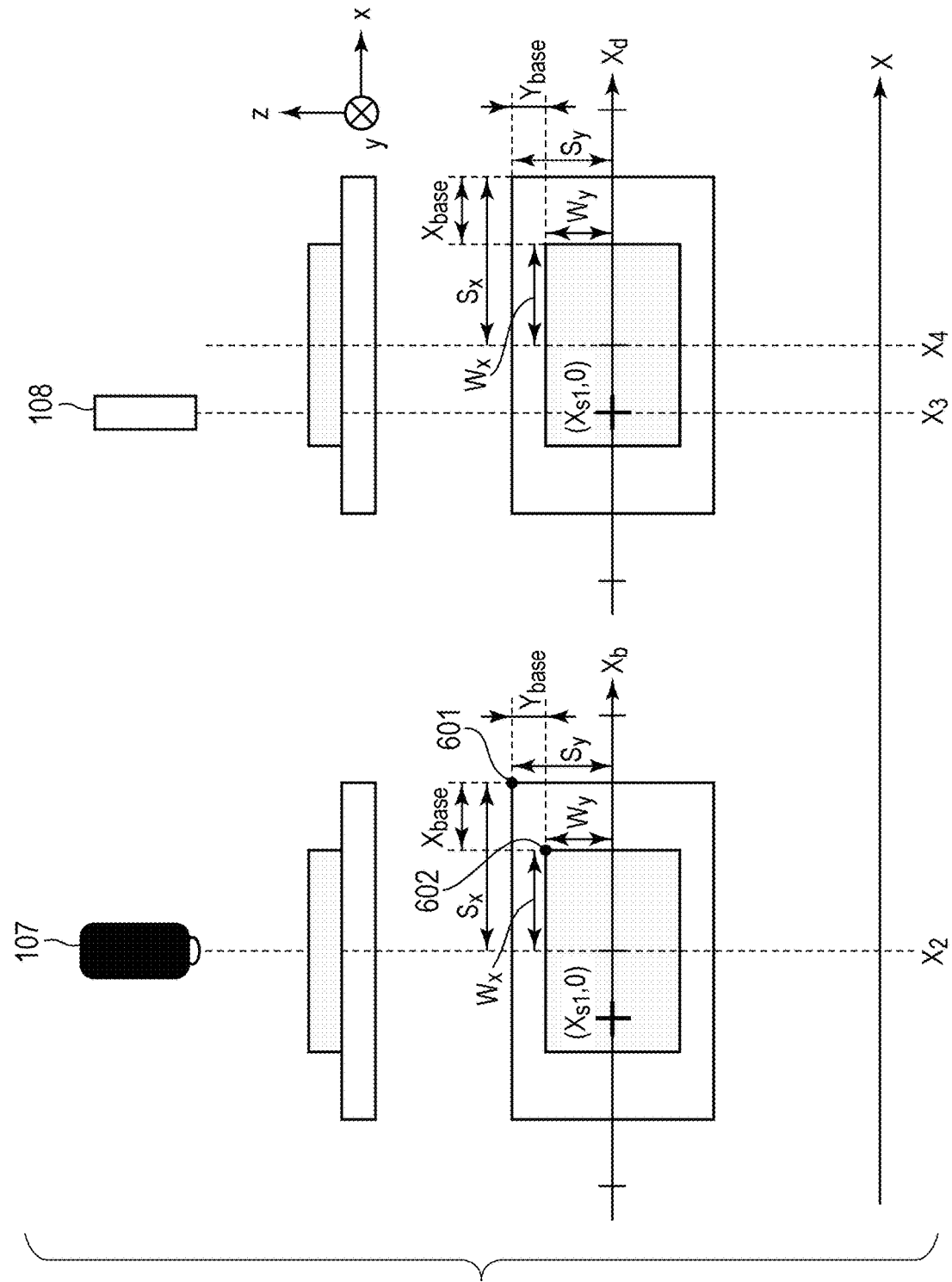

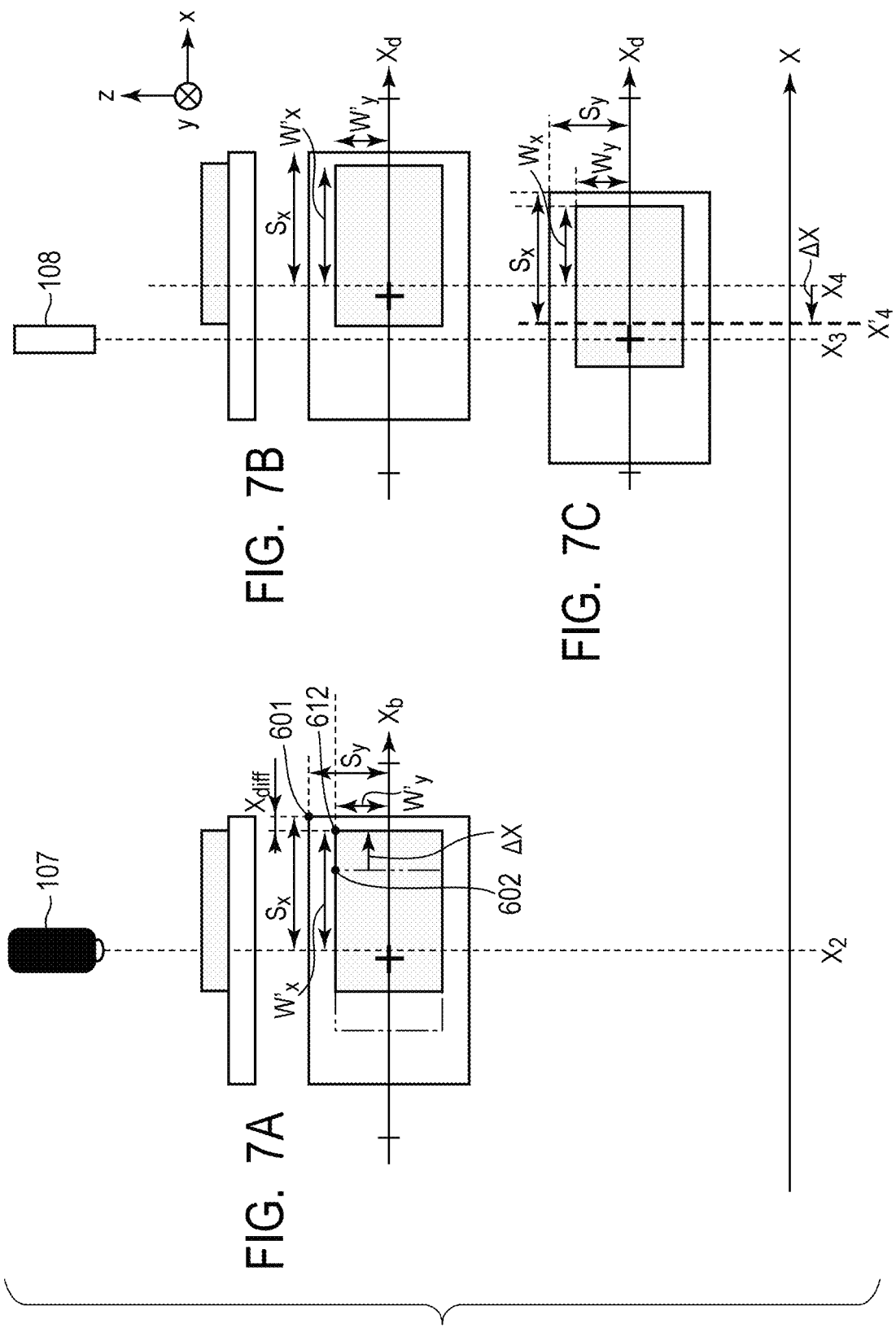

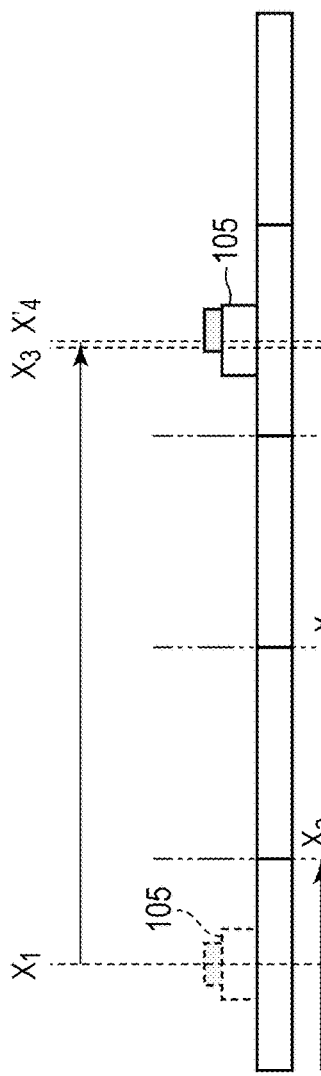
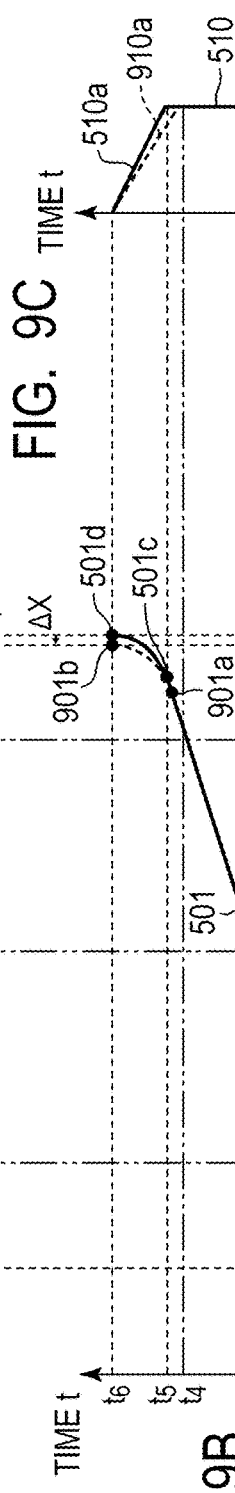
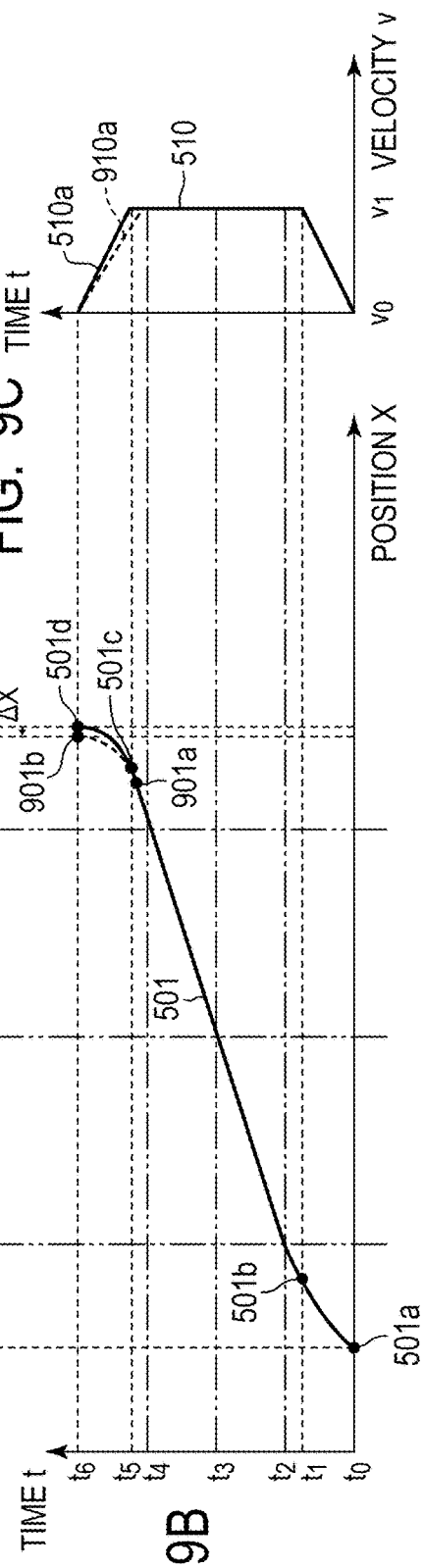

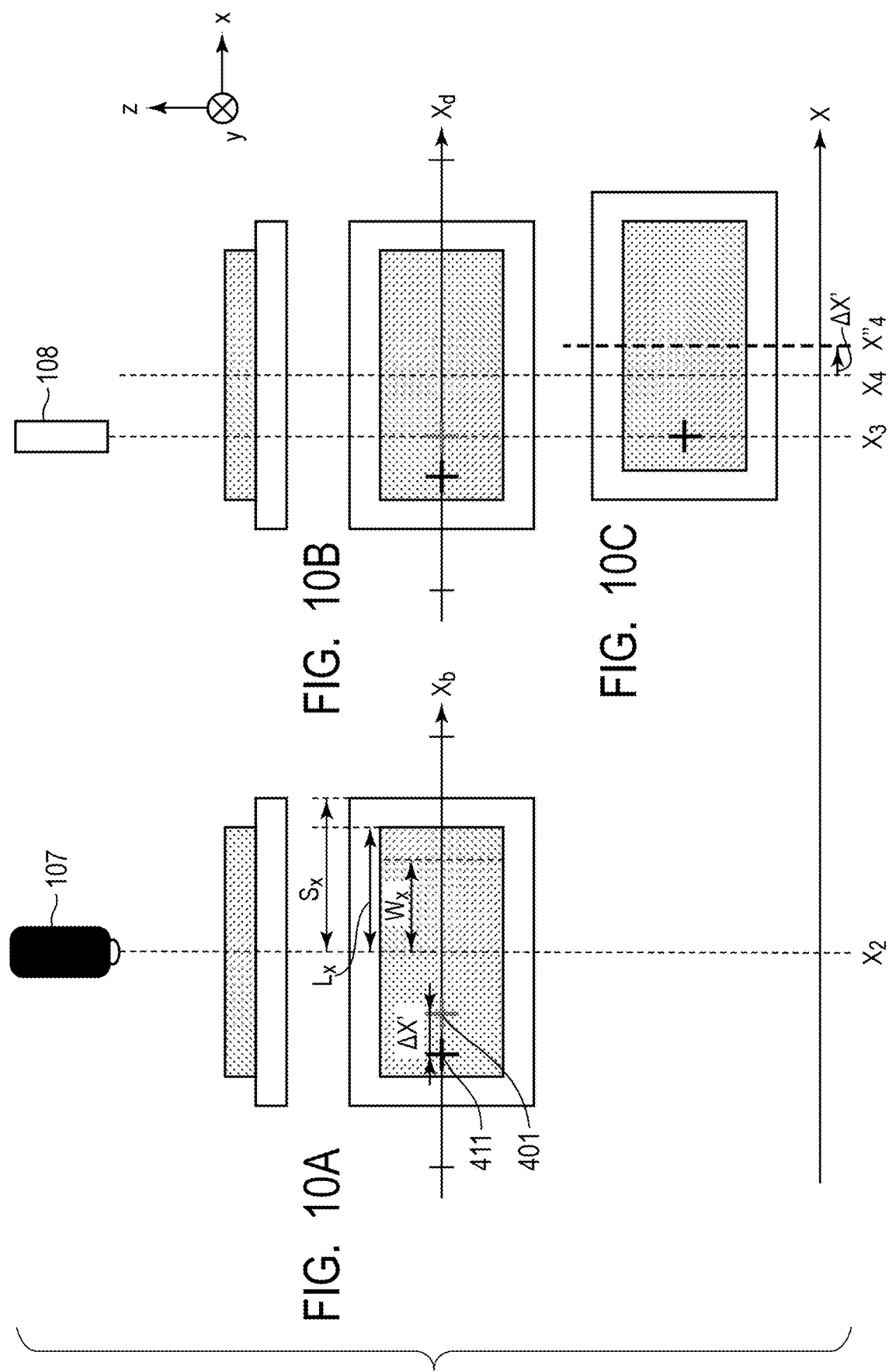

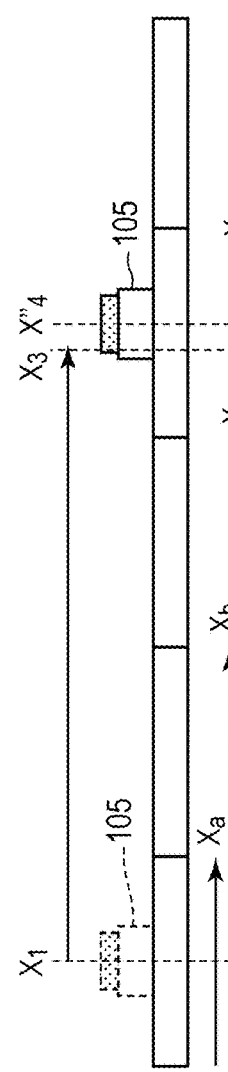
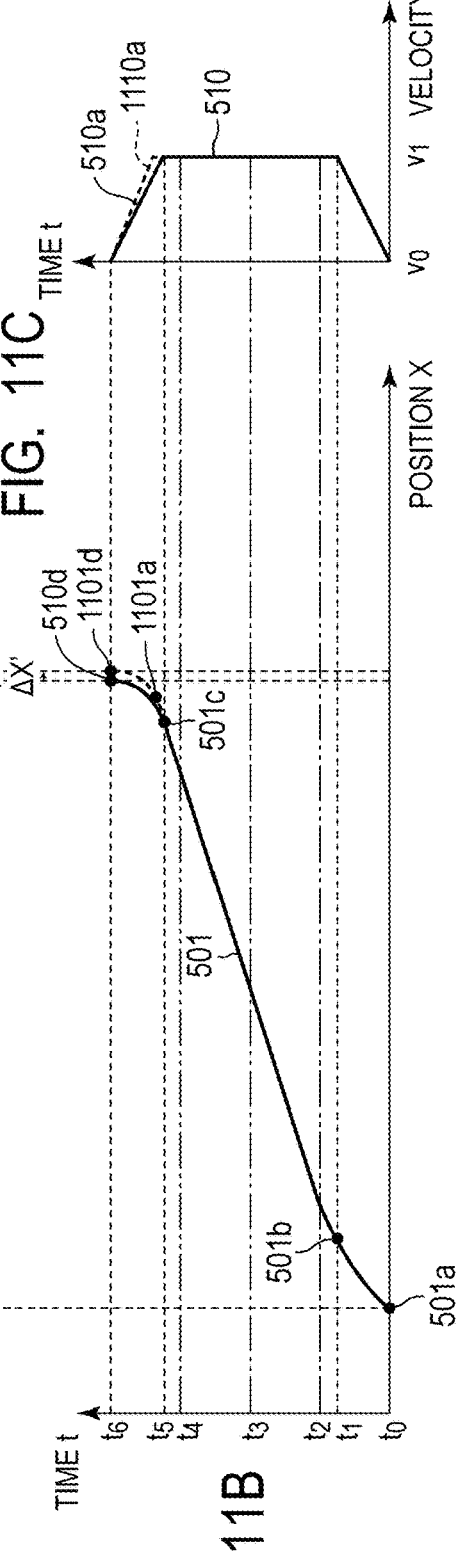

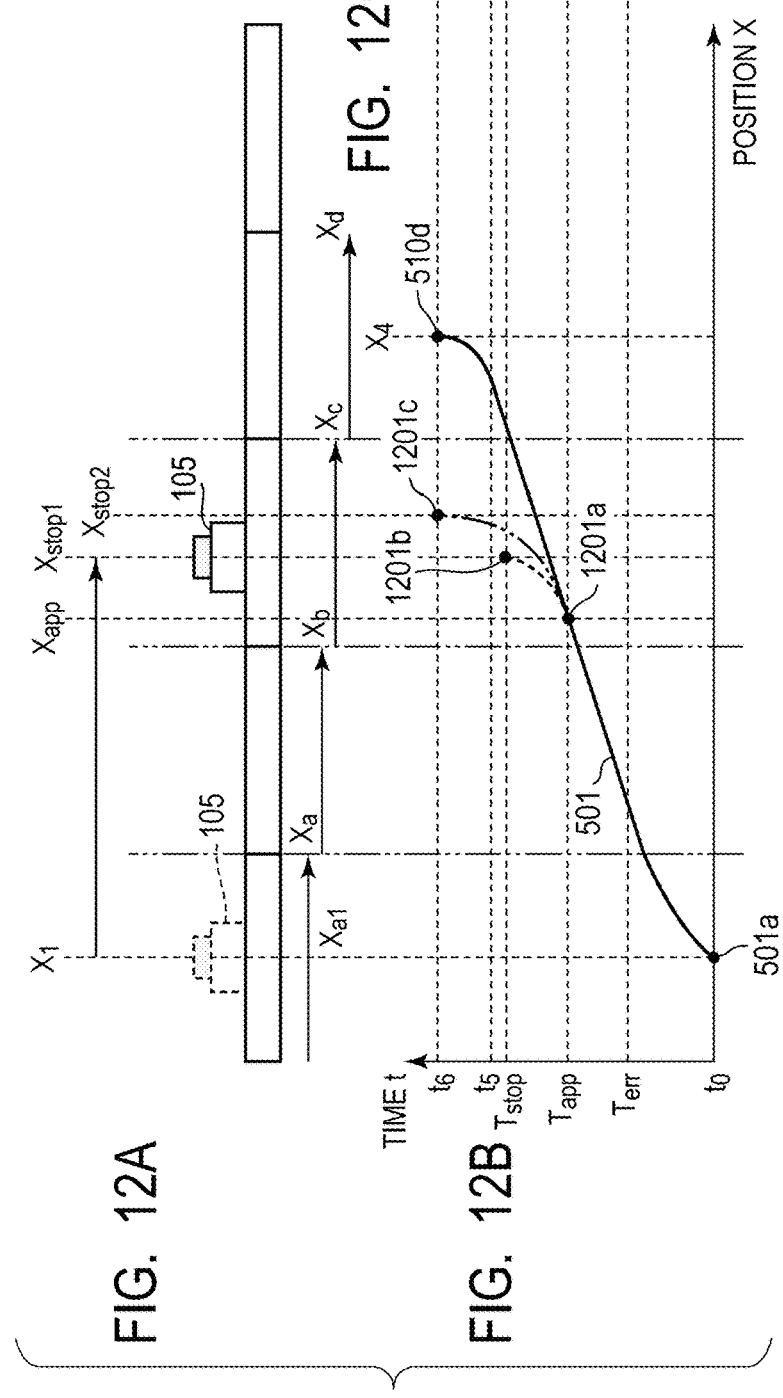

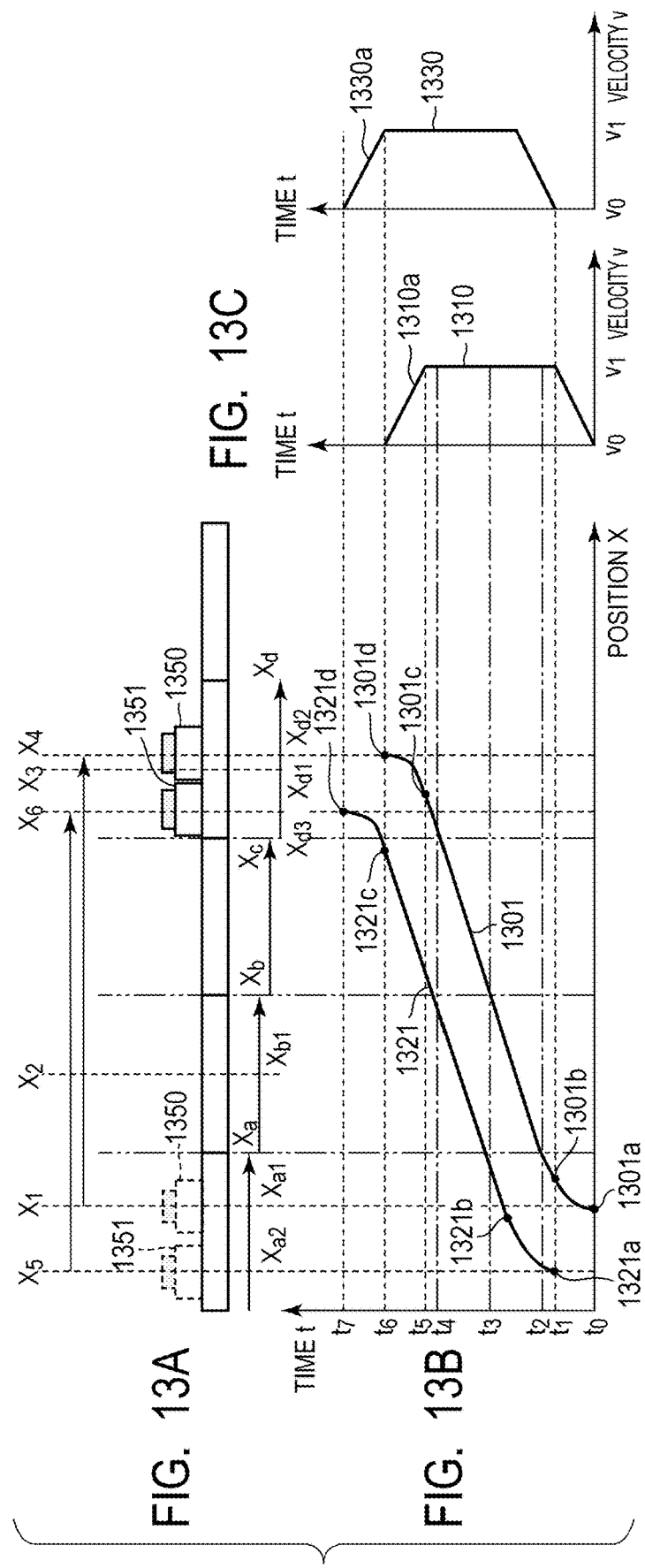

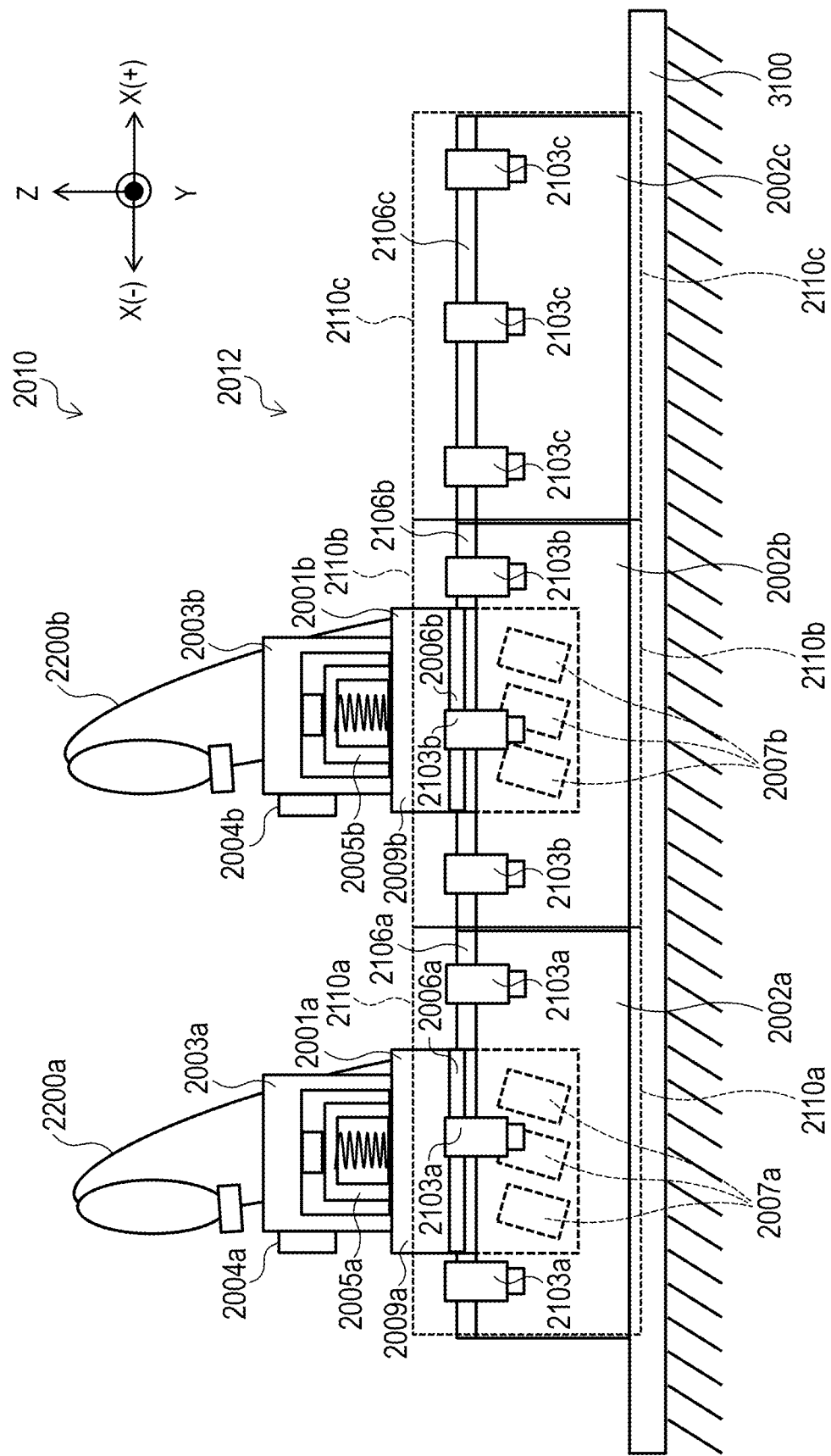

FIG. 25

| CARRIAGE ID | WORKPIECE TYPE | STOP REFERENCE POSITION [μm] | | |
|---|---|---|---|---|
| | | Tf1 | Tf2 | Tf3 |
| 1a | q | +5 | +12 | +8 |
| | v | +8 | +6 | +10 |
| 1b | q | +2 | -6 | 0 |
| | v | -4 | -10 | -3 |
| 1c | q | -1 | +5 | -6 |
| | v | 0 | +3 | -4 |

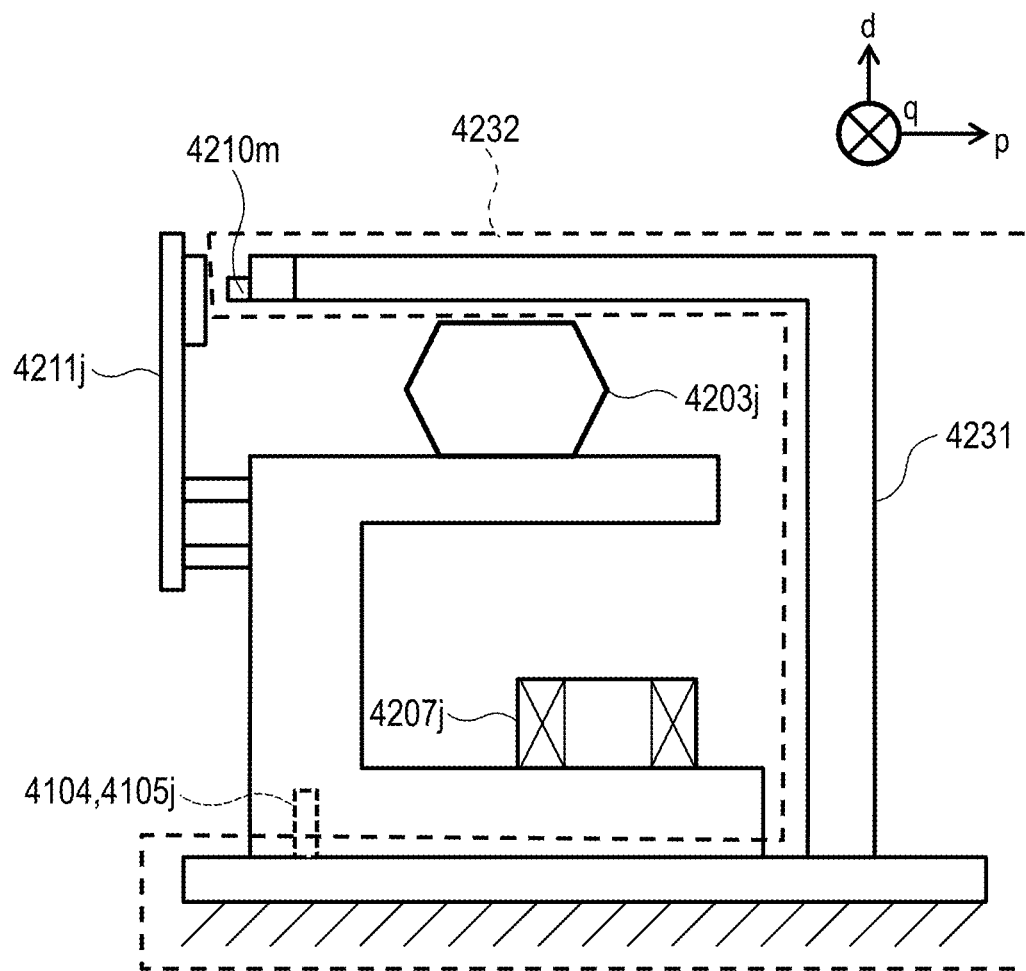

TRANSPORT SYSTEM AND MANUFACTURING METHOD OF ARTICLE

BACKGROUND OF THE INVENTION

Field of the Invention

The present invention relates to a carriage transport system and a manufacturing method of an article that can change a stop position of a carriage by changing a drive instruction during driving of a carriage.

Description of the Related Art

In recent years, as a component transport system used in a production line of industry products, there is a transport system in which a transport line is divided into a plurality of control zones, control devices are arranged for each control zone, and carriages are caused to travel between the control zones.

In general, such a transport system described above is formed of a plurality of lower-level control units that control respective control zones and a higher-level control unit connected to a communication system coupled to the plurality of lower-level control units.

In a transport system of Japanese Patent Application Laid-Open No. 2013-102562, position correction data for correcting a motion error specific to a transport carriage is pre-stored in each transport carriage. Japanese Patent Application Laid-Open No. 2013-102562 discloses an art in which a reading unit then reads the position correction data and thereby each motor control device uses the position correction data to control current conduction of electromagnets between serving sections.

In the art disclosed in Japanese Patent Application Laid-Open No. 2013-102562, however, since motion error correction is performed on each carriage, a problem of difficulty in stopping a carriage at a desired target position arises when there is an error in the position where a transport object is placed on the carriage. Moreover, a problem of difficulty in changing the stop position of the carriage arises when it is necessary to transfer different transport objects by using the same carriage and change position correction data in accordance with the type of transport objects.

SUMMARY OF THE INVENTION

In order to solve the problem described above, a transport system according to one aspect of the present invention includes: a plurality of transport modules forming a transport path on which a carriage that transports a workpiece travels; and a control unit that controls a position of the carriage on the plurality of transport modules based on a drive instruction, and the control unit corrects the drive instruction during carriage motion that is based on the drive instruction and stops the carriage.

Further, a transport system according to another aspect of the present invention includes: a transport path formed of a plurality of transport modules; a carriage moving on the transport path; a first lower-level control unit that is provided to one of the lower-level control units provided to the plurality of transport modules, respectively, and drives the carriage by a first drive instruction; and a higher-level control unit that controls the lower-level control units provided to the transport modules, respectively, and the first lower-level control unit switches the first drive instruction to a second drive instruction during the carriage motion using the first drive instruction and stops the carriage.

A manufacturing method of an article according to yet another aspect of the present invention performs processing on a workpiece transported to a carriage moving based on a drive instruction to manufacture an article, and the manufacturing method includes: correcting the drive instruction during carriage motion that is based on the drive instruction to stop the carriage and performing processing on the workpiece.

A transport system according to still another aspect of the present invention includes: a transport module forming a transport path on which a plurality of carriages that transport workpieces travel; a control unit that controls a position of the carriage on the transport module; and a storage unit that, for the carriages, stores a plurality of motion errors relative to respective particular positions of the workpieces, and the control unit controls a position of each of the carriages based on a motion error selected from the plurality of motion errors.

A manufacturing method of an article according to still another aspect of the present invention performs processing on workpieces transported to a plurality of carriages, respectively, on a transport module controlled by a control unit to manufacture an article, and the manufacturing method includes: for the plurality of carriages, the control unit storing a plurality of motion errors relative to particular positions of the workpieces, and based on a motion error selected from the plurality of motion errors, stopping a carriage and performing processing on the workpiece.

According to the present invention, even when the position of a transport object on a carriage is shifted, it is possible to stop the transport object at a target position with high accuracy.

Further features of the present invention will become apparent from the following description of exemplary embodiments with reference to the attached drawings.

BRIEF DESCRIPTION OF THE DRAWINGS

FIG. 5A is a schematic diagram illustrating a transport profile and a velocity profile of the carriage and a moving state of the carriage according to the first embodiment of the present invention.

FIG. 5B is a schematic diagram illustrating the transport profile and the velocity profile of the carriage and the moving state of the carriage according to the first embodiment of the present invention.

FIG. 5C is a schematic diagram illustrating the transport profile and the velocity profile of the carriage and the moving state of the carriage according to the first embodiment of the present invention.

FIG. 6A is a schematic diagram illustrating an image capturing position and a drilling position during transportation of a transport object and a carriage stop position according to the first embodiment of the present invention.

FIG. 6B is a schematic diagram illustrating the image capturing position and the drilling position during transportation of the transport object and the carriage stop position according to the first embodiment of the present invention.

FIG. 7A is a schematic diagram illustrating a relationship of the image capturing position and the processing positon relative to the transport object and the carriage stop position when a profile change is needed according to the first embodiment of the present invention.

FIG. 7B is a schematic diagram illustrating the relationship of the image capturing position and the processing positon relative to the transport object and the carriage stop position when a profile change is needed according to the first embodiment of the present invention.

FIG. 7C is a schematic diagram illustrating the relationship of the image capturing position and the processing positon relative to the transport object and the carriage stop position when a profile change is needed according to the first embodiment of the present invention.

FIG. 9A is a schematic diagram illustrating a result of change of the transport profile and the velocity profile according to the first embodiment of the present invention.

FIG. 9B is a schematic diagram illustrating the result of change of the transport profile and the velocity profile according to the first embodiment of the present invention.

FIG. 9C is a schematic diagram illustrating the result of change of the transport profile and the velocity profile according to the first embodiment of the present invention.

FIG. 10A is a schematic diagram illustrating another example of a relationship of the image capturing position and the processing positon relative to the transport object and the carriage stop position when a profile change is needed according to the first embodiment of the present invention.

FIG. 10B is a schematic diagram illustrating another example of the relationship of the image capturing position and the processing positon relative to the transport object and the carriage stop position when a profile change is needed according to the first embodiment of the present invention.

FIG. 10C is a schematic diagram illustrating another example of the relationship of the image capturing position and the processing positon relative to the transport object and the carriage stop position when a profile change is needed according to the first embodiment of the present invention.

FIG. 11A is a schematic diagram illustrating another example of a result of change of the transport profile and the velocity profile according to the first embodiment of the present invention.

FIG. 11B is a schematic diagram illustrating another example of the result of change of the transport profile and the velocity profile according to the first embodiment of the present invention.

FIG. 11C is a schematic diagram illustrating another example of the result of change of the transport profile and the velocity profile according to the first embodiment of the present invention.

FIG. 12A is a schematic diagram illustrating another example of a result of change of the transport profile and the velocity profile according to the first embodiment of the present invention.

FIG. 12B is a schematic diagram illustrating another example of the result of change of the transport profile and the velocity profile according to the first embodiment of the present invention.

FIG. 12C is a schematic diagram illustrating another example of the result of change of the transport profile and the velocity profile according to the first embodiment of the present invention.

FIG. 13A is a schematic diagram illustrating a transport profile and a velocity profile of a carriage and a moving state of the carriage according to a second embodiment of the present invention.

FIG. 13B is a schematic diagram illustrating the transport profile and the velocity profile of the carriage and the moving state of the carriage according to the second embodiment of the present invention.

FIG. 13C is a schematic diagram illustrating the transport profile and the velocity profile of the carriage and the moving state of the carriage according to the second embodiment of the present invention.

FIG. 18B is a schematic diagram illustrating a configuration of the processing system including the transport system according to the fourth embodiment of the present invention.

FIG. 25 is a schematic diagram illustrating an example of a motion error used for calculation of a target stop position in the transport system according to the fourth embodiment of the present invention.

FIG. 29B is a schematic diagram illustrating a state of measuring the carriage movement error specific to the transport module using a measuring jig according to the fifth embodiment of the present invention.

DESCRIPTION OF THE EMBODIMENTS

Preferred embodiments of the present invention will now be described in detail in accordance with the accompanying drawings.

First Embodiment

A carriage transport system and a control method of the carriage transport system according to a first embodiment of the present invention will be described below by using FIG. 1 and FIG. 2.

Figure 1:
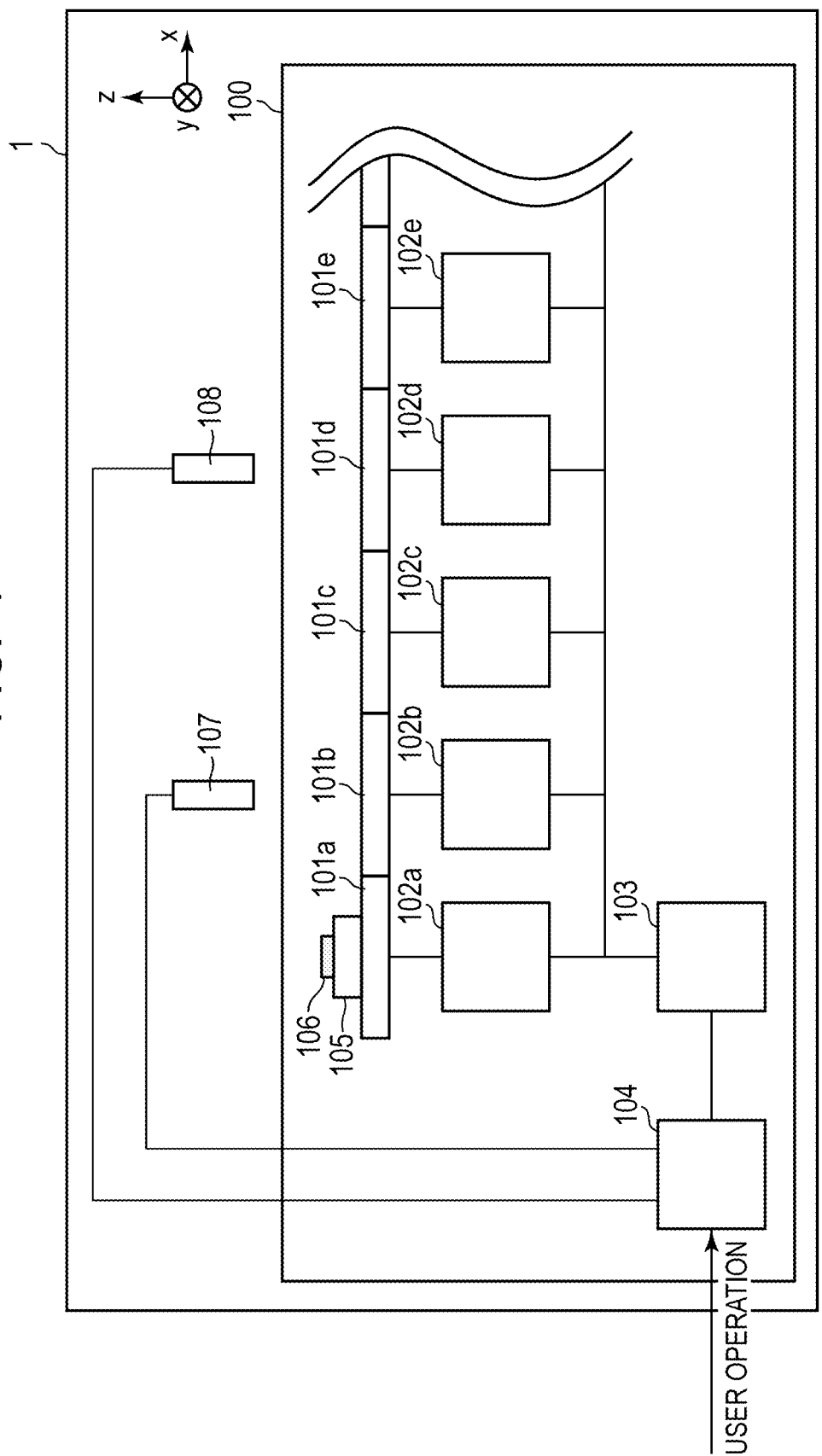
FIG. 1 is a block diagram illustrating a general configuration of a processing system having a carriage transport system according to a first embodiment of the present invention.

FIG. 1 is a block diagram illustrating a general configuration of a processing system 1 having a carriage transport system 100 according to the present embodiment. FIG. 2 is a diagram illustrating an extracted part of the carriage transport system 100 and illustrates a general configuration of a transport module 101a, a lower-level control unit 102a that controls the transport module 101a, and a higher-level control unit 103 according to the present embodiment.

In the processing system 1 illustrated in FIG. 1, an imaging device 107 and a processing machine 108 are installed with a predetermined spacing, processing is performed on a transport object 106 transported by the carriage transport system 100. While the processing machine 108 according to the present embodiment is illustrated as a boring machine that drills and processes the transport object 106 as an example, without being limited thereto, it may be any machine such as a processing machine that performs processing on the transport object 106.

The carriage transport system 100 is formed of a plurality of transport modules 101, lower-level control units 102, the higher-level control unit 103, a process controller 104, and a carriage 105 on which the transport object 106 is mounted. For simplified illustration here, the carriage transport system 100 illustrated in FIG. 1 will be described by extracting five transport modules 101a to 101e, five lower-level control units 102a to 102e, and one carriage 105, however, the number of transport modules 101, the number of lower-level control units 102, and the number of carriages 105 are not limited thereto. Further, the lower-level control units 102, the higher-level control unit 103, and the process controller 104 may be of a single control unit.

The present embodiment will be described in the definition that a direction parallel to the transport direction of the carriage 105 is defined as an X-axis, a direction perpendicular to a frame on which the transport module 101 is placed is defined as a Z-axis, and an axis orthogonal to the X-axis and the Z-axis is a Y-axis.

The transport modules 101a to 101e are modules connected to each other on a frame 207 to form a transport path, and the carriage 105 moves along the transport modules 101a to 101e. The detailed configuration of the transport modules 101a to 101e will be described later.

The lower-level control units 102a to 102e are communicably connected to the higher-level control unit 103 via a network. Further, a drive instruction acquired from the higher-level control unit 103 is stored in memory 215. The transport modules 101a to 101e to be connected are then controlled based on the acquired drive instruction, and drive control is performed on the carriage 105 on the transport modules 101a to 101e.

The higher-level control unit 103 outputs a drive instruction to the lower-level control units 102a to 102e.

The process controller 104 controls the higher-level control unit 103, the imaging device 107, and the processing machine 108. An index position of the transport object on the carriage is detected from a detection result acquired from the imaging device (that may be referred to as a state detection unit) 107 (for example, a captured image), the index position to a reference position of a carriage is output to the higher-level control unit 103. That is, a difference between the reference position of a carriage calculated from a captured image from the imaging device and the index position of a transport object or a difference of a difference between the reference position of a carriage and the index position of a transport object from a reference value is output to the control unit.

The carriage 105 moves along the transport modules 101a to 101e in response to receiving motive power from the transport modules 101a to 101e.

The transport object 106 is moved along the transport modules 101a to 101e while being held by a transport article holding mechanism 206 of the carriage 105.

The imaging device 107 captures an image of the transport object 106 on the carriage 105. It is preferable that the angle of view be set so as to be able to capture the entire transport object. Further, a sensor (not illustrated) is arranged at a predetermined position in the carriage 105, and a value indicating that the carriage has passed is output to the process controller 104 by the sensor. The process controller 104 is set to acquire the output sensor value and output an instruction to start capturing to the imaging device. The timing of capturing is synchronized with that for the position of the carriage 105 via the process controller 104 in such a way. The captured image is output to the process controller 104.

Note that the embodiment is not limited to the above method as long as the position of the transport object can be measured at a timing when the carriage 105 is located in a particular position. For example, such a method that verifies the shape of a transport object with distance data obtained from the distance sensor (not illustrated) and measures the position at the timing when the carriage 105 reaches a particular position may be employed.

The processing machine 108 that is a drilling machine drills the transport object 106 transported by the carriage based on the drive information (instruction from the process controller 104) acquired from the process controller 104 and manufactures an article. In the carriage transport system 100 according to the present embodiment, an example in which an index position arranged on the transport object 106 is a processing position will be illustrated. That is, an index of the transport object 106 is provided at a position to be drilled by the processing machine 108, and the lower-level control unit 102 controls the transport module 101 so that the carriage 105 is located at the index position, namely, the position to be drilled by the processing machine 108. While an example in which the index position is the processing position is described in the present embodiment, the processing position may be calculated from the index position, and the calculated processing position may be drilled.

Figure 2:
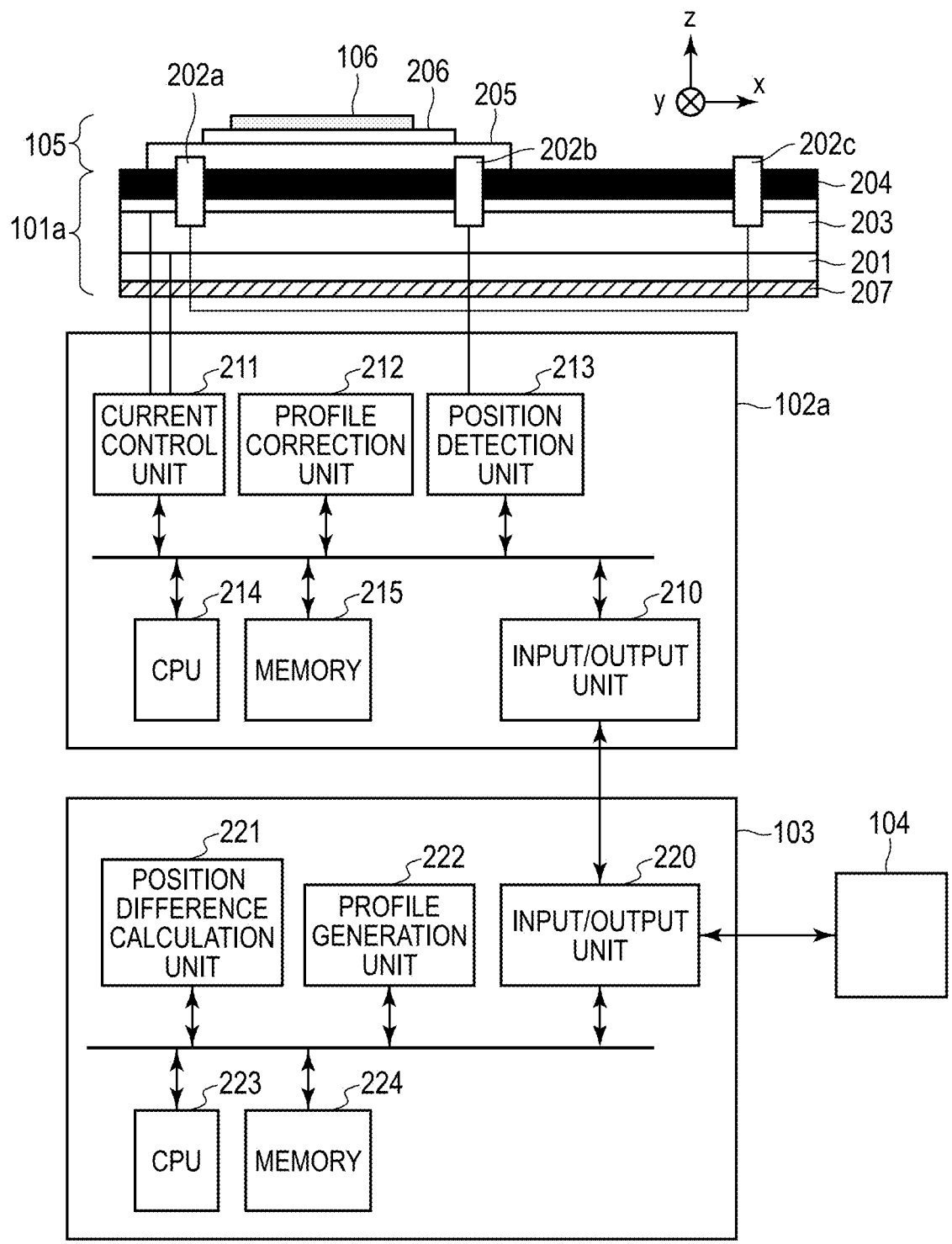
FIG. 2 is a block diagram illustrating a general configuration of a transport module and a lower-level control unit and a higher-level control unit that controls the transport module according to the first embodiment of the present invention.

FIG. 2 illustrates a schematic diagram of the transport module 101a, the lower-level control unit 102a that controls the transport module 101a, and the higher-level control unit 103 according to the present embodiment.

The transport module 101 has encoders 202a to 202c, a group of coils 203, a guiderail 204, and a frame 207 attached to a module casing 201 and is connected to the lower-level control units 102.

The encoders 202 are attached to the module casing 201 so as to have a constant gap with a scale 301 of the carriage 105 and are communicably connected to the lower-level control units 102. Here, the encoders 202 are attached at an interval so as to be able to detect the carriage 105 located at any position on the transport module 101.

Further, each of the encoders 202 reads the pattern of the scale 301 and thereby detects the position in the X-direction (position X) of the carriage 105 as a relative position from the encoder 202 and outputs position information on the carriage 105 to the lower-level control units 102. Further, each lower-level control unit 102 communicates information with the higher-level control unit 103 via a network and transmits the position information on the carriage 105 from the encoder 202 or the like to the higher-level control unit 103.

In the present embodiment, the position of the center coordinates of the carriage 105 is here assumed as position information on the carriage 105.

Further, the number and the attachment position of the encoders may be changed as appropriate in accordance with a carriage length, a transport module length, position detection accuracy of the carriage, or the like.

The lower-level control unit 102a is formed of an input/output unit 210, a current control unit 211, a profile correction unit (also referred to as drive instruction correction unit) 212, a position detection unit 213, a central processing unit (CPU) 214, and the memory 215.

The input/output unit 210 acquires a control instruction for the carriage 105 from the higher-level control unit 103. Further, a process result from each function unit of the lower-level control unit 102 is output to the high-level control unit 103.

The current control unit 211 is connected to a power source (not illustrated), controls a current amount applied to the group of coils 203 of the serving transport module 101, and adjusts electromagnetic force generated between permanent magnets 303 and the group of coils 203. This enables the lower-level control unit 102 to transport the carriage 105 at a predetermined velocity to be stopped at a predetermined position.

The profile correction unit 212 corrects a transport profile so that the index is located at the position to be drilled by the processing machine 108. The profile correction unit 212 will be described later in detail.

The position detection unit 213 calculates the position of the carriage 105 on the serving transport module 101 from the output from the encoder 202 of the serving transport module 101 and the position of the encoder 202.

The CPU 214 controls each function unit included in the lower-level control unit 102. Specifically, a program stored in the memory 215 is expanded to the work memory (not illustrated) such as a random access memory (RAM) and executed by the CPU 214, and thereby each function unit described above is controlled. Note that, while being implemented by a dedicated circuit in the present embodiment, each function unit described above may be implemented as an operation of the CPU 214. In this case, the program stored in the memory 215 includes the function of each function unit described above.

The memory 215 stores a control parameter used in each function unit of the lower-level control unit 102 or a control program of the lower-level control unit 102 executed by the CPU 214.

The higher-level control unit 103 is formed of an input/output unit 220, a position difference calculation unit 221, a profile generation unit (also referred to as a drive instruction setting unit) 222, a CPU 223, and memory 224.

The input/output unit 220 outputs a transport profile that is a drive instruction for the carriage 105 to the lower-level control unit 102. Further, an image captured by the imaging device 107 is acquired from the process controller 104.

The position difference calculation unit 221 calculates a position shift of the transport object 106 from a difference between an index position of an image captured by the imaging device 107 acquired from the process controller 104 and a reference position of an index pre-stored in the memory 224.

The profile generation unit 222 generates drive instructions (transport profile) simultaneously transmitted at the same timing to all or some of the plurality of lower-level control units 102 acquired from the process controller 104. The profile generation unit 222 will be described later in detail.

The CPU 223 controls each function unit included in the higher-level control unit 103. The detailed operation is the same as that of the CPU 214.

The memory 224 stores a control parameter used in each function unit of the higher-level control unit 103 or the control program of the higher-level control unit 103 executed by the CPU 223.

Figure 3A:
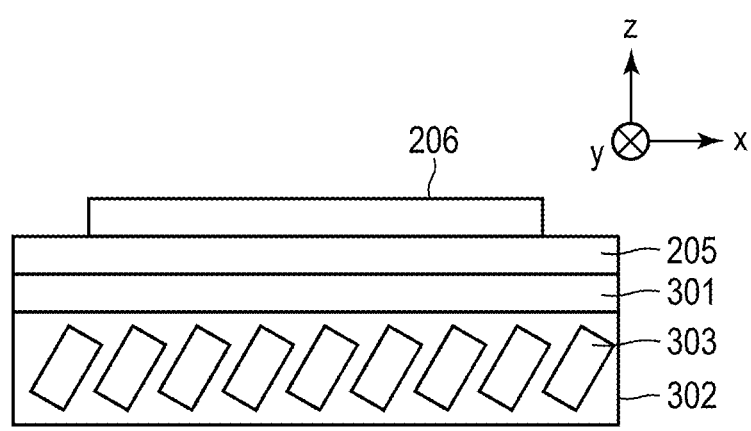
FIG. 3A is a schematic configuration diagram of a carriage according to the first embodiment of the present invention.
Figure 3B:
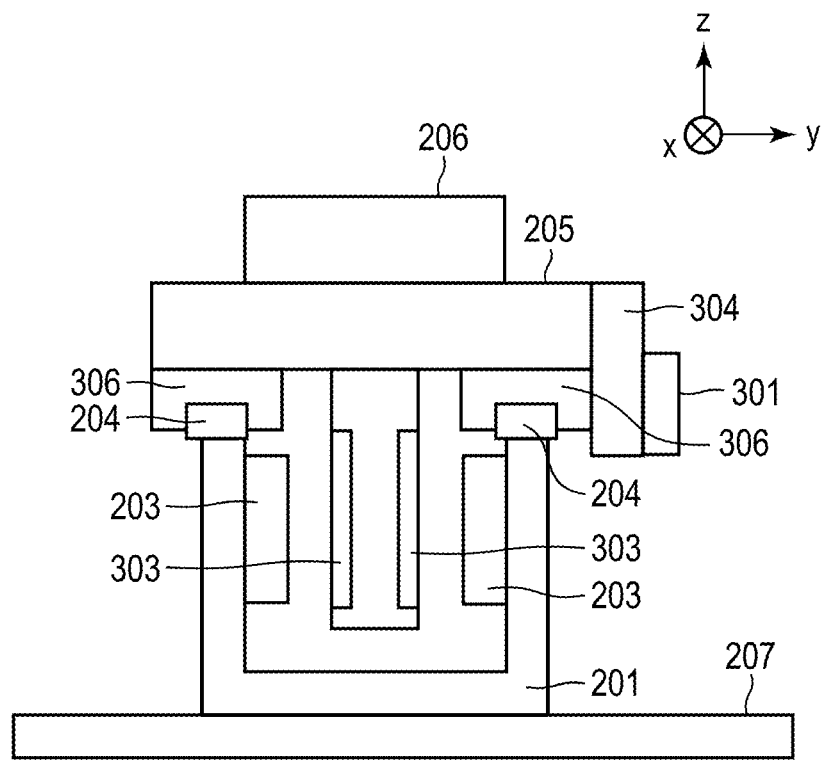
FIG. 3B is a schematic configuration diagram of the carriage according to the first embodiment of the present invention.

FIG. 3A and FIG. 3B illustrate the general configuration of the carriage 105. The carriage 105 has a top plate 205, the transport article holding mechanism 206, the scale 301, a permanent magnet bracket 302, a plurality of permanent magnets 303, a scale bracket 304, and a guide block 305.

The transport article holding mechanism 206, the permanent magnet bracket 302, the scale bracket 304, and the guide block 305 are attached to the top plate 205. The plurality of permanent magnets 303 are attached to both sides of the permanent magnet bracket 302. Note that the plurality of permanent magnet 303 may be attached to one side of the permanent magnet bracket 302. Further, the scale 301 is attached to the scale bracket 304, and the transport article holding mechanism 206 holds a transport object on the top plate 205.

Figure 4A:
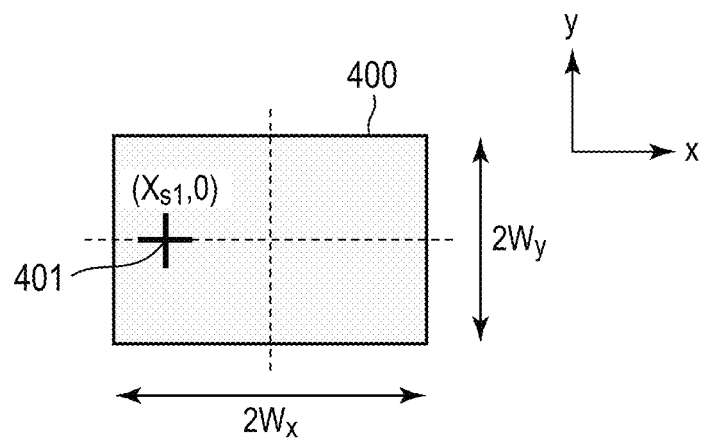
FIG. 4A is a schematic configuration diagram of a transport object according to the first embodiment of the present invention.
Figure 4B:
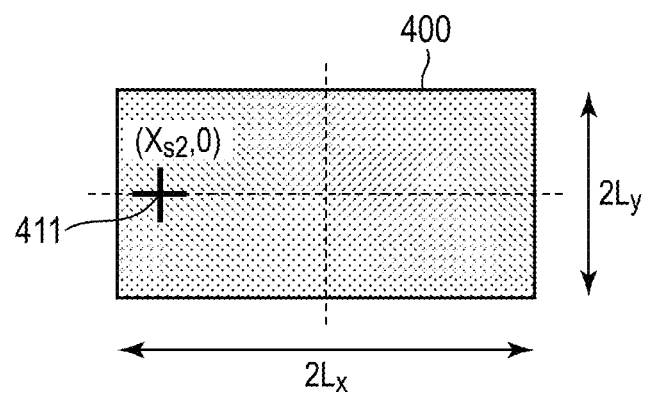
FIG. 4B is a schematic configuration diagram of the transport object according to the first embodiment of the present invention.

The carriage 105 is driven by electromagnetic force generated with respect to the group of coils 203 attached to the module casing 201 and transported along the transport path formed of the plurality of transport modules (X-axis). At this time, the guide block 305 of the carriage 105 moves along the guiderail 204 of the transport module 101. Note that, as illustrated in FIG. 6A and FIG. 6B described below, the carriage 105 has a size of $2S_X$ in the X-direction and $2S_Y$ in the Y-direction (hereafter, denoted as $2S_X \times 2S_Y$). FIG. 4A and FIG. 4B illustrate the general configuration of the transport object 106 in the present embodiment.

In the present embodiment, two types of transport objects are handled. The transport object 400 illustrated in FIG. 4A (hereafter, referred to as a transport object A) has a size of $2W_X \times 2W_Y$ and has an index 401 indicating a processing position. Note that, since the feature in the Z-direction is not a subject matter of the present embodiment, the description thereof will be omitted.

Further, when the center coordinates of the transport object A are (0, 0), the index 401 is located at $(X_{S1}, 0)$.

On the other hand, the transport object 410 illustrated in FIG. 4B (hereafter, referred to as a transport object B) has a size of $2L_X \times 2L_Y$, and has an index 411 indicating a processing position. When the center coordinates of the transport object B are (0, 0), the index 411 is located at $(X_{S2}, 0)$.

Next, a transport profile generation process when a relationship of the image capturing position, the processing position, and the carriage stop position is in a reference transport state will be described.

FIG. 5A is a general schematic diagram illustrating a motion of the carriage 105 from a position $X_1$ detected by the encoder 202b of the transport module 101a to a position $X_4$ detected by the encoder 202b of the transport module 101d. The imaging device 107 is installed at a position $X_2$, and the processing machine 108 is installed at a position $X_3$.

Here, the positions $X_1$, $X_2$, $X_3$, and $X_4$ are positions viewed in a single coordinate system common to the transport modules 101a to 101d (hereafter, referred to as common coordinates). Further, coordinates inside the transport modules 101a, 101b, 101c, and 101d (hereafter, referred to as module coordinates) are denoted as $X_a$, $X_b$, $X_c$, and $X_d$. Further, the origins of respective module coordinates are denoted as $X_a=0_a$, $X_b=0_b$, $X_c=0_c$, and $X_d=0_d$ that are center coordinates within the module coordinates.

Note that the encoders 202a to 202c of the transport module 101 are attached to the module casing 201 so as to have a constant gap to the scale 301 of the carriage 105. In the present embodiment, the encoders 202a to 202c are attached at positions and intervals so that the carriage 105 can be detected when the carriage 105 is located in any position on the transport module 101.

Here, the carriage motion starting position $X_1$ is located at a module coordinate $X_{a1}=0_a$, and the imaging device position (image capturing position) $X_2$ is located at a module coordinate $X_{b1}=0_b$. At this time, in a case of the reference transport state, the carriage stop position $X_4$ is located at a module coordinate $X_{d2}=0_d$, and the processing machine position (processing position) $X_3$ is located at a module coordinate $X_{d1}=-X_{S1}$. Note that a state where no correction of the stop position by a profile change is needed during carriage transportation is defined as a reference transport state.

FIG. 5B illustrates a transport profile 501 of the carriage 105 in which the horizontal axis represents X position of the carriage 105 and the vertical axis represents time t. The transport profile 501 is a profile for drive control performed by the plurality of lower-level control units 102a to 102d in which the carriage 105 starts moving from a stop state and then stops again.

First, the carriage 105 starts moving from a stop state at the time $t_0$, reaches the velocity $v_1$ (greater than $v_0$) at the time $t_1$, and then reaches the boundary between the two transport modules 101a and 101b at the time $t_2$.

After entering the transport module 101b at the time $t_2$, the carriage 105 reaches the boundary between the two transport modules 101b and 101c at the time $t_3$ while maintaining the velocity $v_1$.

After entering the transport module 101c at the time $t_3$, the carriage 105 reaches the boundary between the two transport modules 101c and 101d at the time $t_4$ while maintaining the velocity $v_1$.

Then, the carriage 105 enters the transport module 101d while maintaining the velocity $v_1$, starts deceleration at the time $t_5$, and stops at the position $X_4$ at the time $t_6$.

Note that the points 501a to 501d in FIG. 5B indicate the positions X on the transport path of the carriage 105 at the times $t_0$, $t_1$, $t_5$, and $t_6$, respectively.

FIG. 5C illustrates a velocity profile 510 of the carriage 105 in which the horizontal axis represents velocity v of the carriage 105 and the vertical axis represents time t. The velocity profile 510 is a profile that represents the velocity v of the carriage 105 at each of time $t_0$ to time $t_6$ of the transport profile 501 of the carriage 105.

According to the transport profile 501 and the velocity profile 510, the carriage 105 starts operation at the velocity $v_0$ at the time $t_0$ from the position $X_1$, reaches the velocity $v_1$ at the time $t_1$, starts deceleration at the time $t_5$, and then stops at the position $X_4$ at the time $t_6$.

In the present embodiment, the user creates a graph illustrating the velocity profile 510 and sets it into the process controller 104. Note that setting data is not limited thereto. For example, a file that lists combinations of values representing time and velocity may be loaded to the process controller 104.

The process controller 104 then outputs the velocity profile 510 to the higher-level control unit 103, and the higher-level control unit 103 generates the transport profile 501 from the velocity profile 510.

FIG. 6A and FIG. 6B are general schematic diagrams illustrating the imaging position and the processing position during transportation of the transport object A and the reference transport state of the carriage stop position. The transport object A is held by the transport article holding mechanism 206 with the center position of the carriage 105 and the center position of the transport object A being matched. Note that the Y-coordinate is assumed to be always 0 for simplified illustration. Further, correction of the carriage position is performed by using the positions of the carriage end and the end of the transport object A.

First, in response to the carriage 105 reaching the position $X_2$, the imaging device 107 captures an image of the carriage 105. At this time, the measuring point of the carriage is a carriage end 601 located in the positive direction of the X-Y coordinates. In the reference transport state, since the size of the carriage is $2S_x \times 2S_y$, the position of the carriage end 601 is $(S_x, S_y)$. On the other hand, the measuring point of the transport object A is a transport object A end 602 located in the positive direction of the X-Y coordinates. Since the size of the transport object A is $2W_x \times 2W_y$, the position of the transport object A end 602 is $(W_x, W_y)$.

A position difference $(X_{base}, Y_{base})$ when the carriage end 601 and the transport object A end 602 are in the reference transport state is calculated by the following Equations (1) and (2).

$$X_{base} = S_x - W_x \quad (1)$$

$$Y_{base} = S_y - W_y \quad (2)$$

When there is a position difference satisfying Equations (1) and (2), since the processing machine position $X_3$ is located at the position of the module coordinates $X_{d1} = -X_{S1}$ when the carriage 105 stops at the position $X_4$, the change of the profile that is the subject matter of the present embodiment is not necessary.

Next, a profile change process in the present embodiment will be described.

FIG. 7A to FIG. 7C illustrate schematic diagrams illustrating a relationship of the imaging device position $X_2$, the processing machine position $X_3$, the carriage stop position $X_4$ before a change of profile, and a carriage stop position $X'_4$ after a change of profile for the transport object A when a profile change is needed. The transport object A is held by the transport article holding mechanism 206 in a state where the center position of the transport object A is shifted from the center position of the carriage by $\Delta X$.

First, likewise the case of not changing the profile, in response to the carriage 105 reaching the position $X_2$, the imaging device 107 captures an image of the carriage 105. The position of the carriage end 601 is $(S_x, S_y)$ in the same manner as the case of not changing the profile.

On the other hand, the position of a transport object A end 612 is expressed by $(W'_x, W'_y)$, the position difference $(X_{diff}, Y_{diff})$ between the carriage end 601 and the transport object A end 612 is calculated by the following Equations (3) and (4).

$$X_{diff} = S_x - W'_x \quad (3)$$

$$Y_{diff} = S_y - W'_y \quad (4)$$

When the transport profile 501 illustrated in FIG. 5B is applied to the carriage 105, the carriage 105 stops such that the center position of the carriage is the position $X_4$, as illustrated in FIG. 7B. At this time, the index 401 stops at a position shifted by $\Delta X$ from the position of the index 401 in a reference transport state of the processing position and the carriage stop position of FIG. 6A and FIG. 6B. In this state, the processing machine 108 is unable to drill the point of index 401.

Thus, in order to stop the carriage 105 at a position that enables drilling of the point of index 401, the lower-level control unit 102d changes the transport profile 501.

In the present embodiment, the change of the stop position is performed by using the position difference $(X_{base}, Y_{base})$ when the carriage end 601 and the transport object A end 602 are in the reference transport state and the position difference $(X_{diff}, Y_{diff})$ between the carriage end 601 and the transport object A end 612.

Specifically, the carriage stop position is corrected by the difference $\Delta X$ between the position differences $X_{base}$ and $X_{diff}$ described above and $\Delta Y$ as expressed by Equations (5) and (6). As a result, the carriage stop position is changed from the position $X_4$ to the position $X'_4$, and this enables drilling of the point of index 401.

$$\Delta X = X_{base} - X_{diff} \quad (5)$$

$$\Delta Y = Y_{base} - Y_{diff} \quad (6)$$

Figure 8:
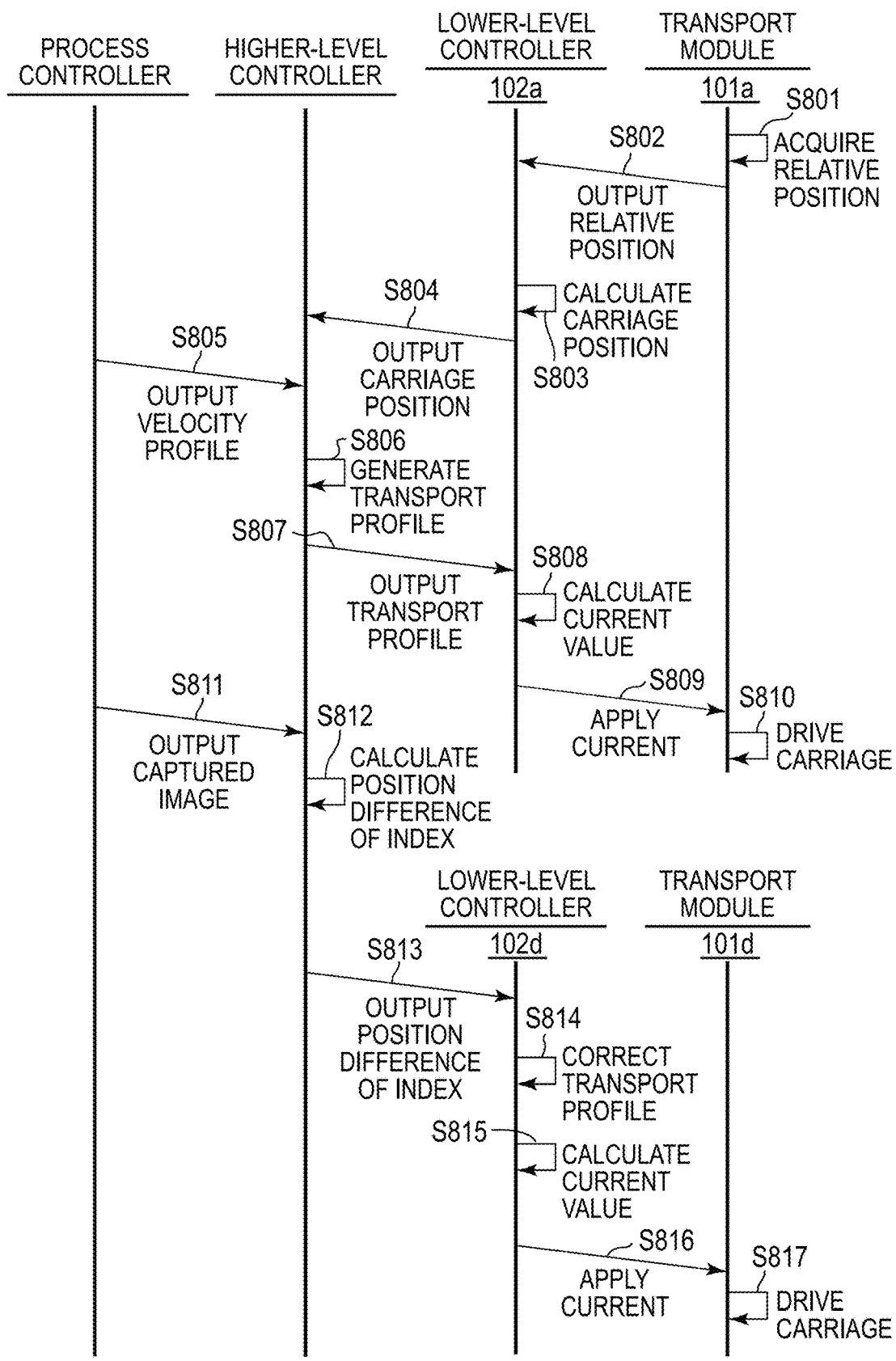
FIG. 8 is a sequence diagram illustrating carriage transportation and profile change processes according to the first embodiment of the present invention.

FIG. 8 illustrates a sequence diagram illustrating a carriage transport process and a change process of the transport profile 501. Note that this sequence diagram is a part of the process on the transport module 101d involved in stopping the carriage 105.

First, a power source (not illustrated) is turned on to start up the processing system 1 including the carriage transport system 100.

The encoders 202a and 202b of the transport module 101 read the pattern of the scale 301 of the carriage 105 and detect the position in the X-direction of the carriage 105 as relative positions from the encoders 202a and 202b (S801).

The relative position described above is then output to the lower-level control unit 102 (S802).

The position detection unit 213 of the lower-level control unit 102 calculates, based on the relative position, a position indicating where the carriage is located on the transport module 101 (S803).

The lower-level control unit 102 outputs the carriage position information to the higher-level control unit 103 (S804).

Note that S801 to S804 are always performed at regular intervals.

The process controller 104 outputs the velocity profile 510 to the higher-level control unit 103 (S805).

The higher-level control unit 103 generates the transport profile 501 from the acquired velocity profile 510 (S806).

The higher-level control unit 103 divides the generated transport profile 501 into the transport profiles 501 served by each lower-level control units 102 and outputs the divided transport profiles 501 to the input/output units 210 of the lower-level control units 102 via the input/output unit 220 (S807).

The lower control unit 102 stores the transport profile 501 acquired from the higher-level control unit 103 in the memory 215. The current control unit 211 then determines a control current from the transport profile 501 (S808). At this time, while the lower-level control units 102b to 102d have received the transport profile 501, since the carriage 105 does not enter the corresponding transport modules 101b to 101d, the lower-level control units 102b to 102d do not perform transport control.

The current control unit 211 of the lower-level control unit 102a applies the calculated control current to the group of coils 203 (S809). Thereby, the carriage 105 is transported in a direction in which the transport module 101b is located (+X-direction) (S810).

Then, when the carriage 105 travels to the boundary between the transport modules 101a and 101b and the encoder 202a of the transport module 101b reads the scale of the carriage 105, the lower-level control unit 102b starts transport control. The lower-level control unit 102b applies the transport profile 501 stored in the memory 215 to the carriage 105 and transports the carriage 105 in the direction in which the transport module 101c is located.

On the other hand, the process controller 104 operates the imaging device 107 at every time the carriage 105 is expected to reach the position $X_2$ calculated from the velocity profile 510 and captures an image of the carriage 105. The captured image is then output to the higher-level control unit 103 via the process controller 104 (S811).

The position difference calculation unit 221 acquires a position difference ($X_{base}$, $Y_{base}$), which is pre-stored in the memory 224, for a case of the carriage end 601 and the transport object A end 602 being in the reference transport state, further detects the position difference between the carriage end 601 and the transport object A end 612 ($X_{diff}$, $Y_{diff}$) from the captured image acquired in step S811, and then calculates the difference $\Delta X$ between the position differences $X_{base}$ and the $X_{diff}$ described above (S812).

The calculated difference $\Delta X$ is then output to the lower-level control unit 102d (S813).

Next, the profile correction unit 212 changes the transport profile 501 so as to stop the carriage 105 at the position $X'_4$ that enables drilling of the point of index 401, as illustrated in FIG. 7C (S814).

In the present embodiment, as illustrated in FIG. 9A to FIG. 9C, 501d indicating the position X on the transport path of the carriage 105 at $t_6$ is changed to 901b. The transport profile at this time is changed so that the position at which the carriage starts deceleration is changed from 501c to 901a by $\Delta X$ to have a constant acceleration during deceleration.

Note that the change scheme of the transport profile from 501c to 901b is not limited to the above as long as setting is such that there is no discontinuous point of the velocity change and there is no deceleration value that is not tolerated by the system.

The transport profile 501 including the corrected position 901b is then used to calculate a control current (S815).

Then, the current control unit 211 of the lower-level control unit 102d applies the calculated control current to the group of coils 203 (S816).

Finally, the carriage is driven by the applied current and thereby the carriage stop position is changed from $X_4$ to $X'_4$, which enables the processing machine 108 to drill the point of index 401 (S817).

Next, a case where the transport objects A and B illustrated in FIG. 4A and FIG. 4B are mixed and transported will be described. In the present embodiment, a transport profile common to carriages that does not depend on the type of transport object is set to the carriage 105. The transport profile 501 indicated by 501a to 501d illustrated in FIG. 5B is used for the transport profile common to carriages. Further, the position of the index 401 of the transport object A and the position of the index 411 of the transport object B are used for correction of the carriage position.

FIG. 10A to FIG. 10C illustrate schematic diagrams illustrating a relationship of the image capturing position, the processing position to the transport object B, and the carriage stop position. Note that the transport object B is held by the transport article holding mechanism 206 with the center position of the carriage 105 and the center position of the transport object B being matched.

First, when the carriage 105 reaches the position $X_2$, the imaging device 107 captures an image of the carriage 105. At this time, the index position of the transport object B is ($X_{s2}$, 0).

As illustrated in FIG. 6A and FIG. 6B, the index position of the transport object A in the reference transport state is ($X_{s1}$, 0). Therefore, a difference $\Delta X'$ between the index position of the transport object A and the index position of the transport object B is calculated by the following Equation (7).

$$\Delta X' = X_{S1} - X_{S2} \qquad (7)$$

Next, the profile correction unit 212 corrects the transport profile 501 so that the stop position $X_4$ of the carriage 105 is changed by $\Delta X'$ to the position $X''_4$, as illustrated in FIG. 10C. When the transport profile 501 is not changed, the processing position and the index 411 are shifted from each other as illustrated in FIG. 10B. In the present embodiment, as illustrated in FIG. 11A to FIG. 11C, 501d indicating the position on the transport path of the carriage 105 at $t_6$ is changed to 1101b. The transport profile at this time is changed so that the position at which the carriage starts deceleration is changed from 501c to 1101a by $\Delta X'$ to have a constant acceleration during deceleration.

As a result, the processing machine 108 is able to drill the point of index 411.

Furthermore, when information identifying a transport object is added to the velocity profile to identify the transport object, it is possible to set transport basic patterns on a transport object basis. As a result, the present invention can be also applied to the case where the processing system 1 is operated with a change of the transport velocity on a transport object basis.

Further, while the profile correction unit 212 is provided in the lower-level control unit 102 and the transport profile 501 is changed in the present embodiment, the function unit that changes the profile is not limited thereto. For example, the profile correction unit can be provided to the higher-level control unit 103. In this case, the velocity profile 510 acquired from the process controller 104 is changed. In the case of the present embodiment, it is possible to change the stop position by changing the velocity profile 510a of FIG. 9C to 910a or changing the velocity profile 510a of FIG. 11C to 1110a.

Further, while the lower-level control unit 102 and the transport module 101 are connected one-to-one in the present embodiment, the embodiment is not limited thereto. It is possible for the lower-level control unit 102 to control a plurality of transport modules 101. This case can be addressed by increasing the number of respective function units in accordance with the number of transport modules 101 connected to the lower-level control unit 102.

As discussed above, when the holding position of the transport object is different or when different transport objects are transported, it is possible to perform processing process on a predetermined position of the transport object by correcting the stop position of a carriage during the carriage moving.

Next, a profile change process when an anomaly occurs in the processing machine 108 will be described.

In this description, the profile generation unit 222 of the higher-level control unit 103 has the profile correction function and changes the velocity profile acquired from the process controller 104. The velocity profile acquired from the process controller 104 is the velocity profile 510 illustrated in FIG. 5C. Further, the velocity profile is held in the memory 224 until the completion of carriage transportation.

First, the process controller 104 detects that an anomaly occurs in the processing machine 108. The process controller 104 then outputs a signal indicating that an anomaly is detected (hereafter, referred to as an anomaly signal) to the higher-level control unit 103.

Next, once the input/output unit 220 of the higher-level control unit 103 acquires an anomaly signal from the process controller 104, the CPU 223 of the higher-level control unit 103 performs a profile change process in the profile generation unit 222.

First, the CPU 223 reads out the currently performed velocity profile 510 from the memory 224 and outputs it to the profile generation unit 222.

Next, from the position of the carriage that is currently moving, the profile generation unit 222 knows at which point on the velocity profile the carriage is transported. In this description, as illustrated in FIG. 12B, the time when an anomaly signal is acquired is Ten, and the point 1211a on the velocity profile 510 is used to transport the carriage when the anomaly signal is acquired.

Next, the velocity profile and the transport profile in which the stop position $X_{stop}$ of the carriage is changed are generated. In this description, the velocity profile 510 is changed so that the transport profile is changed from the time $T_{app}$ when a time period required for profile generation has elapsed from $T_{err}$. Specifically, the carriage transport velocity is changed from the point 1211b corresponding to the time $T_{app}$ on the velocity profile to generate the velocity profile 1210 in which the time when the carriage is stopped is changed to $T_{stop}$. In this description, a velocity profile in which the time to the stop of the carriage satisfies Equation (8) is generated.

$$T_{stop} - T_{app} = t_6 - t_5 \qquad (8)$$

As illustrated in FIG. 12B, the transport profile generated from the velocity profile 1210 is a transport profile in which the position 501d is changed to 1201b so that the carriage stops at a position $X_{stop1}$.

Next, the generated transport profile is output to the lower-level control units 102a to 102e.

Note that the velocity profile may be generated so as not to change the stop completion time for the carriage from that of the reference transport state. In this case, the transport profile generated from the velocity profile 1210 generates the velocity profile 1220 in which the position 501d is changed to 1201c so that the carriage stops at a position $X_{stop2}$.

Note that, when an anomaly occurs in the processing machine 108, the position $X_{stop1}$ where the carriage stops may be taught in advance.

As discussed above, even when an operation anomaly occurs within the processing system 1, the stop position of a carriage can be changed beyond the transport modules during the carriage moving.

Second Embodiment

A carriage transport system and a control method of a carriage transport system according to a second embodiment of the present invention will be described below.

In the present embodiment, a profile change process when two carriages are transported will be described. Note that description overlapping with that of the first embodiment will be omitted.

The general configuration of the processing system having the carriage transport system according to the present embodiment is the same as the processing system illustrated in FIG. 1. Further, the configurations of the transport module and the carriage are also the same as those in the first embodiment. The difference from the first embodiment is in the process in the profile correction unit 212.

The profile correction unit 212 corrects the transport profile applied to each carriage. The difference from the first embodiment is in that the transport profiles for all the carriage to be controlled are referred to change the transport profile.

FIG. 13A to FIG. 13C are general schematic diagrams for the carriage motion of a carriage 1350 and a carriage 1351. In the present embodiment, as illustrated in FIG. 13A, the carriage 1350 moves from the position $X_1$ on the transport module 101a to the position $X_4$ on the transport module 101d. Further, the carriage 1351 moves from the position $X_5$ on the transport module 101a to the position $X_6$ on the transport module 101d. Note that the transport object is the transport object A illustrated in FIG. 4A.

Next, FIG. 13B illustrates transport profiles 1301 and 1321 corresponding to the carriages 1350 and 1351 when carriage motion disclosed in FIG. 13A is performed. Further, FIG. 13C illustrates velocity profiles 1310 and 1330 corresponding to the carriages 1350 and 1351.

Likewise in the first embodiment, a case where the holding position of the transport object A is shifted by ΔX is now considered.

Figure 14:
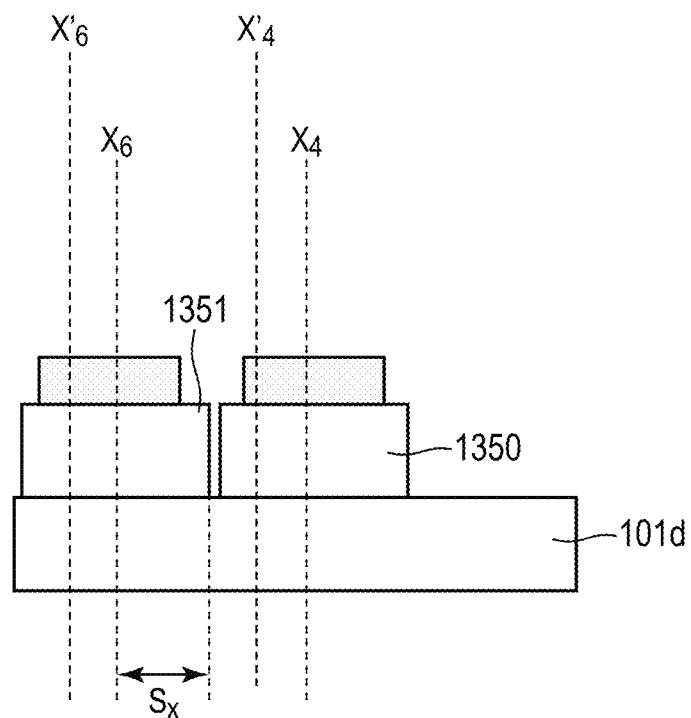
FIG. 14 is a schematic diagram illustrating a positional relationship before and after the change of the transport profile of the carriage in a transport module according to the second embodiment of the present invention.

FIG. 14 is a schematic diagram illustrating the positional relationship before and after a change of the transport profiles of the carriages 1350 and 1351 in the transport module 101d. The transport profiles 1301 and 1321 are stored in the memory 215 of the lower-level control unit 102d that controls the transport module 101d so that the transport profiles are applied in the order of carriages entering the transport module 101d.

As illustrated in FIG. 14, the transport profile is changed in the same manner as in the first embodiment to have the changed position $X'_4$ where the processing machine 108 drills the point of index 401. At this time, since the length of the carriage 1350 and the carriage 1351 is $S_x$, the position $X_6$ that does not satisfy the following Equation (9) causes collision of the carriages.

$$X_6 + S_x = X'_4 - S_x \tag{9}$$

It is therefore necessary to also change the transport profile for the carriage 1351 so as to change the position $X_6$ to the position $X'_6$.

Figure 15A:
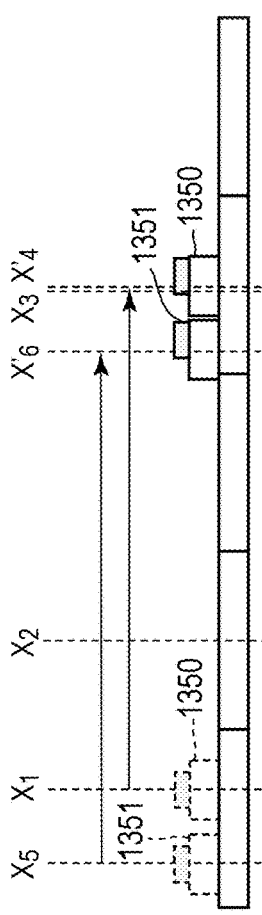
FIG. 15A is a schematic diagram illustrating a result of change of the transport profile and the velocity profile according to the second embodiment of the present invention.
Figure 15B:
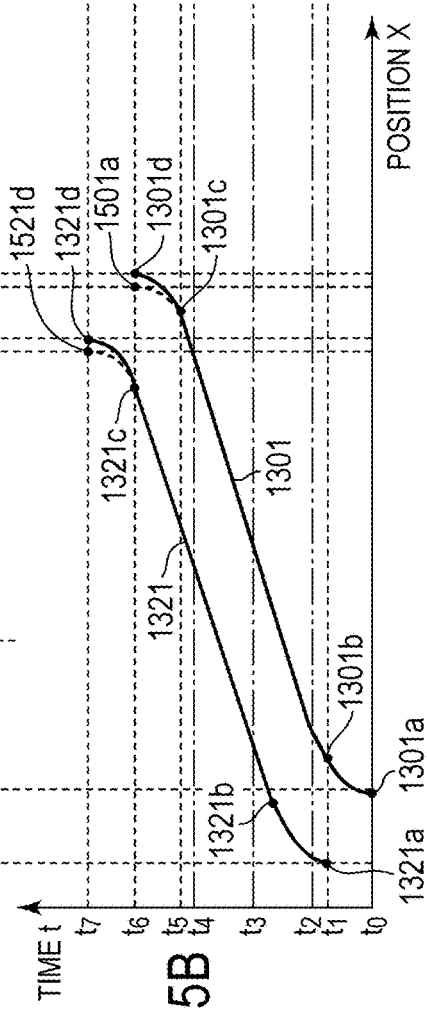
FIG. 15B is a schematic diagram illustrating the result of change of the transport profile and the velocity profile according to the second embodiment of the present invention.
Figure 15C:
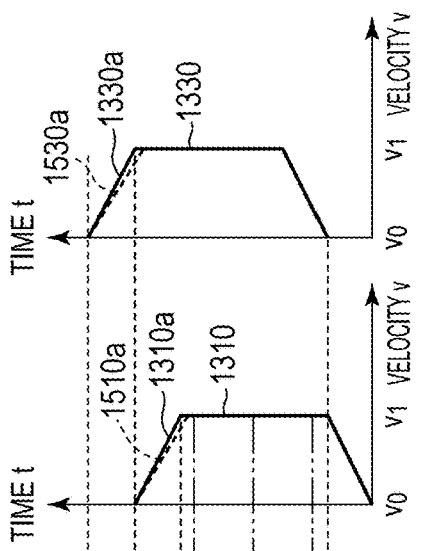
FIG. 15C is a schematic diagram illustrating the result of change of the transport profile and the velocity profile according to the second embodiment of the present invention.

FIG. 15A to FIG. 15C illustrate the transport profile and the velocity profile before and after a change. The stop position of the transport profile 1301 of the carriage 1350 is changed from 1301d to 1501a, and thereby the carriage is stopped such that the index 401 is located at the processing machine position $X_3$. Then, when Equation (9) is not satisfied, the stop position of the transport profile 1321 of the carriage 1351 is changed from 1321d to 1521a. As a result, the unchanged position $X_6$ is changed to the changed position $X'_6$, collision of the carriages can be prevented.

Further, when the velocity profile is changed by the higher-level control unit 103, the velocity profile 1210a of the carriage 1250 of FIG. 14 is changed to 1410a. Furthermore, the velocity profile 1230a of the carriage 1251 is changed to 1430a, collision of the carriages can be prevented.

As discussed above, even when a plurality of carriages are transported, it is possible to change the carriages to stop desired positions and process a predetermined position of the transport object.

Third Embodiment

A carriage transport system and a control method of the carriage transport system according to a third embodiment of the present invention will be described below.

In the present embodiment, a profile change process in accordance with transport information indicating a transport mode when a single carriage is transported will be described. Note that the velocity profile 510 illustrated in FIG. 5C in the first embodiment is used to transport the carriage 105.

First, in a processing system according to the present embodiment, the imaging device 107 in the processing system 1 described in the first embodiment is installed at a position for capturing an image of the transport module 101a. The installation position of the imaging device 107 and the position where the carriage 105 is stopped are the same as each other.

Further, the user sets a transport mode in addition to a setting of the velocity profile to the process controller 104 of the first embodiment. In the present embodiment, the user selects and sets a transport mode out of four types of a normal transport mode (normal mode), an acceleration hold mode, a maximum velocity hold mode, and a low load mode. Further, the transport mode is stored as the transport mode information in the memory 224 of a higher-level control unit 1601 via the process controller 104. Blocks other than the above are the same as those in the first embodiment. Further, each transport mode will be described later.

Figure 16:
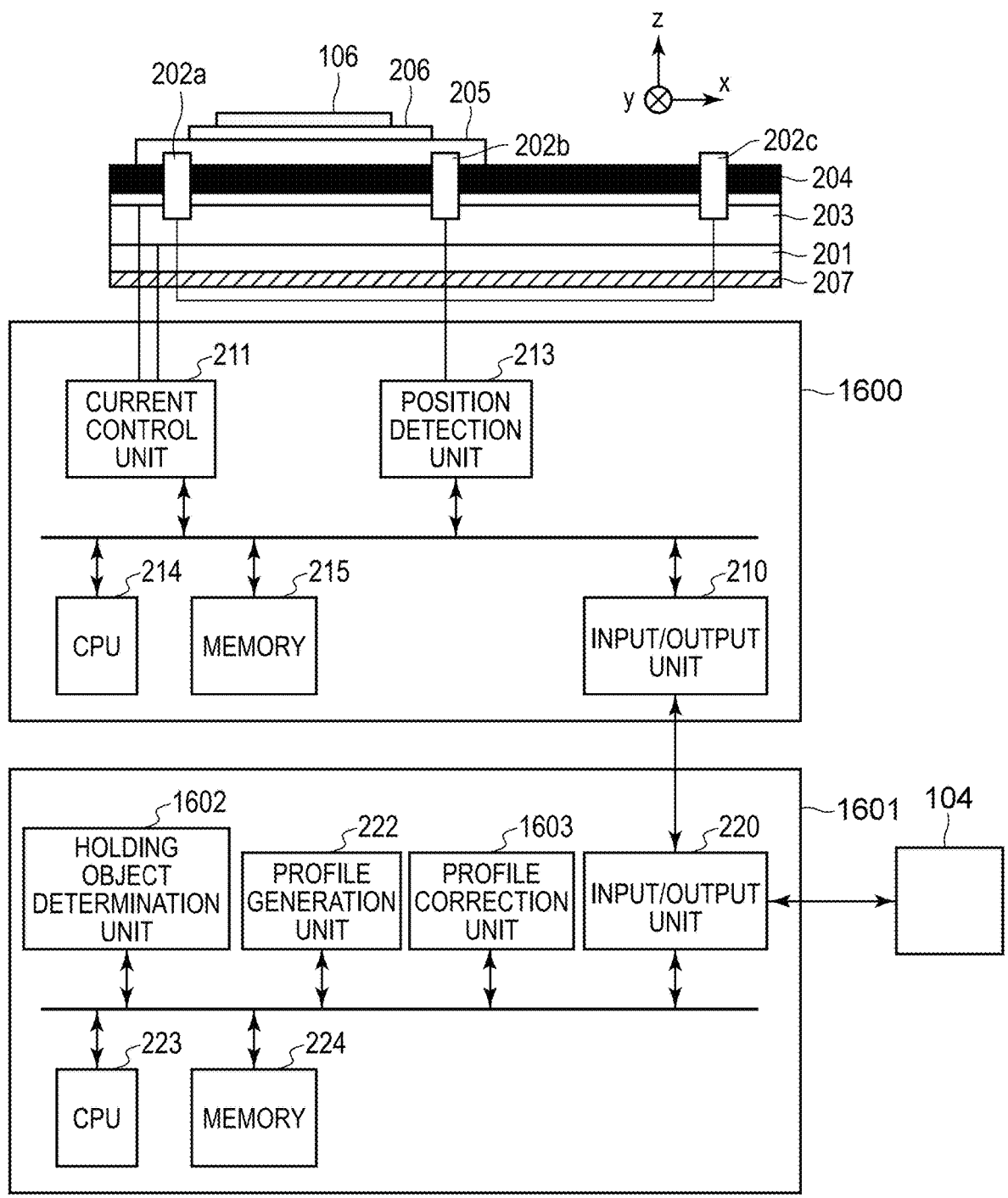
FIG. 16 is a block diagram illustrating a general configuration of a transport module and a lower-level control unit and a higher-level control unit that perform control of the transport module according to a third embodiment of the present invention.

Next, FIG. 16 illustrates a general configuration of the transport module 101a and a lower-level control unit 1600 and the higher-level control unit 1601 that control the transport module 101a according to the present embodiment.

The lower-level control unit 1600 has a configuration in which the profile correction unit 212 is omitted from the lower-level control unit 102 described in the first embodiment. The function of each function unit is the same as that of the lower-level control unit 102 described in the first embodiment.

The higher-level control unit 1601 has a transport object determination unit 1602 and a profile correction unit 1603 in addition to the components of the higher-level control unit 103 described in the first embodiment.

The transport object determination unit 1602 determines the transport object transported by the carriage 105 from an image captured by the imaging device 107 and acquired via the process controller 104. In the present embodiment, it is determined to any one of the transport object A, the transport object B, and no transport object.

The profile correction unit 1603 changes the velocity profile acquired from the process controller 104 in accordance with the determination result by the transport object determination unit 1602 and the transport mode information stored in the memory 224.

Figure 17A:
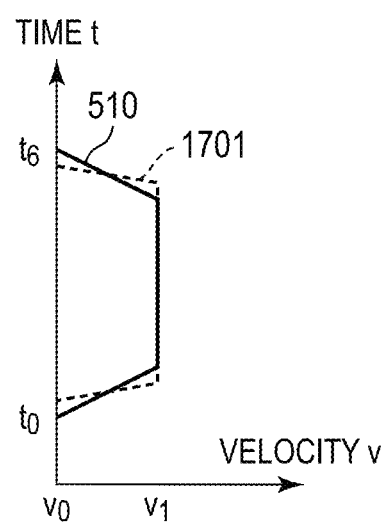
FIG. 17A is a schematic diagram illustrating a result of change of the velocity profile according to the third embodiment of the present invention.
Figure 17B:
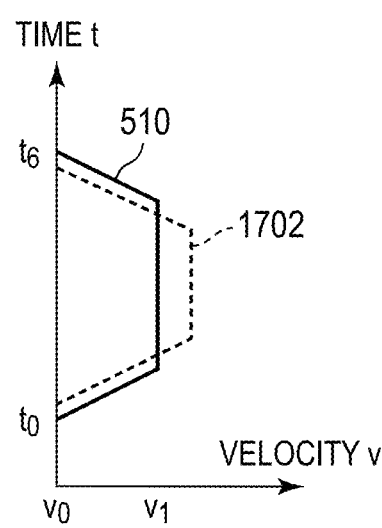
FIG. 17B is a schematic diagram illustrating the result of change of the velocity profile according to the third embodiment of the present invention.
Figure 17C:
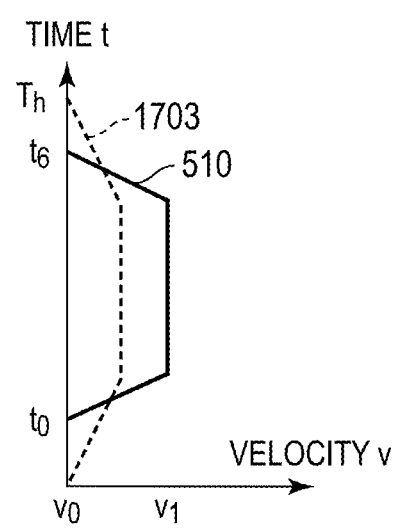
FIG. 17C is a schematic diagram illustrating the result of change of the velocity profile according to the third embodiment of the present invention.

FIG. 17A to FIG. 17C illustrate the result of change of the velocity profile in the present embodiment. The velocity profile 510 illustrated in each of FIG. 17A to FIG. 17C is a velocity profile when the normal transport mode is set.

FIG. 17A illustrates a velocity profile 1701 in the maximum velocity hold mode. The slope of the velocity profile is changed while the maximum velocity is maintained to $v_1$, and thereby acceleration is changed. When the maximum velocity hold mode is selected, the velocity profile is changed in accordance with the determination result of the transport object A and the transport object B, and stable transportation is allowed in accordance with the weight of the transport object.

FIG. 17B illustrates a velocity profile 1702 in the acceleration hold mode. The maximum velocity is changed from $v_1$ to $v_2$ while the slope of the velocity profile is maintained, and thereby the maximum velocity is changed while the acceleration is maintained. When the acceleration hold mode is selected, the velocity profile is changed in accordance with the presence or absence of the transport object. The velocity profile is changed when there is no transport object, and this can reduce the tact of the transport system.

FIG. 17C illustrates a velocity profile 1703 in the low load mode. The acceleration (slope of the velocity profile) and the maximum velocity are reduced so that the transport system satisfies a tolerable transport limit time $T_h$. As a result, it is possible to reduce the load of each function block of the transport module such as leading to a longer life of coils.

Note that the area of the trapezoid represented by the velocity profile described above is not changed before and after the profile change, and thereby the velocity profile is changed so that the stop position of the carriage is not changed.

As discussed above, it is possible to change a drive profile in accordance with the transport mode and the type of transport object. As a result, a drive profile can be changed other than during the carriage being stopped, and carriage transportation can be performed along the system requirement.

Fourth Embodiment

While the example in which a transport object is captured by the imaging device during a carriage moving to correct a position shift of the transport object on the carriage has been illustrated in the first to third embodiments, an example in which a position shift of a transport object on a carriage is corrected based on data calculated in advance will be illustrated in the present embodiment.

Figure 18A:
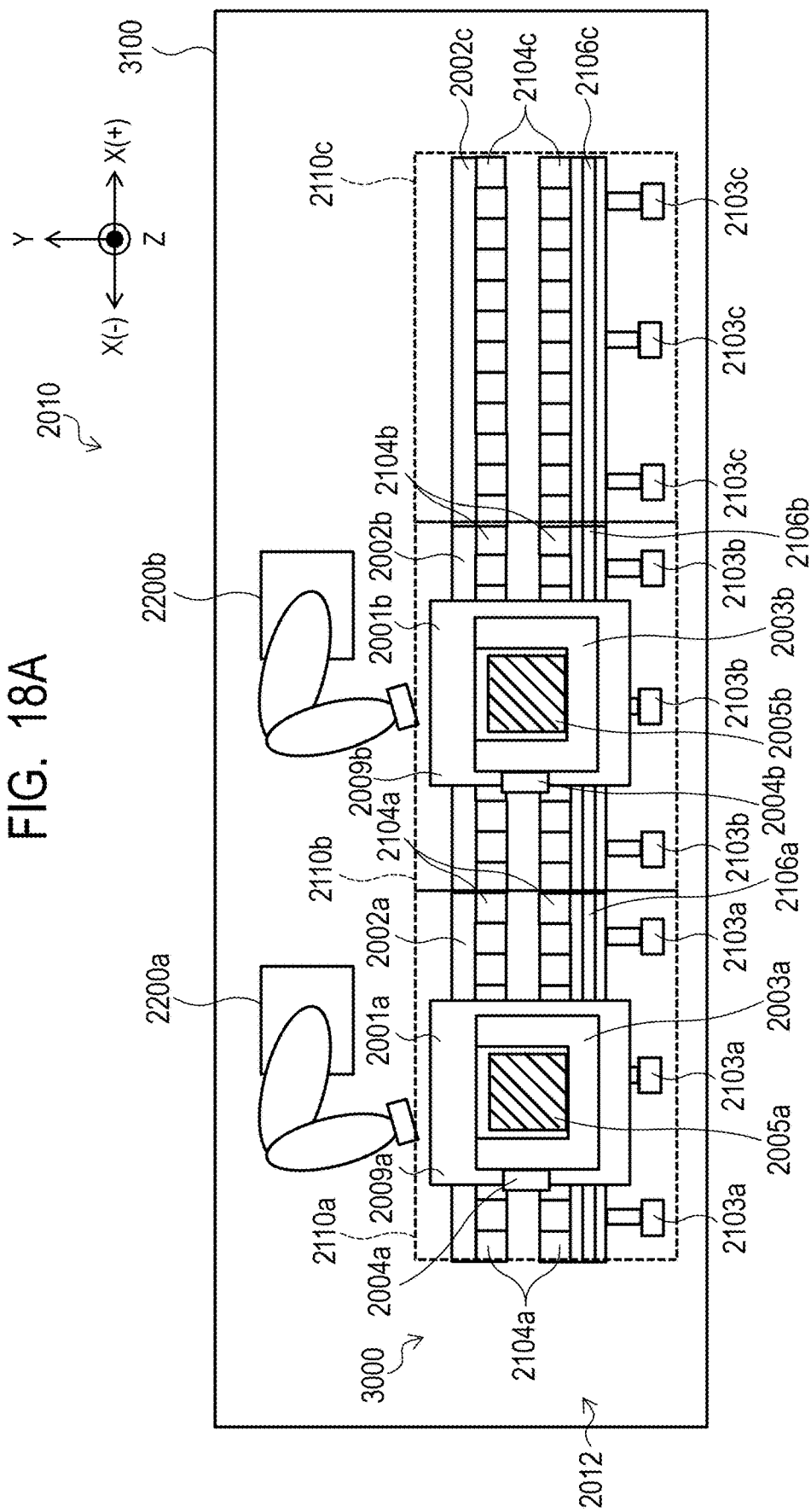
FIG. 18A is a schematic diagram illustrating a configuration of a processing system including a transport system according to a fourth embodiment of the present invention.
Figure 18C:
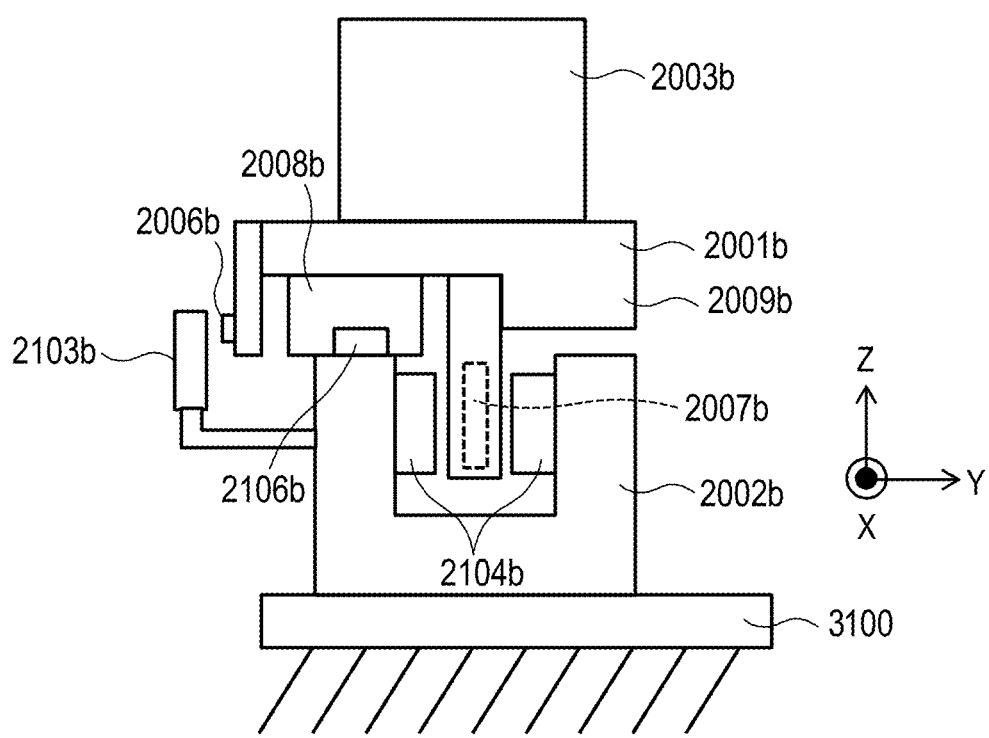
FIG. 18C is a schematic diagram illustrating a configuration of the processing system including the transport system according to the fourth embodiment of the present invention.
Figure 19:
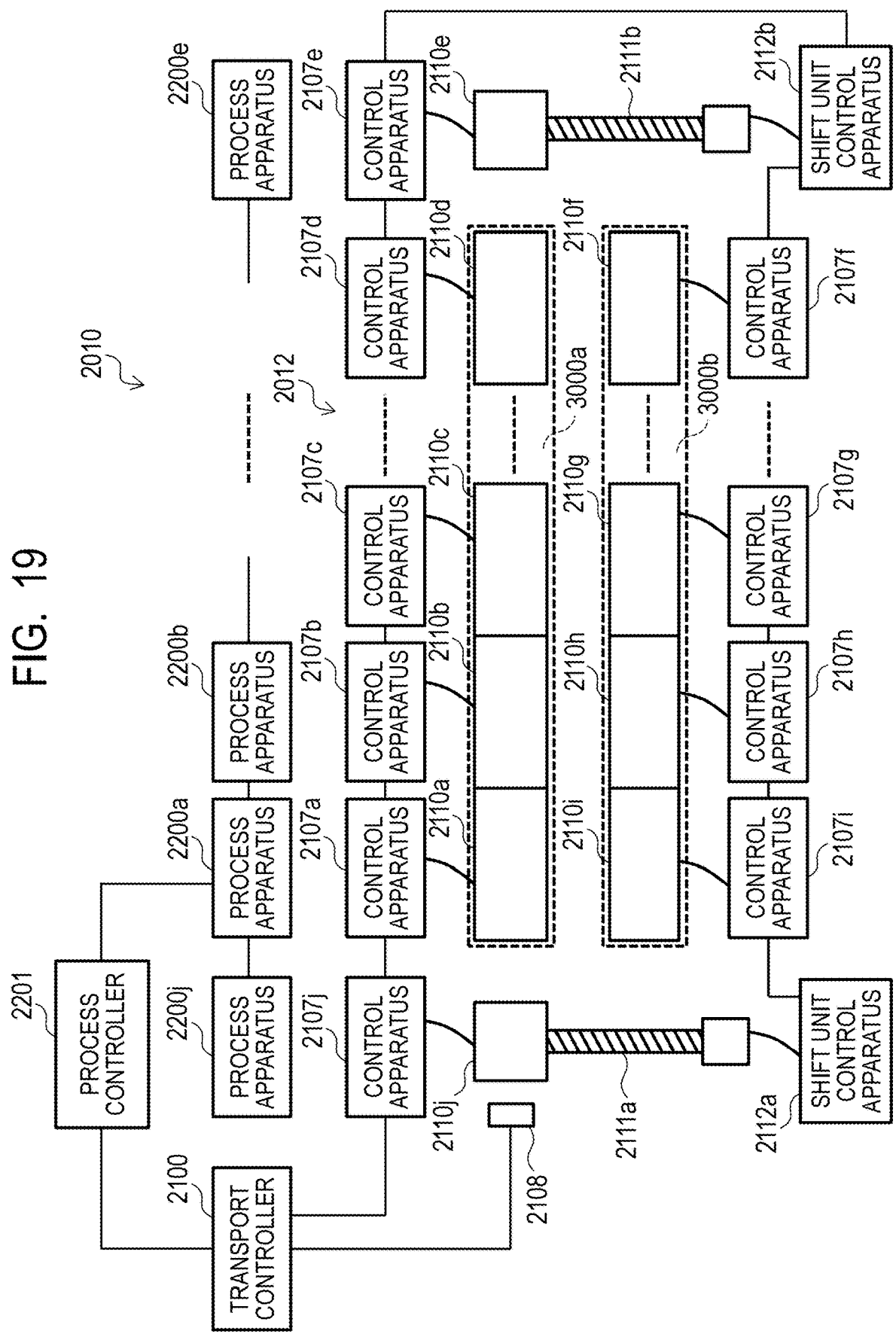
FIG. 19 is a block diagram illustrating a configuration of the processing system including the transport system according to the fourth embodiment of the present invention.

First, a configuration of a processing system including a transport system according to the present embodiment will be described by using FIG. 18A to FIG. 19. FIG. 18A to FIG. 18C are schematic diagrams illustrating a configuration of the processing system according to the present embodiment including a transport path, a carriage, a process apparatus, and the like. FIG. 18A is a top view, FIG. 18B is a side view, and FIG. 18C is a front view. FIG. 19 is a block diagram illustrating the configuration of the processing system including the transport system according to the present embodiment.

As illustrated in FIG. 18A to FIG. 18C, a processing system 2010 according to the present embodiment has a transport path 3000, carriages 2001, and process apparatuses 2200. Further, the processing system 2010 has a reader/writer 2108, a transport controller 2100, and a process controller 2201 (see FIG. 19). The processing system 2010 includes a transport system 2012 that transports workpieces 2005 to be processed. The transport system 2012 has transport modules 2110 forming the transport path 3000, the carriages 2001, the reader/writer 2108, and the transport controller 2100. In FIG. 18A and FIG. 18B, two carriages 2001a and 2001b, namely, a carriage 2001a that transports a workpiece 2005a and a carriage 2001b that transports a workpiece 2005b are illustrated as the carriages 2001. Further, three transport modules 2110a, 2110b, and 2110c are illustrated as the transport modules 2110. Further, two process apparatuses 2200a and 2200b are illustrated as the process apparatuses 2200.

The coordinate axes in the processing system 2010 is now defined. First, an X-axis is defined as the moving direction of the carriage 2001 moving horizontally. Further, a Z-axis is defined as the perpendicular direction. Further, a Y-axis is defined as a direction orthogonal to the X-axis and the Z-axis. Further, the moving direction of the carriage 2001 of the X-direction along the X-axis, specifically, the direction in which the carriage 2001a illustrated in FIG. 18A to FIG. 18C moves toward the carriage 2001b is defined as the positive (+) direction, and the opposite direction thereto is defined as the negative (−) direction.

The transport system 2012 having the transport modules 2110 and the carriages 2001 is a transport system with movable magnet type linear motor (moving magnet type linear motor, movable field magnetic type linear motor). The transport modules 2110 are placed on a frame 3100. A plurality of transport modules 2110 are aligned and placed on the frame 3100, and thereby the transport path 3000 is formed. The transport path 3000 is a straight path, for example. Note that, while FIG. 18A to FIG. 18C illustrate the two carriage 2001a and 2001b, the number of carriages 2001 is not limited to two but may be one or more. Further, while FIG. 18A to FIG. 18C illustrate the three transport modules 2110a, 2110b, and 2110c, the number of transport modules 2110 is not limited to three but may be one or more. Further, the transport path 3000 is not limited to the straight path but may be any form of path.

Each of the transport modules 2110 has a casing 2002, position detection units 2103, armatures 2104, and a guide 2106.

The casing 2002 is fixed and installed on the frame 3100. The position detection units 2103 are attached to the casing 2002. Further, the armatures 2104 are attached to the casing 2002. The position detection units 2103 and the armatures 2104 are communicably connected to a control apparatus 2107 described later.

Further, the guide 2106 is attached to the casing 2002. On the guide 2106, the carriage 2001 is arranged so as to be movable along the guide 2106.

Each position detection unit 2103 is an encoder, for example, and reads a scale 2006 described later of the carriage 2001 to acquire position information on the carriage 2001. The position detection unit 2103 transmits the acquired position information of the carriage 2001 to the control apparatus 2107.

Each armature 2104 has a magnetic pole iron core and a group of coils including a plurality of coils wound around the magnetic pole iron core. The armatures 2104 are provided along the moving direction of the carriage 2001 inside the casing 2002 so as to face magnets 2007 of the carriage 2001 from both sides.

The carriage 2001 has a holding unit 2003, the scale 2006, a bearing 2008, the magnets 2007, a radio frequency (RF) tag 2004, and a top plate 2009.

The holding unit 2003 is attached on the top of the top plate 2009. The holding unit 2003 holds the workpiece 2005 on the top plate 2009. Note that the transport system 2012 according to the present embodiment is adapted so that multiple types of workpieces 2005 different from each other are transported by the carriage 2001. In accordance with the type of the workpiece 2005 to hold, multiple types of the holding units 2003 different from each other may be used.

The scale 2006 is provided on the side part of the top plate 2009. Position information is recorded in the scale 2006 along the moving direction of the carriage 2001 thereof. The position detection units 2103 are provided to the transport module 2110 relative to the scale 2006 of the carriage 2001 as described above. Each position detection units 2103 of the transport module 2110 reads the scale 2006 of the carriage 2001 and acquires the position information on the carriage 2001. The position detection units 2103 are attached to predetermined positions on the side face of the casing 2002 so as to face the scale 2006. The plurality of position detection units 2103 are attached to the transport module 2110 at a shorter interval than the scale length of the scale 2006, and thus the scale 2006 can be read by any of the position detection units 2103.

The bearing 2008 is provided to the under part of the top plate 2009. The bearing 2008 is mounted to the guide 2106 provided to the transport module 2110 and is configured to be able to roll on and travel along the guide 2106. With the bearing 2008 being mounted to the guide 2106, the carriage 2001 is supported so as to be movable along the guide 2106.

Furthermore, the plurality of magnets 2007 are provided on the under part of the top plate 2009. The plurality of magnets 2007 are arranged along the moving direction of the carriage 2001. The plurality of magnets 2007 are arranged such that different poles appear in an alternating manner on both sides facing the armature 2104 of the transport module 2110.

The RF tug 2004 is attached to the side face of the holding unit 2003. The RF tug 2004 is a storage unit that stores identification (ID) information that is identification information specific to the carriage 2001 and used for identifying the carriage 2001. The ID information stored in the RF tug 2004 is read by the reader/writer 2108 without contact. Note that the attachment position of the RF tug 2004 in the carriage 2001 is not limited to the side face of the holding unit 2003 but may be any position as long as it enables the reader/writer 2108 to read ID information.

Each process apparatus 2200 is an apparatus that performs processing on the workpiece 2005 transported by the carriage 2001 to process the workpiece 2005. The process apparatus 2200 performs designated processing on the workpiece 2005 at a position where the carriage 2001 is stopped with the workpiece 2005 held by the holding unit 2003 on the carriage 2001. Processing is performed on the workpiece 2005 by the process apparatus 2200, and thereby the workpiece 2005 is processed and an article such as an electronic device is manufactured.

Various processing may be performed by the process apparatus 2200. For example, the process apparatus 2200 assembles another component to the workpiece 2005, applies an adhesive agent to the workpiece 2005, detaches a component from the workpiece 2005, inspects the workpiece 2005, or irradiates the workpiece 2005 with a light beam.

Note that, while FIG. 18A and FIG. 18B illustrate the two process apparatuses 2200a and 2200b, the number of process apparatuses 2200 is not limited to two. Various layouts of the process apparatuses 2200 are possible depending on individual manufacturing lines, the type and the number of process apparatuses 2200 can be selected in accordance with the layout thereof.

As illustrated in FIG. 19, the processing system 2010 according to the present embodiment further has the control apparatuses 2107, the transport controller 2100, and the process controller 2201. Further, FIG. 19 illustrates a case where a transport paths 3000a and 3000b aligned in parallel to each other as a forward path and a reverse path, respectively, are installed as the transport paths 3000. A shift unit 2111a that passes the carriage 2001 from the transport path 3000b to the transport path 3000a is installed on the upstream side of the transport path 3000a and the downstream side of the transport path 3000b located on the same side. Further, a shift unit 2111b that passes the carriage 2001 from the transport path 3000a to the transport path 3000b is installed on the downstream side of the transport path 3000a and the upstream side of the transport path 3000b located on the same side.

A plurality of control apparatuses 2107 are provided to the plurality of transport modules 2110, respectively. In FIG. 19, a plurality of control apparatuses 2107a, 2107b, 2107c, . . . , and 2107d are provided to a plurality of transport modules 2110a, 2110b, 2110c, . . . , and 2110d forming the transport path 3000a, respectively. Further, a plurality of control apparatuses 2107f, . . . , 2107g, 2107h, and 2107i are provided to a plurality of transport modules 2110f, . . . , 2110g, 2110h, and 2110i forming the transport path 3000b, respectively. Furthermore, control apparatuses 2107j and 2107e are provided to transport modules 2110j and 2110e on the shift units 2111a and 2111b, respectively.

Each of the control apparatuses 2107 is connected to the armatures 2104 of the corresponding transport module 2110. The control apparatus 2107 controls the current to be applied to the armatures 2104 of the corresponding transport module 2110. When a current is applied to the armature 2104, the magnet 2007 of the carriage 2001 receives electromagnetic force as drive power from the armature 2104. In this way, the carriage 2001 obtains driving force and is transported. By controlling a current applied to the armature 2104, the control apparatus 2107 causes the carriage 2001 on the corresponding transport module 2110 to travel and stop and controls the position of the carriage 2001 on the corresponding transport module 2110.

The control apparatus 2107 is communicably connected to the transport controller 2100 that is a higher-level control unit and is able to transmit and receive information on transportation of the carriage 2001 to and from the transport controller 2100. The transport controller 2100 functions as a lower-level control apparatus that controls transportation of the carriage 2001 by using the corresponding transport module 2110. This enables the carriage 2001 to travel freely on the transport path 3000 formed of the plurality of transport modules 2110.

The process controller 2201 is communicably connected to the plurality of process apparatuses 2200 and the transport controller 2100. The process controller 2201 is able to transmit and receive information on processes to and from the plurality of process apparatuses 2200. Thereby, each process apparatus 2200 performs processing designated by the process controller 2201. Further, the process controller 2201 is able to transmit and receive information on transportation of the carriage 2001 to and from the transport controller 2100. Thereby, the transport controller 2100 controls transportation of the carriage 2001 based on the instruction from the process controller 2201. This enables the process controller 2201 to control the operation of the entire processing system 2010 such as transportation, processing, or the like of the workpiece 2005 by using the carriage 2001.

The plurality of process apparatuses 2200 are provided to the plurality of transport modules 2110, respectively. In the configuration illustrated in FIG. 19, the plurality of process apparatuses 2200j, 2200a, 2200b, . . . , and 2200e are provided to the plurality of transport modules 2110j, 2110a, 2110b, . . . , and 2110e, respectively.

The process apparatus 2200j supplies a workpiece 2005 to be processed to the holding unit 2003 of the carriage 2001 which is stopped on the transport module 2110j. At this time, the transport module 2110j is located adjacent to the transport module 2110a by the shift unit 2111a. The holding unit 2003 holds the workpiece 2005 supplied by the process apparatus 2200j on the carriage 2001.

The process apparatus 2200a performs predetermined processing on the workpiece 2005 held by the holding unit 2003 on the carriage 2001 that is stopped on the transport module 2110a. Similarly, the process apparatus 2200b performs predetermined processing on the workpiece 2005 held by the holding unit 2003 on the carriage 2001 that is stopped on the transport module 2110b.

The process apparatus 2200e outputs the workpiece 2005 that has been processed by the process apparatuses 2200a and 2200b. That is, the process apparatus 2200e outputs the workpiece 2005 held by the carriage 2001 which is stopped on the transport module 2110e after traveling on the transport modules 2110a, 2110b, 2110c, . . . , and 2110d. At this time, the transport module 2110e is located adjacent to the transport module 2110d by the shift unit 2111b.

Since being connected to the transport controller 2100 and the process apparatuses 2200 as described above, the process controller 2201 is able to control the entire operation of supply, transportation, processing, and output of the workpiece 2005.

The shift units 2111 are installed for moving the carriage 2001 between the transport path 3000a and the transport path 3000b. The shift unit 2111a is installed for moving the carriage 2001 from the transport path 3000b to the transport path 3000a. Further, the shift unit 2111b is installed for moving the carriage 2001 from the transport path 3000a to the transport path 3000b.

While the configuration of each shift unit 2111 is not limited in particular, a linear actuator or the like in which a rotary motor, a ball screw, and a linear guide are combined can be used, for example.

Each transport module 2110 is attached on the shift unit 2111. The shift units 2111 are able to move the attached transport module 2110 between the transport path 3000a and the transport path 3000b. That is, the shift unit 2111a is able to move the attached transport module 2110j between a position adjacent to the transport module 2110i of the transport path 3000b and a position adjacent to the transport module 2110a of the transport path 3000a. The shift unit 2111b is able to move the attached transport module 2110e between a position adjacent to the transport module 2110d of the transport path 3000a and a position adjacent to the transport module 2110f of the transport path 3000b.

The transport module 2110 attached to the shift unit 2111 is configured to move the carriage 2001 in the same manner as other transport modules 2110 forming the transport paths 3000 except for being attached to the shift unit 2111.

The shift units 2111 are communicably connected to the shift unit control apparatuses 2112. Each shift unit control apparatus 2112 can move the transport module 2110 attached on the shift unit 2111 by performing predetermined control to operate the shift unit 2111. Each shift unit control apparatus 2112 is communicably connected to the transport controller 2100 and able to transmit and receive information on transportation of the carriage 2001 to and from the transport controller 2100. This enables the shift unit control apparatuses 2112 to operate the shift unit 2111 and move the transport module 2110 between the transport path 3000a and the transport path 3000b as described below.

First, the shift unit control apparatus 2112b causes the shirt unit 2111b to operate to move the transport module 2110e in the direction of the transport path 3000a in accordance with the instruction from the transport controller 2100. Thereby, the shift unit control apparatus 2112b stops the transport module 2110e at a position adjacent to the transport module 2110d so that the carriage 2001 stopped on the transport module 2110d can move on the transport module 2110e.

With the transport module 2110e being adjacent to the transport module 2110d, the control apparatuses 2107d and 2107e move the carriage 2001 stopped on the transport module 2110d in the direction of the transport module 2110e in accordance with the instruction from the transport controller 2100. Furthermore, the control apparatus 2107e stops the carriage 2001 on the transport module 2110e.

With the carriage 2001 being stopped on the transport module 2110e, the shift unit control apparatus 2112b causes the shift unit 2111b to operate to move the transport module 2110e in the direction of the transport path 3000b in accordance with the instruction from the transport controller 2100. Thereby, the shift unit control apparatus 2112b stops the transport module 2110e at a position adjacent to the transport module 2110f so that the carriage 2001 stopped on the transport module 2110e can move on the transport module 2110f.

With the transport module 2110e being adjacent to the transport module 2110f, the control apparatuses 2107e and 2107f move the carriage 2001 stopped on the transport module 2110e in the direction of the transport module 2110f in accordance with the instruction from the transport controller 2100. Furthermore, the control apparatus 2107f moves the carriage 2001 on the transport module 2110f.

In such a way, the carriage 2001 can be moved from the transport path 3000a to the transport path 3000b via the shift unit 2111b that moves the transport module 2110e. The workpiece 2005 held by the holding unit 2003 of the carriage 2001 stopped on the transport module 2110e, which has already been processed by the process apparatuses 2200a and 2200b described above, is output by the process apparatus 2200e. Thus, the carriage 2001 that has moved from the transport path 3000a to the transport path 3000b is now an empty carriage on which no workpiece 2005 is held by the holding unit 2003.

Further, the shift unit control apparatus 2112a causes the shift unit 2111a to operate to move the transport module 2110j in the direction of the transport path 3000b in accordance with the instruction from the transport controller 2100. Thereby, the shift unit control apparatus 2112a stops the transport module 2110j at a position adjacent to the transport module 2110i so that the carriage 2001 stopped on the transport module 2110i can move on the transport module 2110j.

With the transport module 2110j being adjacent to the transport module 2110i, the control apparatuses 2107i and 2107j move the carriage 2001 stopped on the transport module 2110i in the direction of the transport module 2110j in accordance with the instruction from the transport controller 2100. Furthermore, the control apparatus 2107j stops the carriage 2001 on the transport module 2110j.

With the carriage 2001 being stopped on the transport module 2110j, the shift unit control apparatus 2112a causes the shift unit 2111a to operate to move the transport module 2110j in the direction of the transport path 3000a in accordance with the instruction from the transport controller 2100. Thereby, the shift unit control apparatus 2112a stops the transport module 2110j at a position adjacent to the transport module 2110a so that the carriage 2001 stopped on the transport module 2110j can move on the transport module 2110a.

With the transport module 2110j being adjacent to the transport module 2110a, the control apparatuses 2107j and 2107a move the carriage 2001 stopped on the transport module 2110j in the direction of the transport module 2110a in accordance with the instruction from the transport controller 2100. Furthermore, the control apparatus 2107a moves the carriage 2001 on the transport module 2110a.

In such a way, the carriage 2001 can be moved from the transport path 3000b to the transport path 3000a via the shift unit 2111a that moves the transport module 2110j. As described above, a workpiece 2005 to be processed is supplied by the process apparatus 2200j to the holding unit 2003 of the empty carriage 2001 stopped on the transport module 2110j. Thus, the carriage 2001 that has moved from the transport path 3000b to the transport path 3000a is now a carriage on which the workpiece 2005 is again held by the holding unit 2003.

The reader/writer 2108 is a reading unit that reads information from the RF tug 2004 and is provided for reading, without contact, ID information stored in the RF tug 2004 attached to the carriage 2001. The reader/writer 2108 is communicably connected to the transport controller 2100 and transmits the ID information read from the RF tug 2004 to the transport controller 2100. The reader/writer 2108 is installed at a position on the most upstream side of the transport path 3000a so as to be able to read ID information from the RF tug 2004 of the carriage 2001 that moves from the transport path 3000b to the transport path 3000a. For example, the reader/writer 2108 is installed so as to be able to read ID information from the RF tug 2004 of the carriage 2001 on the transport module 2110j located adjacent to the transport module 2110a.

The transport controller 2100 can communicate with the reader/writer 2108 as described above. The transport controller 2100 also functions as an identifying unit that identifies the carriage 2001 and can identify the carriage 2001 based on the ID information transmitted from the reader/writer 2108 that has read the RF tug 2004 attached to the carriage 2001.

Note that, while the carriage 2001 is identified by reading ID information stored in the RF tug 2004 by using the reader/writer 2108 in the present embodiment, the embodiment is not limited thereto. Other schemes may be used as long as it can identify the carriage 2001. For example, when the transport order of the carriages 2001 is pre-stored in the transport controller 2100 and the operator inputs ID information of the carriage 2001 stopped on the transport module 2110j when starting transportation, the reader/writer 2108 is no longer necessary.

Figure 20:
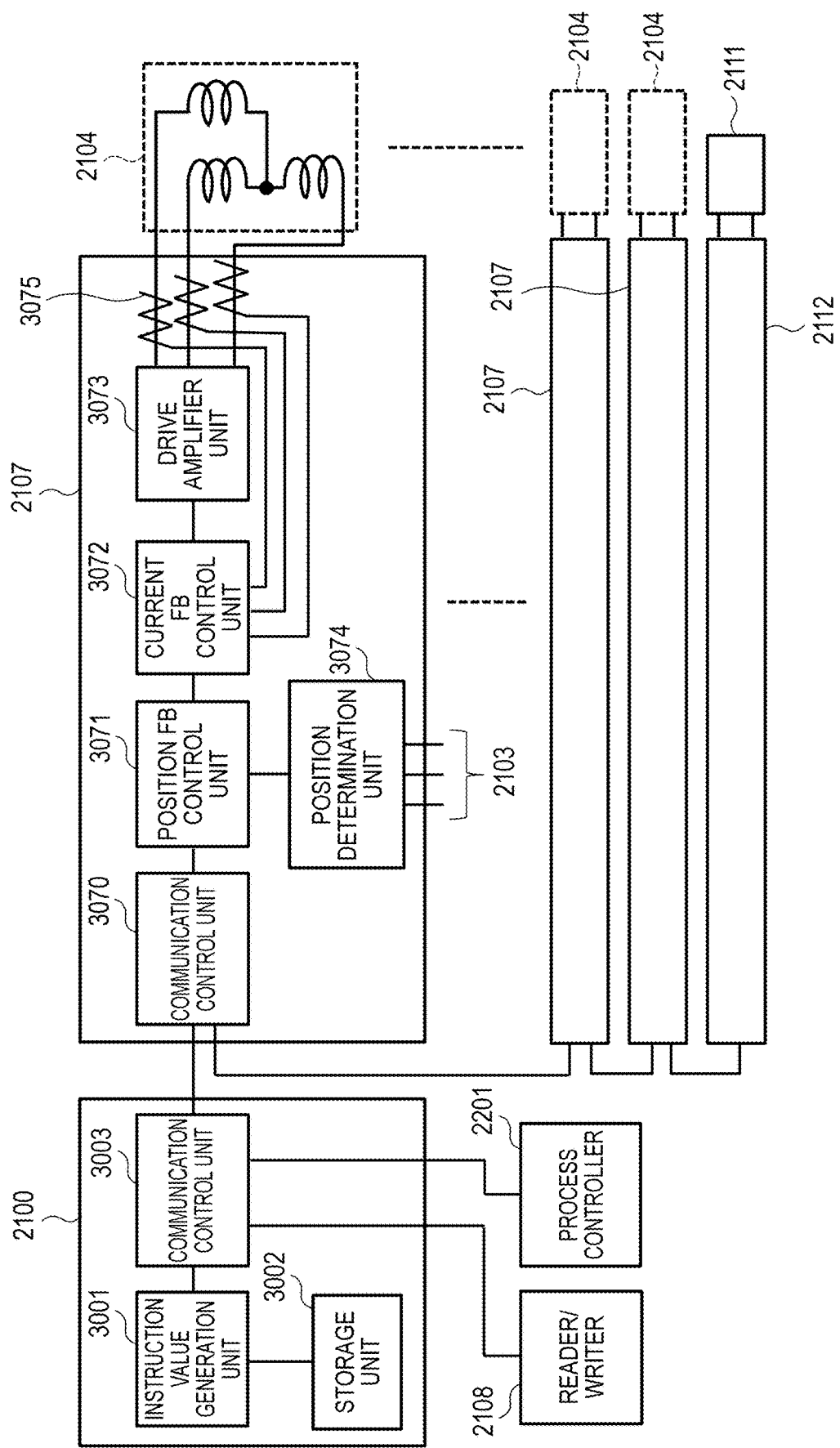
FIG. 20 is a block diagram illustrating a control configuration the transport system according to the fourth embodiment of the present invention.

Next, a control configuration of the transport system 2012 according to the present embodiment will be described by using FIG. 20. FIG. 20 is a block diagram illustrating the control configuration of the transport system 2012 according to the present embodiment.

The transport controller 2100 functions as a higher-level control unit that controls transportation of the plurality of carriages 2001 with respect to the control apparatuses 2107 that function as lower-level control units. The transport controller 2100 has an instruction value generation unit 3001, a storage unit 3002, and a communication control unit 3003. Note that, while the transport controller 2100 has other functions, the description of other functions will be omitted in the present embodiment.

The instruction value generation unit 3001 generates a position instruction value of the carriage 2001 to be controlled. The position instruction value of the carriage 2001 generated by the instruction value generation unit 3001 is a value indicating a target stop position of the carriage 2001. Further, the instruction value generation unit 3001 generates the position instruction value of the transport module 2110 on the shift unit 2111 to be controlled. The position instruction value of the transport module 2110 on the shift unit 2111 generated by the instruction value generation unit 3001 is a value indicating a target stop position of the transport module 2110 on the shift unit 2111.

The communication control unit 3003 controls communication with the plurality of control apparatuses 2107 and the plurality of shift unit control apparatuses 2112 connected to the transport controller 2100, the process controller 2201, and the reader/writer 2108. Thereby, the communication control unit 3003 transmits and receives of various control signals and various control data at predetermined timings to and from the control apparatuses 2107, the shift unit control apparatuses 2112, the process controller 2201, and the reader/writer 2108.

The storage unit 3002 stores each stop reference position that is a reference according to which each carriage 2001 is stopped on the transport path 3000 as described later. The stop reference position is preset as a position where the carriage 2001 to be stopped on the transport module 2110 relative to the process apparatus 2200, for example.

Furthermore, the storage unit 3002 stores motion error data that is data on a plurality of motion errors acquired in accordance with each stop reference position for each of the plurality of carriages 2001 and the type of the workpiece 2005 or the type of the holding unit 2003 correlated to the type of workpiece 2005, as described later. The instruction value generation unit 3001 uses the stop reference position and the motion error to calculate a value indicating a target stop position as a position instruction value for each carriage 2001 as described later.

Note that, while a case where the transport controller 2100 has the storage unit 3002 that stores motion error data is described in the present embodiment, the embodiment is not limited thereto. For example, all or some of the plurality of control apparatuses 2107 may have the storage unit 3002.

The ID information on the carriage 2001 read by the reader/writer 2108 is input to the instruction value generation unit 3001 via the communication control unit 3003. The instruction value generation unit 3001 also functions as the identifying unit that identifies the carriage 2001 and can identify the carriage 2001 stopped on the transport module 2110j located adjacent to the transport module 2110a based on the input ID information.

In the present embodiment, the transport order of the plurality of carriages 2001 is pre-stored in the storage unit 3002. The instruction value generation unit 3001 fixedly determines the transport order of the carriages 2001 stopped on the transport paths 3000 by verifying that the ID information input from the reader/writer 2108 is the ID information according to the transport order of the carriages 2001 stored in the storage unit 3002. Note that transport order of the plurality of carriages 2001 may be stored in a storage unit other than the storage unit 3002.

The control apparatus 2107 has a position feedback (FB) control unit 3071, a position determination unit 3074, a current FB control unit 3072, a drive amplifier unit 3073, a current detection unit 3075, and a communication control unit 3070. The control apparatus 2107 is connected to the armature 2104 at the drive amplifier unit 3073. The control apparatus 2107 controls the position of the carriage 2001 on the corresponding transport module 2110 in accordance with the instruction from the transport controller 2100.

The armature 2104 has a plurality of coils arranged so as to be driven by three-phase alternating current of the U-phase, the V-phase, and the W-phase. The plurality of coils forming the armature 2104 are wired so that the sum of the currents in the U-phase, the V-phase, and the W-phase is zero.

The position determination unit 3074 fixedly determines the position of the carriage 2001 on the transport module 2110. In detail, a signal indicating the position information from the position detection unit 2103 attached to the transport module 2110 is input to the position determination unit 3074. The position determination unit 3074 fixedly determines the position of the carriage 2001 on the transport module 2110 based on the signal input from the position detection unit 2103.

The communication control unit 3070 is connected to the transport controller 2100 and transmits and receives various control signals and various control data at predetermined timings to and from the transport controller 2100. Note that the communication control unit 3070 may be connected to the transport controller 2100 via the communication control unit 3070 of another control apparatus 2107 or may be directly connected to the transport controller 2100.

The position FB control unit 3071 compares the position of the carriage 2001 fixedly determined by the position determination unit 3074 with a signal of the position instruction value generated by the instruction value generation unit 3001. The position FB control unit 3071 outputs the comparison result to the current FB control unit 3072 as control information.

The current FB control unit 3072 compares control information input from the position FB control unit 3071 with a current value detected by the current detection unit 3075. The current FB control unit 3072 generates an instruction value of a current to be output to the drive amplifier unit 3073 in accordance with the comparison result and outputs the generated instruction value to the drive amplifier unit 3073.

Based on the instruction value input from the current FB control unit 3072, the drive amplifier unit 3073 converts the input instruction value into a three-phase alternating current instruction value of the U-phase, the V-phase, and the W-phase. The drive amplifier unit 3073 controls currents to be applied to the coils of respective phases of the connected armature 2104 based on the converted three-phase current instruction value.

The current detection unit 3075 measures the currents flowing in the coils of respective phases of the armature 2104 and inputs the measured current values to the current FB control unit 3072. Such current feedback control can further improve the response of the carriage 2001.

Each shift unit control apparatus 2112 is connected to the shift unit 2111 and performs operation control of the shift unit 2111. The shift unit control apparatus 2112 controls the shift unit 2111 with the same configuration as the control apparatus 2107. The shift unit control apparatus 2112 performs suitable operation control on the connected shift unit 2111 based on the control signal from the transport controller 2100.

Figure 21:
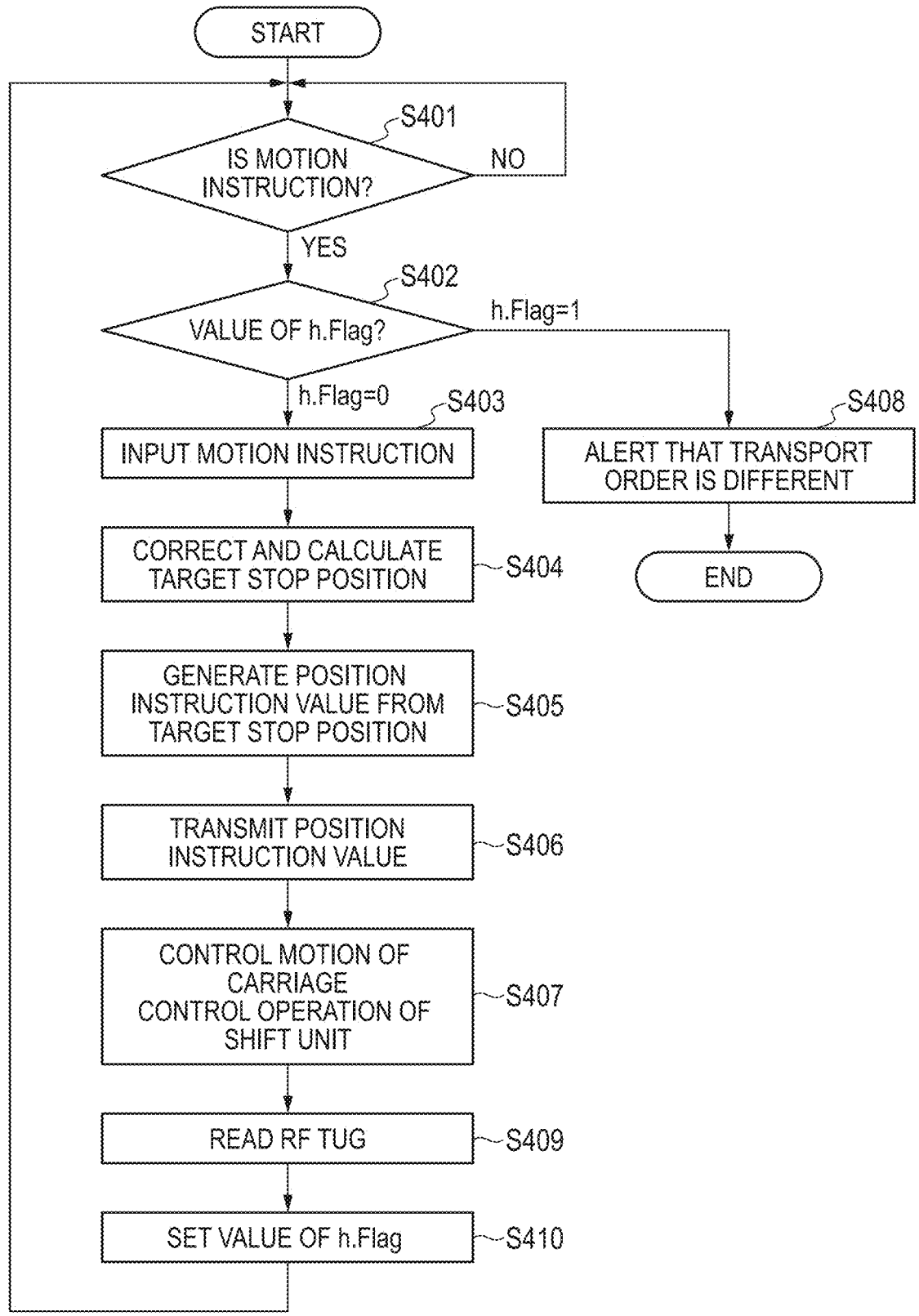
FIG. 21 is a flowchart illustrating transport control of a carriage in the transport system according to the fourth embodiment of the present invention.

Next, the transport control of the carriage 2001 performed by the transport system 2012 according to the present embodiment will be described in detail by using FIG. 21. FIG. 21 is a flowchart illustrating the transport control of the carriage 2001 performed by the transport system 2012 according to the present embodiment.

First, in step S401, the transport controller 2100 determines whether or not there is a motion instruction received from the process controller 2201. The motion instruction from the process controller 2201 is to instruct transporting and moving the carriage 2001. Workpiece type information that is information such as a symbol indicating the type of the workpiece 2005 to be transported is attached to the motion instruction from the process controller 2201. The workpiece type information indicating the type of the workpiece 2005 is information used for calculating a target stop position in step S404 described later.

If there is a motion instruction (step S401: Yes), the transport controller 2100 transfers to step S402 of referring to the value of h.Flag. If there is no motion instruction (step S401: No), the transport controller 2100 transfers to step S401 and enter a state of standing by for a motion instruction from the process controller 2201.

The h.Flag is a flag that has a value set to 0 or 1 in accordance with whether or not IDs of the carriages 2001 are in the transport order in step S410 described later. For example, the storage unit 3002 of the transport controller 2100 stores the h.Flag in the flag storage area thereof. Note that the storage unit that stores the h.Flag is not limited to the storage unit 3002 of the transport controller 2100 but may be any storage unit where the transport controller 2100 can refer to the value of h.Flag. The h.Flag with a value of 0 indicates that the carriages 2001 are in transport order, and the h.Flag with a value of 1 indicates that the carriages 2001 are not in transport order.

In step S402, based on the referenced value of h.Flag, the transport controller 2100 determines whether or not the carriages 2001 are in the transport order. If the carriages 2001 are in transport order (step S402: h.Flag=0), the transport controller 2100 transfers to step S403 of inputting the motion instruction from the process controller 2201. If the carriages 2001 are not in transport order (step S402: h.Flag=1), the process controller 2201 is alerted that the carriages 2001 are not in transport order (step S408), this flowchart ends.

In step S403, the transport controller 2100 inputs the motion instruction to the instruction value generation unit 3001. Next, in response to the motion instruction being input thereto, in step S404, the instruction value generation unit 3001 calculates a target stop position of the carriage 2001 to be controlled based on the motion error stored in the storage unit 3002.

Figure 22:
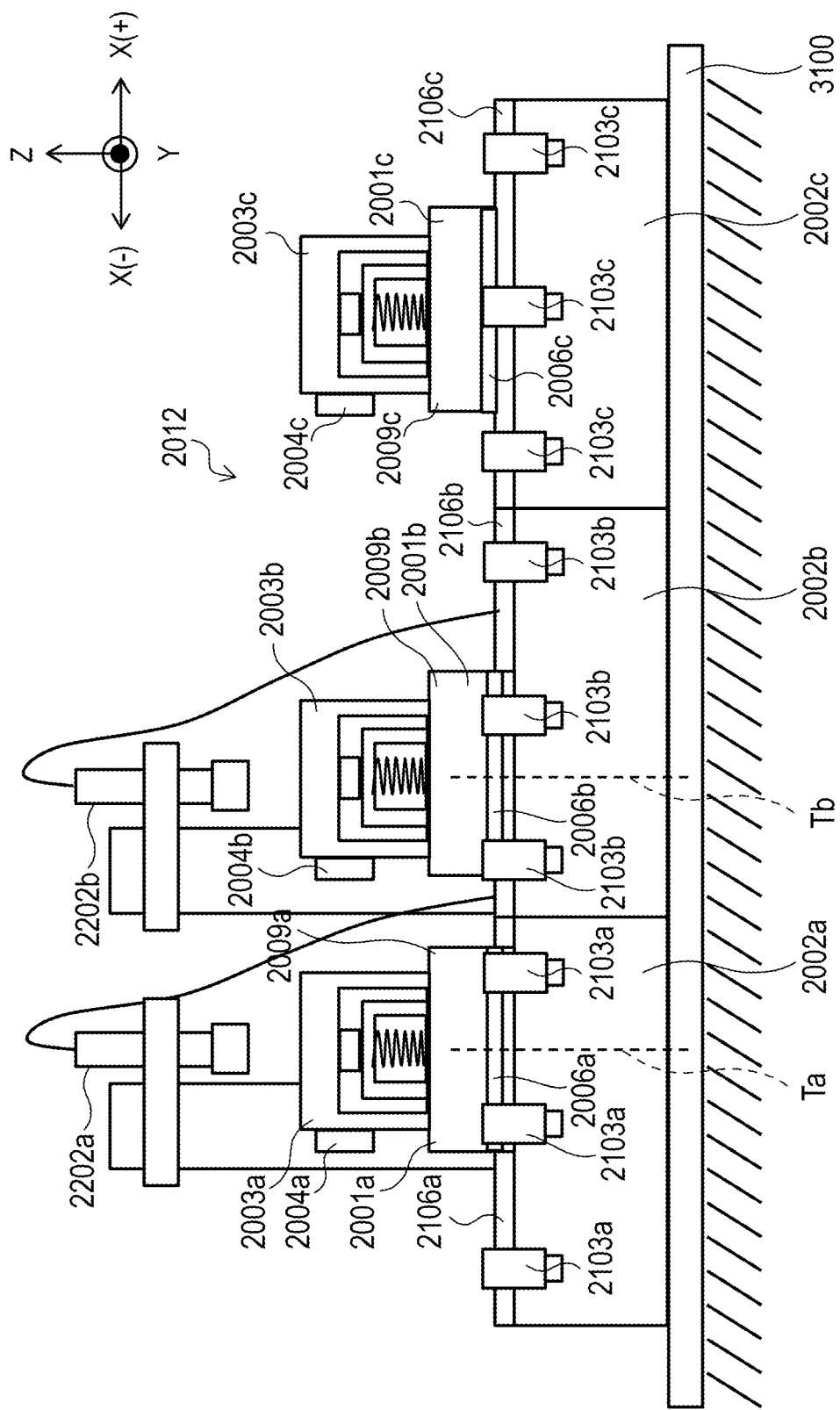
FIG. 22 is a schematic diagram illustrating the transport system and position measuring machines according to the fourth embodiment of the present invention.

The motion error used in calculation of a target stop position of the carriage 2001 will now be described by using FIG. 22 to FIG. 25. FIG. 22 is a schematic diagram illustrating the transport system and position measuring machines according to the present embodiment. FIG. 23A to FIG. 23D are schematic diagrams illustrating a motion error measured by the position measuring machine in the transport system according to the present embodiment. FIG. 24 is a schematic diagram illustrating a state after the motion error is corrected in the transport system according to the present embodiment. FIG. 25 is a schematic diagram illustrating an example of a motion error used for calculation of a target stop position in the transport system according to the present embodiment.

The motion error used in calculation of a target stop position of the carriage 2001 has been measured in advance by using a position measuring machine and stored in the storage unit 3002 of the transport controller 2100, for example. In measuring the motion error, as illustrated in FIG. 22, position measuring machines 2202 that are measuring length devices that measure a motion error of the carriage 2001 are installed to the transport system 2012. While the position measuring machine 2202 is not limited in particular as long as it can measure a distance between two points, a case where an industry camera is used as the position measuring machine 2202 will be described in the present embodiment.

Note that, while FIG. 22 illustrates two position measuring machines 2202a and 2202b, the number of position measuring machines is not limited to two. For a stop reference position where a process requiring an accurate stop operation is performed by the process apparatus 2200, the position measuring machines 2202 can be suitably installed to measure a motion error of the carriage 2001.

The position measuring machine 2202a is installed at a position where, with the carriage 2001a being stopped at a stop reference position Ta, a particular measuring position of the holding unit 2003a on the carriage 2001a measured by the position measuring machine 2202a is included in the viewing angle thereof. Further, the position measuring machine 2202b is installed at a position where a particular measuring position of the holding unit 2003b on the carriage 2001b measured by the position measuring machine 2202b is included in the viewing angle thereof with the carriage 2001b being stopped at a stop reference position Tb.

The stop reference positions Ta and Tb are stop positions of the carriage 2001 where the process apparatuses 2200a and 2200b process the workpiece 2005, respectively. The stop reference positions Ta and Tb are acquired in advance by adjusting, measuring, or the like the process apparatuses 2200a and 2220b, respectively, and stored in the storage unit 3002 of the transport controller 2100.

Each of the position measuring machines 2202 measures and acquires a motion error of the carriage 2001 based on a particular measuring position of the holding unit 2003 as a reference. The particular measuring position of the holding unit 2003 measured by the position measuring machine 2202 may be a position correlated with the position where the process apparatus 2200 processes the workpiece 2005 held by the holding unit 2003. Further, the position where measurement is performed by the position measuring machine 2202 is not limited to a particular measuring position of the holding unit 2003 but may be a particular measuring position of the workpiece 2005 held by the holding unit 2003. A particular measuring position of the workpiece 2005 as used herein may be a position correlated with a position where the process apparatus 2200 processes the workpiece 2005 held by the holding unit 2003, that is, a position correlated with a particular measuring position of the holding unit 2003. Since the motion error of the carriage 2001 is acquired based on a particular measuring position of the holding unit 2003 or a particular measuring position of the workpiece 2005 as a reference, the motion error of the carriage 2001 is acquired in accordance with the type of the holding unit 2003 or the type of the workpiece 2005.

Figure 23A:
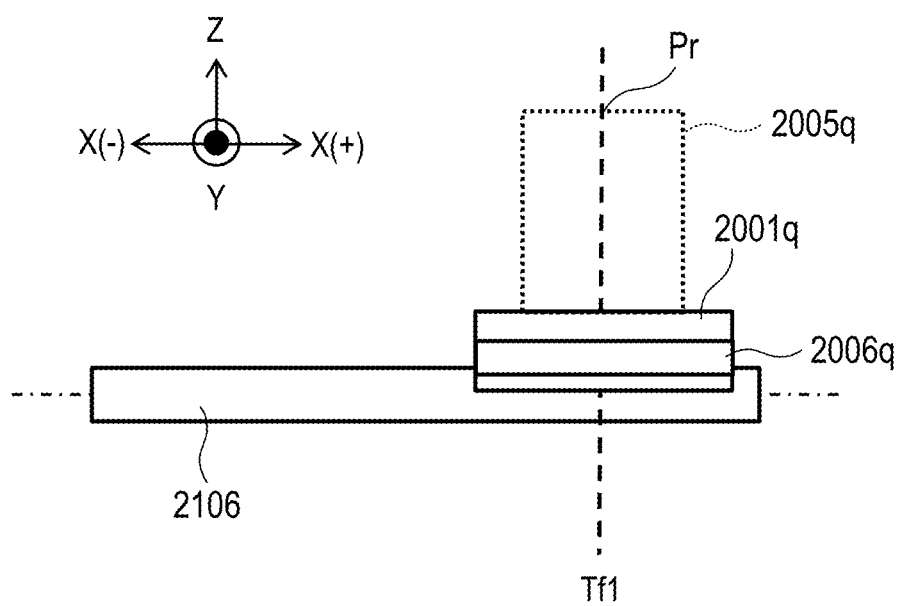
FIG. 23A is a schematic diagram illustrating a motion error measured by the position measuring machine in the transport system according to the fourth embodiment of the present invention.
Figure 23B:
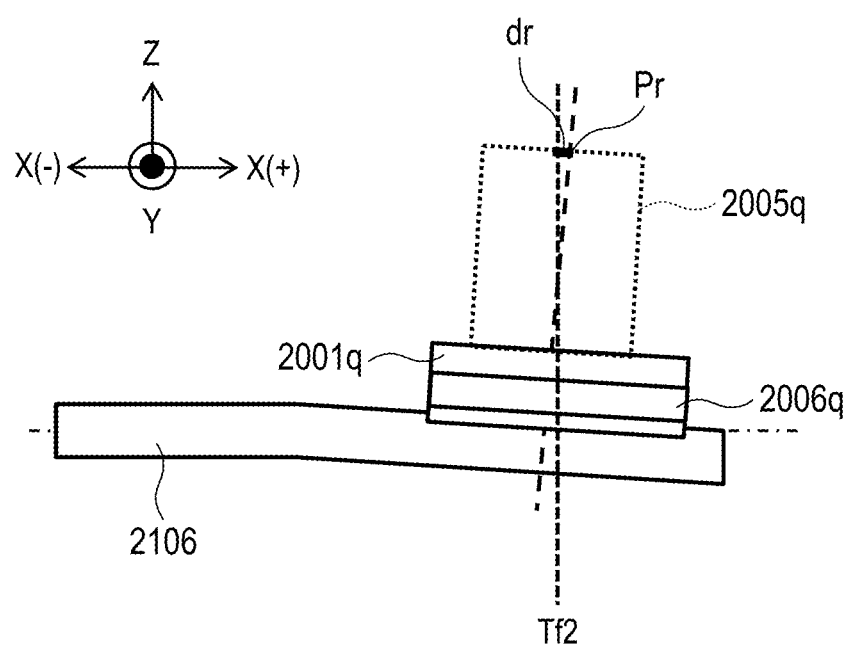
FIG. 23B is a schematic diagram illustrating a motion error measured by the position measuring machine in the transport system according to the fourth embodiment of the present invention.
Figure 23C:
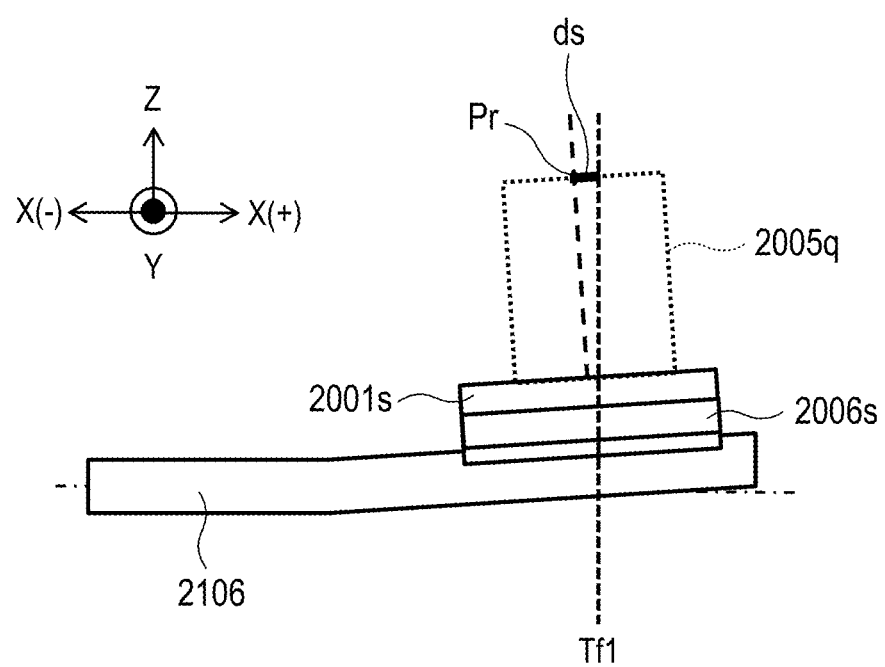
FIG. 23C is a schematic diagram illustrating a motion error measured by the position measuring machine in the transport system according to the fourth embodiment of the present invention.
Figure 23D:
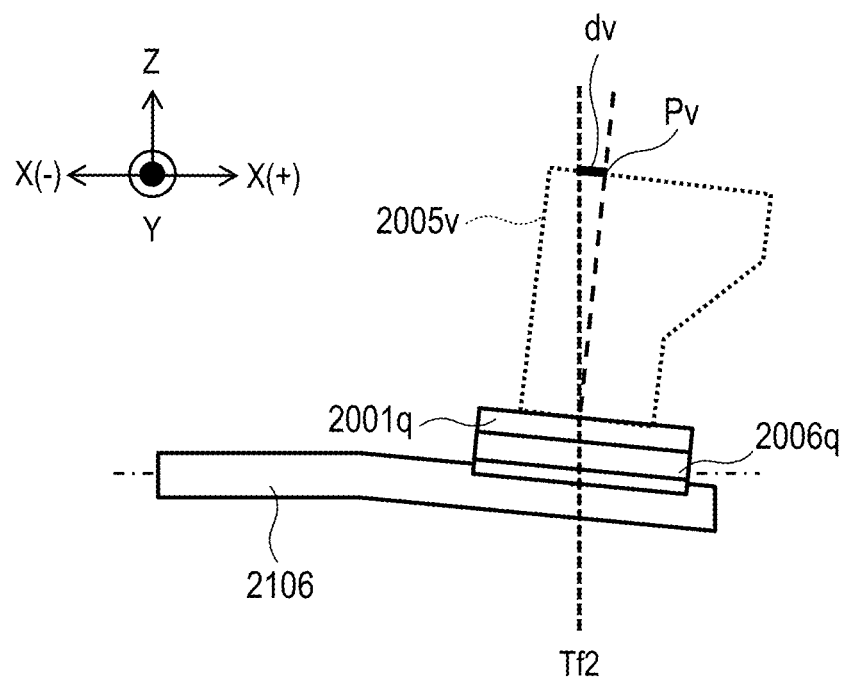
FIG. 23D is a schematic diagram illustrating a motion error measured by the position measuring machine in the transport system according to the fourth embodiment of the present invention.
Figure 24:
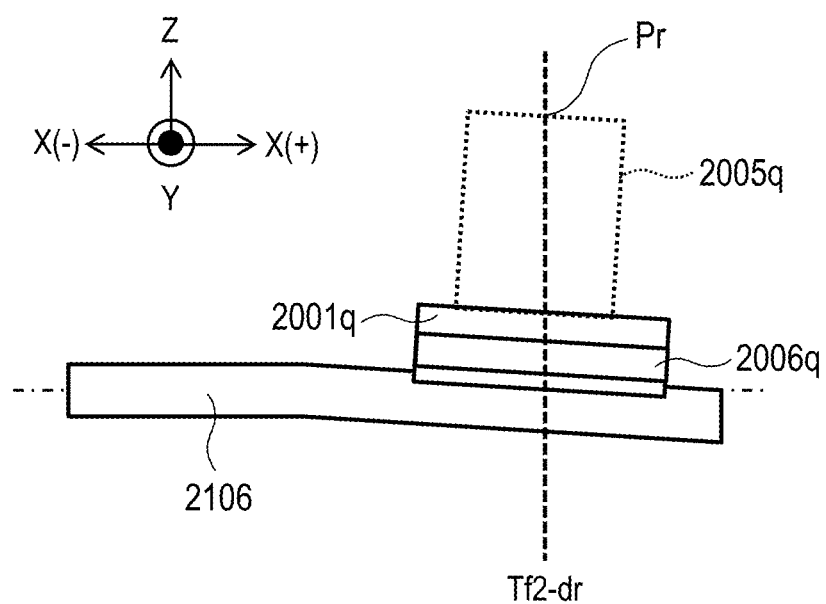
FIG. 24 is a schematic diagram illustrating a state after the motion error is corrected in the transport system according to the fourth embodiment of the present invention.

FIG. 23A to FIG. 23D are schematic diagrams illustrating the motion error measured by the position measuring machines 2202. As illustrated in FIG. 23A to FIG. 23D, the carriage 2001 moves along the guide 2106 attached to the transport module 2110. The guide 2106 is attached to the casing 2002, and gradient in a pitching direction may occur in the guide 2106 due to influence of a field system generated by the magnets 2007 and the armatures 2104 attached to the carriage 2001. FIG. 23A illustrates a state where no gradient occurs in the guide 2106. FIG. 23B to FIG. 23D illustrate states where gradient occurs in the pitching direction in the guide 2106.

For the carriage 2001 that moves along the guide 2106 in which gradient may occur as described above, motion control is performed by the control apparatuses 2107 provided to the transport modules 2110, respectively. In the motion control of the carriage 2001, position information of the scale 2006 attached to the carriage 2001 is read by the position detection unit 2103 of the transport module 2110, and the position of the carriage 2001 is controlled based on the position information. The motion control of the carriage 2001 is performed in such a way, and thereby a carriage 2001$q$ or 2001$s$ is stopped at a stop reference position Tf1 or Tf2 in FIG. 23A to FIG. 23D. Further, a workpiece 2005$q$ or 2005$v$ of different types from each other is held on the carriage 2001$q$ or 2001$s$.

The stop reference positions Tf1 and Tf2 are stop positions of the carriage 2001 where the corresponding process apparatuses 2200 process the workpiece 2005, respectively. The stop reference positions Tf1 and Tf2 are pre-stored in the storage unit 3002 of the transport controller 2100 after adjustment or measurement of the process apparatuses 2200 or the like, respectively.

There is a processing position Pr on the workpiece 2005$q$. The processing position Pr is a position where the corresponding process apparatus 2200 processes the workpiece 2005$q$. Further, there is a processing position Pv on the workpiece 2005$v$. The processing position Pv is a position where the corresponding process apparatus 2200 processes the workpiece 2005$v$.

FIG. 23A illustrates a state where the carriage 2001$q$ holding the workpiece 2005$q$ is stopped at the stop reference position Tf1. In this state, since no gradient occurs in the guide 2106, the processing position Pr of the workpiece 2005$q$ has no position shift relative to the stop reference position Tf1. With such an ideal state where the processing position Pr has no position shift relative to the stop reference position Tf1 as discussed above, processing by the process apparatus 2200 can be started on the workpiece 2005$q$ immediately after the carriage 2001$q$ is stopped at the stop reference position Tf1 without needing adjustment of the position of the process apparatus 2200.

FIG. 23B illustrates a state where the carriage 2001$q$ holding the workpiece 2005$q$ is stopped at the stop reference position Tf2. The stop reference position Tf2 is a different stop position from the stop reference position Tf1. In this state, gradient occurs in the pitching direction in the guide 2106. Thus, the processing position Pr of the workpiece 2005$q$ is in a state where a position shift occurs by dr relative to the stop reference position Tf2 in the X-direction. In this way, in FIG. 23B, even with the same carriage 2001$q$ as in the case illustrated in FIG. 23A, the position shift dr occurs in the processing position Pr of the workpiece 2005$q$ due to the difference in the stop reference position.

Therefore, in the case illustrated in FIG. 23B, the position measuring machine 2202 measures the position shift dr of the processing position Pr relative to the stop reference position Tf2. The measured position shift dr results in a motion error of the carriage 2001$q$ when the carriage 2001$q$ holding the workpiece 2005$q$ is stopped at the stop reference position Tf2. The motion error dr acquired in such a way is based on the processing position Pr as a reference that is a particular position of the workpiece 2005$q$ on the carriage 2001$q$.

FIG. 23C illustrates a state where the carriage 2001$s$ holding the workpiece 2005$q$ is stopped at the stop reference position Tf1. The carriage 2001$s$ is a different carriage from the carriage 2001$q$. In this state, gradient occurs in the pitching direction in the guide 2106. Thus, the processing position Pr of the workpiece 2005$q$ is in a state where a position shift occurs by ds relative to the stop reference position Tf1 in the X-direction. In this way, in FIG. 23C, even with the same stop reference position Tf1 as in the case illustrated in FIG. 23A, the position shift ds occurs in the processing position Pr of the workpiece 2005$q$ due to the difference in the carriage 2001.

Therefore, in the case illustrated in FIG. 23C, the position measuring machine 2202 measures the position shift ds of the processing position Pr relative to the stop reference position Tf1. The measured position shift ds results in a motion error of the carriage 2001$s$ when the carriage 2001$s$ holding the workpiece 2005$q$ is stopped at the stop reference position Tf1. The motion error ds acquired in such a way is based on the processing position Pr as a reference that is a particular position of the workpiece 2005$q$ on the carriage 2001$s$.

FIG. 23D illustrates a state where the carriage 2001$q$ holding the workpiece 2005$v$ is stopped at the stop reference position Tf2. The workpiece 2005$v$ is a different type of workpiece from the workpiece 2005$q$. In this state, gradient occurs in the pitching direction in the guide 2106. Thus, the processing position Pv of the workpiece 2005$v$ is in a state where a position shift occurs by dv relative to the stop reference position Tf2 in the X-direction. In this way, in FIG. 23D, even with the same carriage 2001$q$ and the same stop reference position Tf2 as in the case illustrated in FIG. 23B, the position shift dv that is different from the position shift dr occurs in the processing position Pv of the workpiece 2005$v$ due to the difference in the type of workpiece.

Therefore, in the case illustrated in FIG. 23D, the position measuring machine 2202 measures the position shift dv of the processing position Pv relative to the stop reference position Tf2. The measured position shift dv results in a motion error of the carriage 2001$q$ when the carriage 2001$q$ holding the workpiece 2005$v$ is stopped at the stop reference position Tf2. The motion error dv acquired in such a way is based on the processing position Pv as a reference that is a particular position of the workpiece 2005v on the carriage 2001q.

The motion errors dr, ds, and dv measured by the position measuring machine 2202 as described above are recorded by the measuring person and then registered and stored in the storage unit 3002 of the transport controller 2100. Note that a scheme of storing the motion error in the storage unit 3002 is not limited thereto, and other schemes may be used. For example, the position measuring machine 2202 is communicably connected to the transport controller 2100 and has a function of transmitting and receiving data to and from the transport controller 2100. In this case, the position measuring machine 2202 directly registers and stores the measured motion errors dr, ds, and dv in the storage unit 3002 of the transport controller 2100.

By using the motion error measured as described above to correct and calculate a target stop position, it is possible to suppress a position shift of the processing position of the workpiece 2005 relative to the process apparatus 2200. FIG. 24 illustrates a state where the carriage 2001q is stopped at a target stop position Tf2−dr corrected and calculated by using the motion error dr measured in FIG. 23B.

In FIG. 23B, the processing position Pr of the workpiece 2005q is in a state where a position shift occurs by dr in the positive direction in the X-direction relative to the stop reference position Tf2. Therefore, correction of the target stop position of the carriage 2001q to Tf2−dr allows the processing position Pr to be in a state of no position shift relative to the process apparatus 2200 as illustrated in FIG. 24.

The motion error measured as described above is stored in the storage unit 3002 of the transport controller 2100. FIG. 25 illustrates an example of motion error data stored in the storage unit 3002. A plurality of motion errors are measured and acquired in accordance with the type of the workpiece 2005 and the stop reference position of the carriage 2001 for the plurality of carriages 2001, respectively, as described above. Therefore, as illustrated in FIG. 25, the motion error is stored in association with a carriage ID that is identification information used for identifying a corresponding carriage 2001, a workpiece type indicating the type of a corresponding workpiece 2005, and a corresponding stop reference position.

The target stop position of the carriage 2001 where the carriage 2001 is stopped relative to the process apparatus 2200 is corrected and calculated by using the motion errors in accordance with the carriage ID, the stop reference position, and the type of workpiece to be transported by the carriage 2001.

For example, from the motion error data illustrated in FIG. 25, when the carriage 2001 having the type of the workpiece 2005 to be transported of "q" and the carriage ID of "2001a" is stopped at the stop reference position "Tf3", the target stop position of the carriage 2001 is Tf3−8 (μm).

Similarly, when the carriage 2001 having the type of the workpiece 2005 to be transported of "q" and the carriage ID of "2001b" is stopped at the stop reference position "Tf2", the target stop position of the carriage 2001 is Tf2+6 (μm). Further, when the carriage 2001 having the type of the workpiece 2005 to be transported of "q" and the carriage ID of "2001c" is stopped at the stop reference position "Tf1", the target stop position of the carriage 2001 is Tf1+1 (μm).

The control apparatus 2107 stops the carriage 2001 not at the stop reference position but at the target stop position calculated as described above on the corresponding transport module 2110. This can suppress a position shift of the processing position of the workpiece 2005 relative to the process apparatus 2200.

Turning back to FIG. 21, in step S404, the instruction value generation unit 3001 of the transport controller 2100 corrects and calculates a target stop position by using the motion error. At this time, as described above, for the carriage 2001 to be controlled, the instruction value generation unit 3001 selects a particular motion error from a plurality of motion errors in accordance with the type of workpiece 2005 and the stop reference position and uses the selected motion error to correct and calculate the target stop position. Note that, when a target stop position is corrected and calculated, not the motion error itself but processed data obtained by performing a predetermined process on the motion error may be used.

Next, in step S405, for the transport paths 3000, the instruction value generation unit 3001 generates a position instruction value from the target stop position of the carriage 2001 to be controlled. Further, for the shift units 2111, the instruction value generation unit 3001 generates a position instruction value from the target stop position of the transport module 2110 on the shift units 2111 used for transferring the carriage 2001 between the transport path 3000a and the transport path 3000b.

Next, in step S406, the transport controller 2100 transmits the position instruction value generated in step S405 to the control apparatus 2107. Similarly, the transport controller 2100 transmits the position instruction value generated in step S405 to the shift unit control apparatus 2112.

Next, in step S407, based on the position instruction value transmitted from the transport controller 2100, the control apparatus 2107 controls the motion of the carriage 2001 to be controlled. Further, based on the position instruction value transmitted from the transport controller 2100, the shift unit control apparatus 2112 controls the operation of the shirt unit 2111 to be controlled. In such a way, the carriage 2001 is stopped at the target stop position.

As discussed above, the control apparatus 2107 controls the position of the carriage 2001 in accordance with a position instruction value corresponding to a target stop position calculated by using a motion error based on a particular position of the workpiece 2005 as a reference and stops the carriage 2001 at the target stop position. That is, the control apparatus 2107 controls the position of the carriage 2001 in accordance with the motion error based on a particular position of the workpiece 2005 as a reference.

Next, in step S409, the reader/writer 2108 reads ID information from the RF tug 2004 of the carriage 2001 stopped on the transport module 2110j in a workpiece supply process.

Next, in step S410, the transport controller 2100 sets and updates the value of h.Flag in accordance with whether or not the carriages 2001 are in the transport order based on the ID information read in step S409. That is, the transport controller 2100 compares the ID information of the carriage 2001 read in step S409 with the transport order of the carriages 2001 stored in the storage unit 3002. According to a result of comparison, the value of h.Flag is set to 0 if the ID information of the carriage 2001 read in step S409 matches the transport order, and the value of h.Flag is set to 1 if the ID information of the carriage 2001 read in step S409 does not match the transport order.

Subsequently, the process transfers from step S410 to step S401, if necessary, and continues the transport control of the carriage 2001.

As discussed above, according to the present embodiment, a motion error is measured and acquired in advance in accordance with the stop reference position of the carriage 2001 and the type of the workpiece 2005 or the holding unit 2003 for each of the plurality of carriages 2001. The motion error in accordance with the stop reference position of the carriage 2001 and the type of the workpiece 2005 or the holding unit 2003 is used to correct and calculate the target stop position of the carriage 2001, and the position of the carriage 2001 is controlled based thereon. Therefore, according to the present embodiment, the workpiece 2005 transported by the carriage 2001 can be stopped and positioned to the process apparatus 2200 with high accuracy.

Further, in the present embodiment, since the motion error of the carriage 2001 is measured for a particular measuring position of the holding unit 2003, an association error of the holding unit 2003 with respect to the carriage 2001 can also be corrected together.

Furthermore, the motion error may be measured for only the stop position in a process requiring an accurate stop operation. Thus, in the present embodiment, a smaller amount of measured data allows for easier management than in the correction scheme of using a motion error obtained by measuring at regular intervals in the whole area of the transport paths.

Further, unlike a correction scheme of using a motion error obtained by measuring at regular intervals in the whole area of the transport paths, the present embodiment uses the motion error measured at a stop reference position of the carriage 2001 for correction. Therefore, in the present embodiment, the carriage 2001 can be stopped with higher accuracy without correction error.

As discussed above, according to the present embodiment, in the transport system 2012 that transports a plurality of carriages 2001, it is not necessary to provide a mechanism that re-adjusts the positioning on the process apparatus 2200 side, and it is possible to accurately position the workpiece 2005 to the process apparatus 2200. Therefore, according to the present embodiment, the cost of the manufacturing line apparatuses forming the processing system 2010 including the process apparatus 2200 and the transport system 2012 can be significantly reduced.

Further, according to the present embodiment, the time taken for readjustment of the positioning on the process apparatus 2200 side is eliminated, which can also significantly improve productivity for products produced in the manufacturing line using the processing system 2010 including the transport system 2012.

As described above, according to the present embodiment, it is possible to easily improve positioning accuracy based on a workpiece as a reference and accurately position the workpiece 2005 to the process apparatus 2200 without performing adjustment on the position in the process apparatus 2200.

Fifth Embodiment

Figure 26:
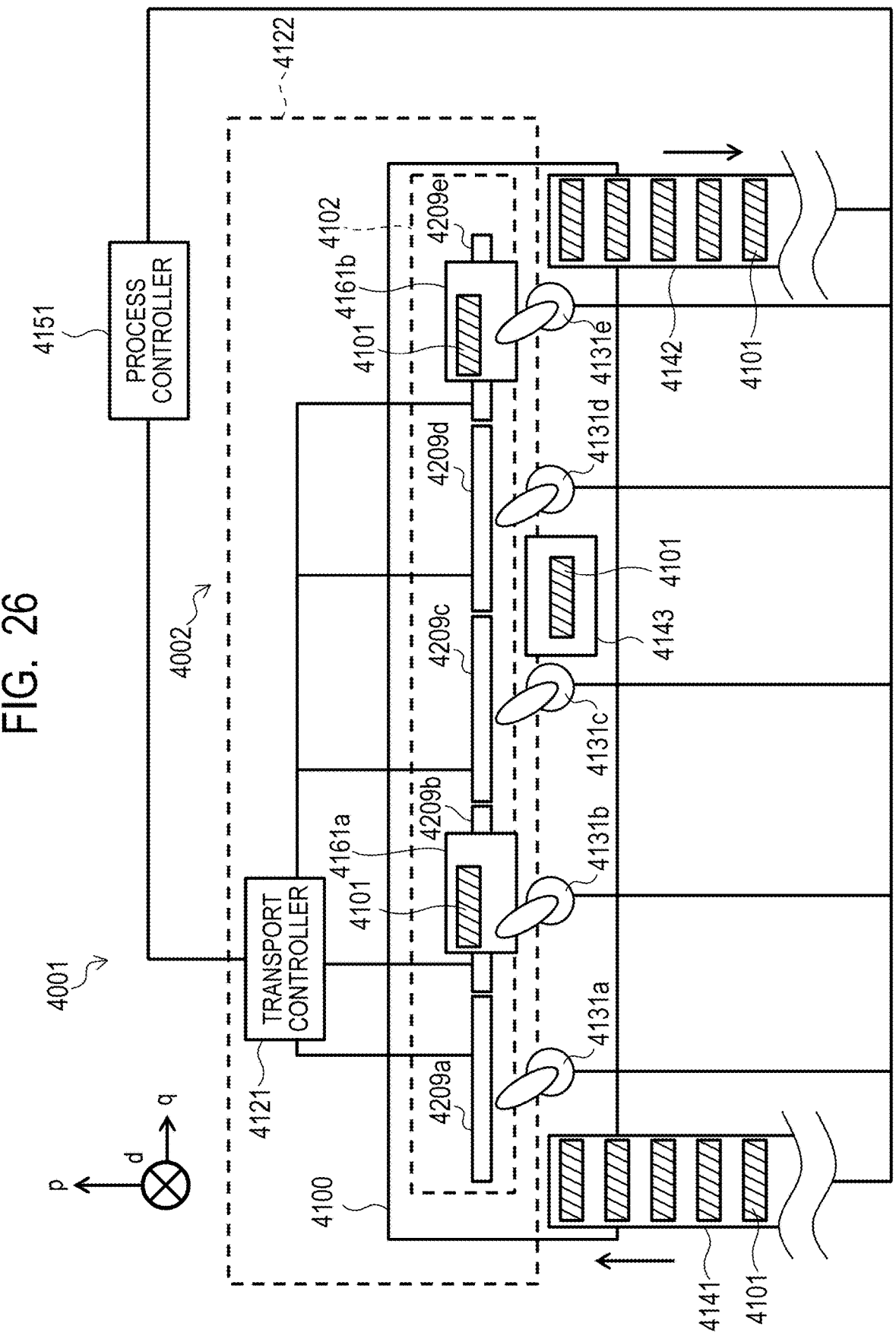
FIG. 26 is a schematic diagram illustrating the entire configuration of a processing system including a transport system according to a fifth embodiment of the present invention.

A fifth embodiment of the present invention will be described by using FIG. 26 to FIG. 30. First, the entire configuration of a processing system including a transport system according to the present embodiment will be described by using FIG. 26. FIG. 26 is a schematic diagram illustrating the entire configuration of the processing system including the transport system according to the present embodiment.

As illustrated in FIG. 26, a processing system 4001 according to the present embodiment has a transport path 4102, carriages 4161, process apparatuses 4131, a transport controller 4121, and a process controller 4151. The processing system 4001 has a transport system 4002 that transports a workpiece 4101 to be processed. The transport system 4002 has the transport path 4102, the carriages 4161, and the transport controller 4121. FIG. 26 illustrates two carriages 4161a and 4161b as the carriages 4161. Further, the process apparatuses 4131 are illustrated as five process apparatuses 4131a, 4131b, 4131c, 4131d, and 4131e.

The transport system 4002 having the transport path 4102 and the carriage 4161 is a transport system with a movable magnet-type linear motor (moving magnet-type linear motor, a movable field system type linear motor). The transport path 4102 is placed on a frame 4100. The transport path 4102 is a straight path, for example. The carriage 4161 moves along the transport path 4102. Note that, while the two carriages 4161a and 4161b are illustrated in FIG. 26, the number of carriages 4161 is not limited to two and may be one or more. Further, the transport path 4102 is not limited to a straight path, and any form of path may be employed.

The transport path 4102 is formed of a plurality of transport modules 4209. FIG. 26 illustrates five transport modules 4209a, 4209b, 4209c, 4209d, and 4209e installed aligned in series from the upstream side to the downstream side in the transport direction of the workpiece 4101 as the transport modules 4209. A workpiece supply apparatus 4141 is installed near the upstream-side transport module 4209a. Further, a workpiece output apparatus 4142 is installed near the downstream-side transport module 4209e. Note that, the number of the transport modules 4209 is not limited to five and may be one or more.

The transport module 4209 is communicably connected to the transport controller 4121 and can transmit and receive information on transport of the carriage 4161 to and from the transport controller 4121. The transport controller 4121 controls transport of the carriage 4161 by the transport module 4209. Thereby, the carriage 4161 can travel freely on the transport path 4102. The transport controller 4121 and the transport module 4209 configure a carriage transport system 4122 for transporting the carriage 4161 in the transport system 4002.

The coordinate axes in the processing system 4001 will now be defined. First, a q-axis is defined as the transport direction of the carriage 4161 transported horizontally. Further, a d-axis is defined as a direction orthogonal to both a direction in which the coil unit 4207 faces the permanent magnets 4221 (see FIG. 27B) of the carriage 4161 and the moving direction of the carriage 4161, specifically, the perpendicular direction. Further, a p-axis is defined as a direction orthogonal to both the q-axis and the d-axis.

The carriage 4161 has a workpiece holder (not illustrated) that holds a workpiece, for example, and transports the workpiece 4101 while holding the workpiece 4101 placed on the workpiece placement surface by using the workpiece holder. The carriage 4161 can have a workpiece holder or a workpiece placement surface compatible to the shape or the like of the placed workpiece 4101.

The workpiece supply apparatus 4141 supplies a workpiece 4101 to the transport path 4102. The process apparatus 4131a adjacent to the workpiece supply apparatus 4141 picks out a workpiece 4101 from the workpiece supply apparatus 4141 and places the picked out workpiece 4101 on the carriage 4161 stopped on the transport path 4102.

The process apparatuses 4131b, 4131c, and 4131d perform predetermined processing on the workpieces 4101 transported by the carriages 4161a and 4161b, respectively. After placed on the carriage 4161, the workpiece 4101 is transported by the carriage 4161 and sequentially processed by the process apparatuses 4131b, 4131c, and 4131d. In such a way, processing is applied to the workpiece 4101 by the process apparatuses 4131b, 4131c, and 4131d, thereby the workpiece 4101 is processed, and articles such as electronic devices and the like are manufactured.

The workpiece 4101 on which processing is finished is placed on the workpiece output apparatus 4142 by the process apparatus 4131e adjacent to the workpiece output apparatus 4142. The workpiece output apparatus 4142 outputs the workpiece 4101 placed by the process apparatus 4131e to the outside.

A table 4143 is installed between the process apparatus 4131c and the process apparatus 4131d. The table 4143 may be used by the process apparatuses 4131c and 4131d to temporarily place the workpiece 4101 thereon. The process apparatus 4131 may perform processing on the workpiece 4101 placed on the carriage 4161 in a state of being placed on the carriage 4161 or may once evacuate the workpiece 4101 to the table 4143 and then perform processing on the table 4143. The process apparatus 4131 performs various process operations. For example, the process apparatus 4131 performs assembly of another component, application of an adhesive agent, detachment of a component, inspection, irradiation with a light beam, or the like, for example, on the workpiece 4101.

The process controller 4151 is communicably connected to a plurality of process apparatuses 4131 and the workpiece supply apparatus 4141 and the workpiece output apparatus 4142. Further, the process controller 4151 is communicably connected to the transport controller 4121. The process controller 4151 can control the entire operations of supplying, transport, processing, and output of the workpieces 4101 by being connected to the transport controller 4121, the process apparatus 4131, the workpiece supply apparatus 4141, and the workpiece output apparatus 4142 as described above.

Figure 27A:
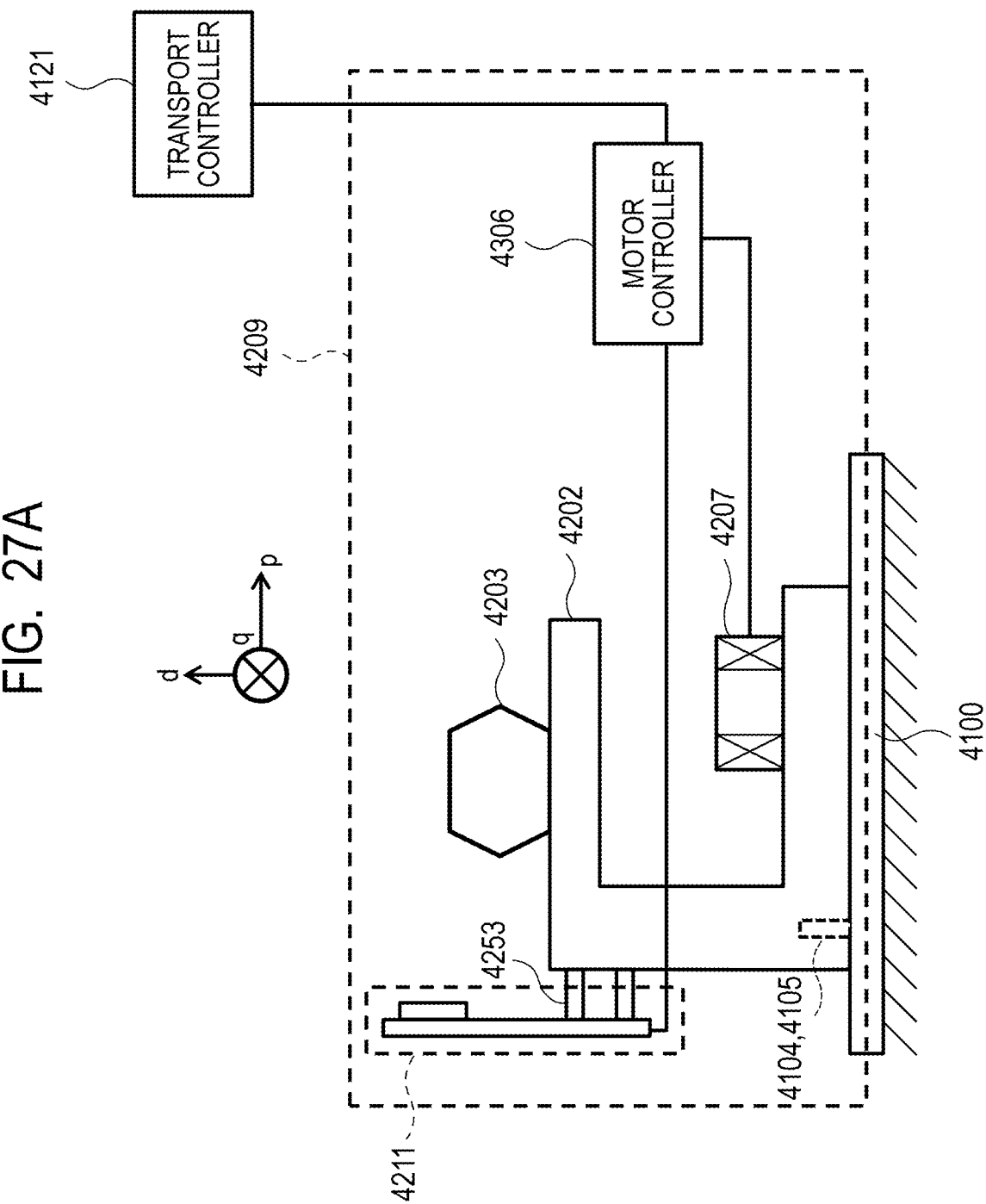
FIG. 27A is a schematic diagram illustrating a configuration of the transport module according to the fifth embodiment of the present invention.
Figure 27B:
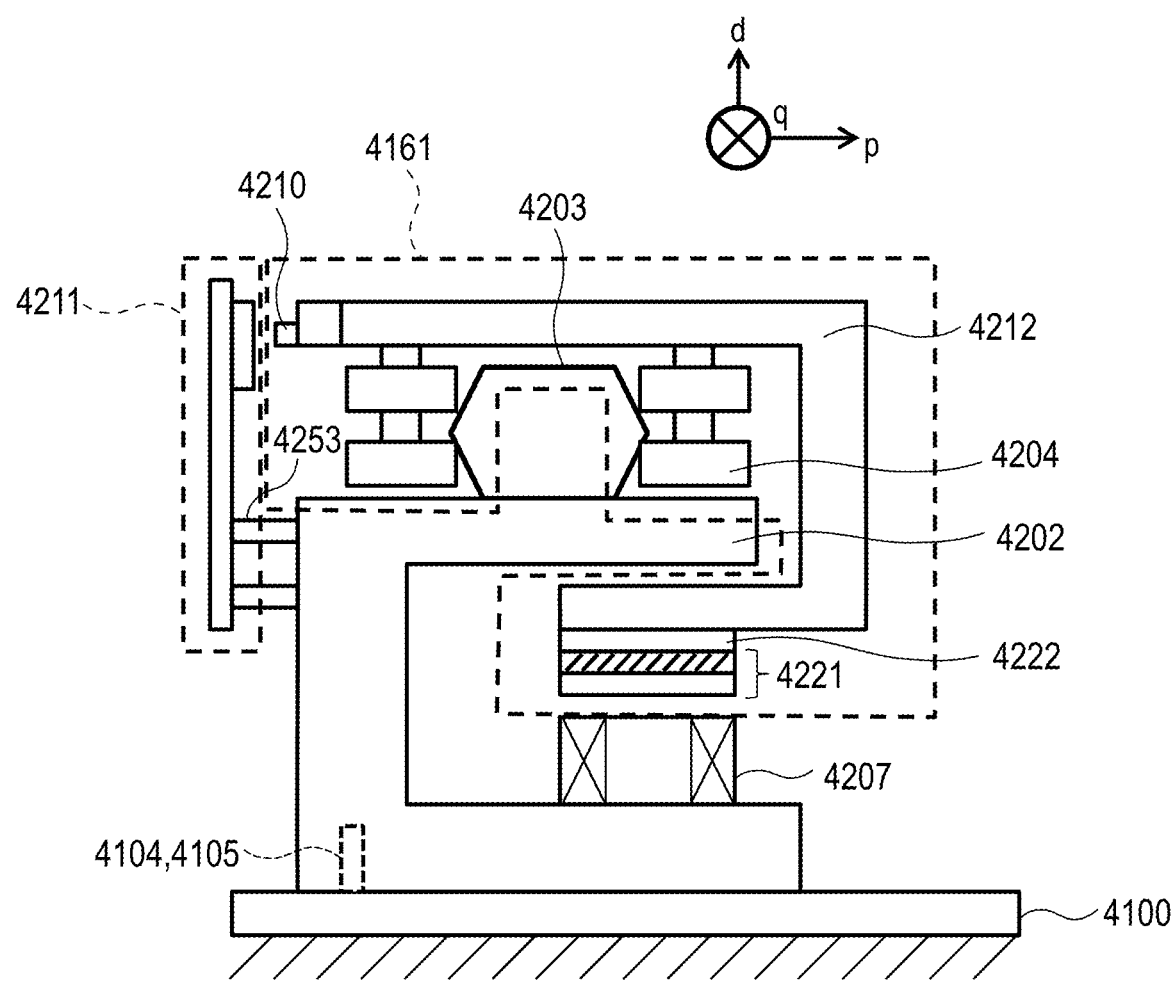
FIG. 27B is a schematic diagram illustrating a configuration of the transport module according to the fifth embodiment of the present invention.

FIG. 27A and FIG. 27B are schematic diagrams illustrating the configurations of the transport module 4209. FIG. 27A is a diagram of the transport module 4209 when viewed from the q-axis direction. FIG. 27B is a diagram of the transport module 4209 in addition to the carriage 4161 when viewed from the q-axis direction.

As illustrated in FIG. 27A and FIG. 27B, the transport module 4209 has a casing 4202, a guiderail 4203, a coil unit 4207, an encoder bracket 4253, an encoder 4211, and a motor controller 4306.

The casing 4202 is fixedly installed on the frame 4100. The encoder 4211 is attached to the casing 4202 via an encoder bracket 4253. Further, the coil unit 4207 is attached to the casing 4202. The encoder 4211 and the coil unit 4207 are communicably connected to the motor controller 4306. The motor controller 4306 is communicably connected to the transport controller 4121.

Further, the guiderail 4203 is attached to the casing 4202. As described in FIG. 27B, the carriage 4161 is arranged on the guiderail 4203 so as to be movable along the guiderail 4203.

Further, a fitting hole 4105 into which a positioning pin 4104 of the frame 4100 is fitted is provided in the bottom face of the casing 4202. The fitting hole 4105 is a positioning reference for positioning the transport module 4209 with respect to the frame 4100 on which the transport module 4209 is installed. Further, the positioning pin 4104 of a measuring jig 4232 described later is fitted into the fitting hole 4105.

The encoder 4211 reads the value of the scale 4210 of the carriage 4161 described later and outputs information on the relative positional relationship between the encoder 4211 and the scale 4210. The encoder 4211 transmits the output information to the motor controller 4306.

The coil unit 4207 is formed of a group of coils which is an assembly of a plurality of coils. A plurality of coil units 4207 are arranged along the transport path 4102 in the transport module 4209. The carriage 4161 is configured to be movable along the plurality of coils of the coil unit 4207. The coil unit 4207 is communicably connected to the motor controller 4306.

The motor controller 4306 functions as a control unit that controls the position of the carriage 4161 on the corresponding transport module 4209 to which the motor controller 4306 is provided. Note that a plurality of motor controllers 4306 may be provided corresponding to the plurality of transport modules 4209 so as to be able to control the position of the carriage 4161 on the corresponding transport module 4209 of the plurality of transport modules 4209.

The motor controller 4306 calculates a position of the carriage 4161 on the transport module 4209 based on information output from the encoder 4211. The motor controller 4306 transmits the carriage position information that is information on the calculated position of the carriage 4161 to the transport controller 4121.

The transport controller 4121 transmits an instruction for controlling the carriage 4161 to the motor controller 4306 based on the carriage position information transmitted from the motor controller 4306. The motor controller 4306 applies a current to the coil unit 4207 in accordance with the instruction transmitted from the transport controller 4121 based on the calculated carriage position information. A current is applied to the coil units 4207, and thereby a permanent magnet 4221 provided on the carriage 4161 receives electromagnetic force as drive force from the coil unit 4207. In such a way, the carriage 4161 acquires driving force and is transported. The motor controller 4306 controls the position of the carriage 4161 on the transport module 4209 by controlling the current applied to the coil unit 4207.

As illustrated in FIG. 27B, the carriage 4161 has a bearing 4204, a scale 4210, a carriage top plate 4212, a core 4222, and a permanent magnet 4221. The bearing 4204, the scale 4210, the core 4222, and the permanent magnet 4221 are attached to the carriage top plate 4212.

The bearing 4204 is attached to the under face of the carriage top plate 4212. The bearing 4204 is configured to be able to roll on and travel along the guiderail 4203. The carriage top plate 4212 to which the bearing 4204 is attached can move along the guiderail 4203 by using the bearing 4204.

The scale 4210 configures a linear scale and is attached to the side face of the carriage top plate 4212 such that it can be read by the encoder 4211 of the transport module 4209. The encoder 4211 of the transport module 4209 reads the scale 4210, detects the relative position of the scale 4210 with respect to the encoder 4211, and detects the relative position of the carriage 4161 with respect to the encoder 4211.

A plurality of permanent magnets 4221 are attached to the under face of the carriage top plate 4212 via the core 4222 so as to be able to face a plurality of coils of the coil unit 4207 in the transport module 4209. The plurality of permanent magnets 4221 are arranged such that the polarity on the side of the coil unit 4207 alternates along the transport direction of the carriage 4161. The core 4222 is a metal that primarily includes a substance having a large magnetic permeability.

The top face of the carriage top plate 4212 is a workpiece placement surface on which the workpiece 4101 is placed. A workpiece holder that holds the workpiece 4101 placed on the workpiece placement surface is provided if necessary on the top of the carriage top plate 4212.

Figure 28:
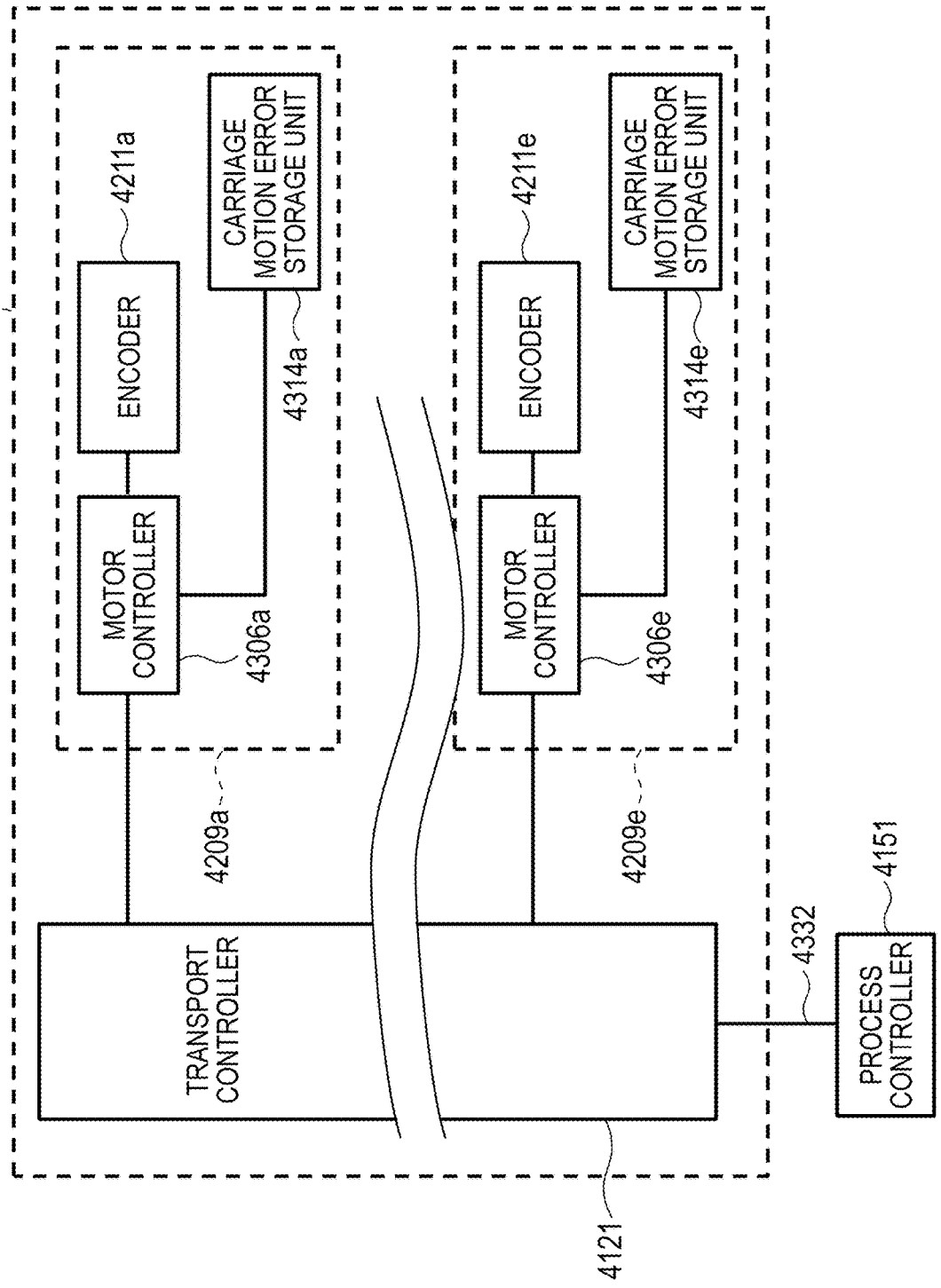
FIG. 28 is a block diagram illustrating the configuration of a carriage transport system according to the fifth embodiment of the present invention.

FIG. 28 is a schematic diagram illustrating the configuration of the carriage transport system 4122 that transports the carriage 4161. As illustrated in FIG. 28, the carriage transport system 4122 has a plurality of transport modules 4209 (4209a, . . . , 4209e) and a transport controller 4121.

The transport controller 4121 is communicably connected to the process controller 4151. The process controller 4151 transmits, to the transport controller 4121, carriage group transport information 4332 required for transporting a plurality of carriages 4161.

The carriage position information on the position of the carriage 4161 is transmitted from the motor controller 4306 of the transport module 4209 to the transport controller 4121. The transport controller 4121 transmits an instruction for controlling the carriage 4161 to the motor controller 4306 of the transport module 4209 based on the carriage group transport information 4332 transmitted from the process controller 4151 and the carriage position information transmitted from the motor controller 4306.

The transport module 4209 has a carriage motion error storage unit 4314 in addition to the encoder 4211, the motor controller 4306, and the like described above.

The carriage moving error storage unit 4314 stores a carriage motion error specific to each of the individual transport modules 4209 which is a carriage motion error for each transport module 4209. The carriage motion error is a motion error related to the moving carriage 4161 and is defined as described later. Further, the carriage motion error is measured in advance and stored in the carriage motion error storage unit 4314 as described later.

The transport controller 4121 transmits an instruction used for controlling the carriage 4161 to the motor controller 4306 of each transport module 4209 based on the carriage position information transmitted from the motor controller 4306. In accordance with the instruction transmitted from the transport controller 4121, the motor controller 4306 applies a current to the coil unit 4207 to control the coil unit 4207 in each transport module 4209 based on the calculated carriage position information. The coil unit 4207 is a drive source that drives the carriage 4161 by applying electromagnetic force to the permanent magnet 4221 of the carriage 4161.

Further, in each transport module 4209, the motor controller 4306 controls the coil unit 4207 by using the carriage motion errors specific to that transport module 4209. The carriage motion error of each transport module stored in the carriage motion error storage unit 4314 and a control method of the position of the carriage 4161 based on the carriage motion error will be described below.

First, the following Equation (10) is established, where the designed attachment position of the encoder 4211 in the transport module 4209 is denoted as E, the relative position of the carriage 4161 to the encoder 4211 is denoted as dX, and the position of the carriage 4161 calculated based on information of the encoder 4211 is denoted as Y.

$$Y=E+dX \quad (10)$$

Further, the carriage motion error ΔX is defined by the following Equation (11), where the true position of the carriage 4161 is denoted as X.

$$\Delta X = Y - X \quad (11)$$

The position of the carriage 4161 can be controlled with high accuracy by controlling the position of the carriage 4161 such that the following Equation (12) is established, where a target position of the carriage 4161 is denoted as REF.

$$Y = \text{REF} + \Delta X \quad (12)$$

The carriage motion error ΔX is here expressed by a function of the true position X of the carriage 4161i with the identifier of the carriage 4161 being i and the identifier of the transport module 4209 being j. The carriage motion error ΔX thus can be expressed as the following Equation (13).

$$\Delta X = \Delta X ij(X) \quad (13)$$

Further, the carriage motion error ΔX can be expressed as the following Equation (14), where a carriage motion error specific to the carriage 4161i is denoted as ΔXi(X), a carriage motion error specific to the transport module 4209j is denoted as ΔXj(X), and a carriage motion error other than ΔXi(X) and ΔXj(X) is denoted as δij(X).

$$\Delta Xij(X) = \Delta Xi(X) + \Delta Xj(X) + \delta ij(X) \quad (14)$$

The carriage motion error ΔXj(X) can be expressed as the following Equation (15) dividing into the term δj(X) dependent on the true position X of the carriage 4161i and the other term ΔXj.

$$\Delta Xj(X) = \Delta Xj + \delta j(X) \quad (15)$$

Equation (15) can be regarded as the following Equation (16) when the second term on the right side thereof is sufficiently small.

$$\Delta Xj(X) = \Delta Xj \quad (16)$$

Figure 29A:
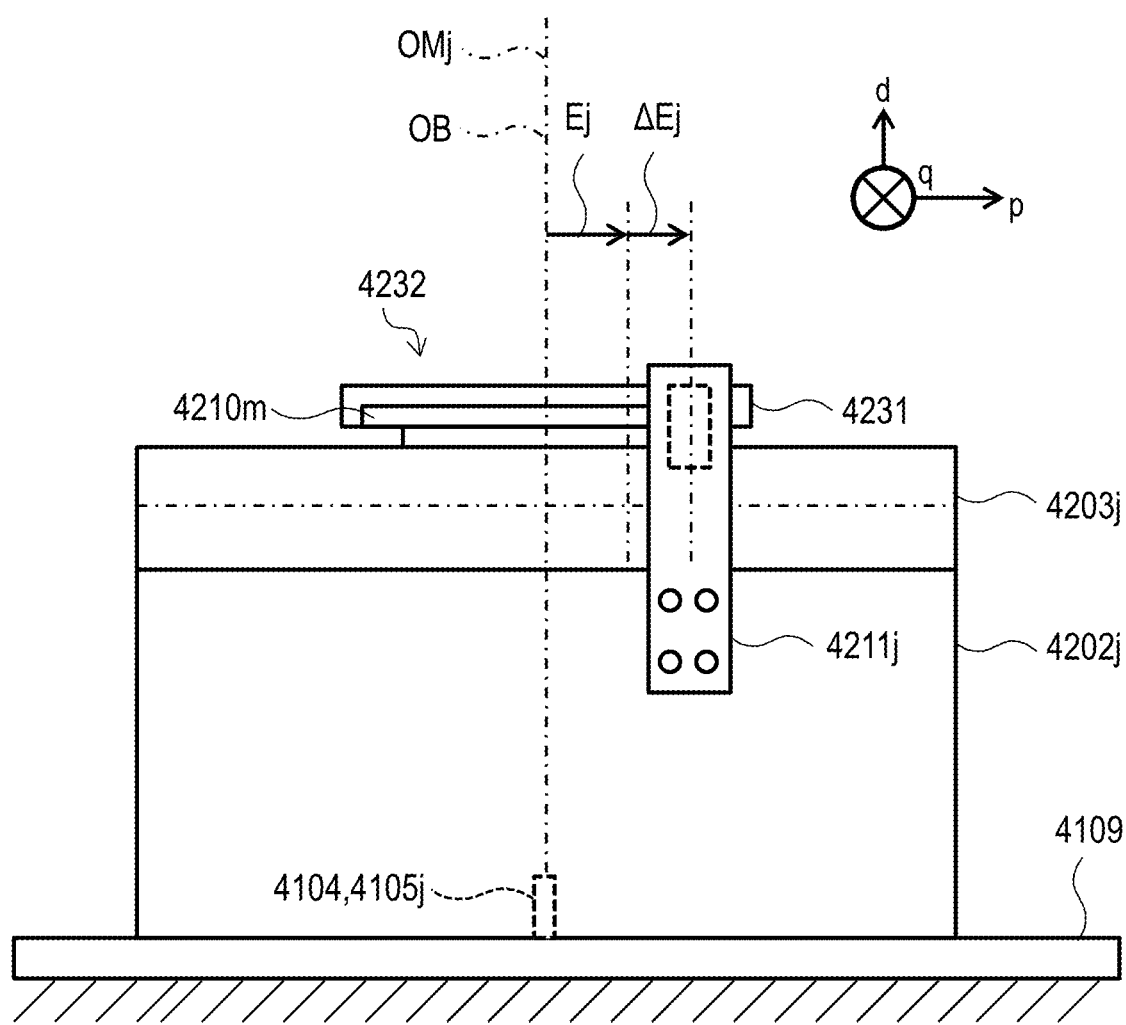
FIG. 29A is a schematic diagram illustrating a state of measuring a carriage movement error specific to the transport module using a measuring jig according to the fifth embodiment of the present invention.

When ΔXj(X) is expressed as Equation (16), it is sufficient to measure only one point of X to measure ΔXj(X). A method of measuring the carriage motion error ΔXj specific to the transport module 4209j in such a case will be described below with reference to FIG. 29A and FIG. 29B. FIG. 29A and FIG. 29B are schematic diagrams illustrating a state of measuring the carriage motion error ΔXj specific to the transport module 4209j according to the present embodiment using the measuring jig 4232.

As illustrated in FIG. 29A and FIG. 29B, the measuring jig 4232 is a jig used for measuring the carriage motion error ΔXj and has a base plate 4109, a positioning pin 4104, a scale bracket 4231, and a scale 4210m.

The positioning pin 4104 and the scale bracket 4231 are fixed on the base plate 4109. The scale 4210m is fixed on the scale bracket 4231.

The scale 4210m configures a linear scale with the same scale pitch as that of the scale 4210 of the carriage 4161. Therefore, the measuring jig 4232 having the scale 4210m can be handled as a virtual carriage. The scale 4210m is adjusted such that the reference position of the scale 4210m is located at the reference position OB of the base plate 4109. When measuring the reference position of the scale 4210m, an encoder 4211j of the transport module 4209j is set such that the value thereof becomes zero.

For measuring the carriage motion error ΔXj, the transport module 4209j to be measured is placed on the base plate 4109 and attached such that the fitting hole 4105j of the casing 4202j is fitted to the positioning pin 4104 of the measuring jig 4232. In a state where the transport module 4209j is attached on the base plate 4109, the reference position OMj of the transport module 4209j matches the reference position OB of the base plate 4109.

When the encoder 4211j of the transport module 4209j attached on the base plate 4109 reads the value of the scale 4210m, the virtual position Y of the carriage calculated based on the value read by the encoder 4211j is expressed by the following Equation (17). In Equation (17), however, it is assumed that the designed attachment position Ej of the encoder 4211j is set to zero. Further, $\Delta Ej$ is an attachment error of the encoder 4211j of the transport module 4209j.

$$Yj = -\Delta Fj \qquad (17)$$

When Equation (17) is applied to Equation (11), the carriage motion error $\Delta Xj$ is calculated as in the following Equation (11-1).

$$\Delta Xj = Yj - X = -\Delta Ej - 0 = -\Delta Ej \qquad (11\text{-}1)$$

The carriage motion error storage unit 4314j of each transport module 4209j stores the value of $-\Delta Ej$ calculated for each. Each transport module 4209j controls the position of the carriage 4161 to position the carriage 4161 by using the value of $-\Delta Ej$ stored in each carriage motion error storage unit 4314j.

Figure 30:
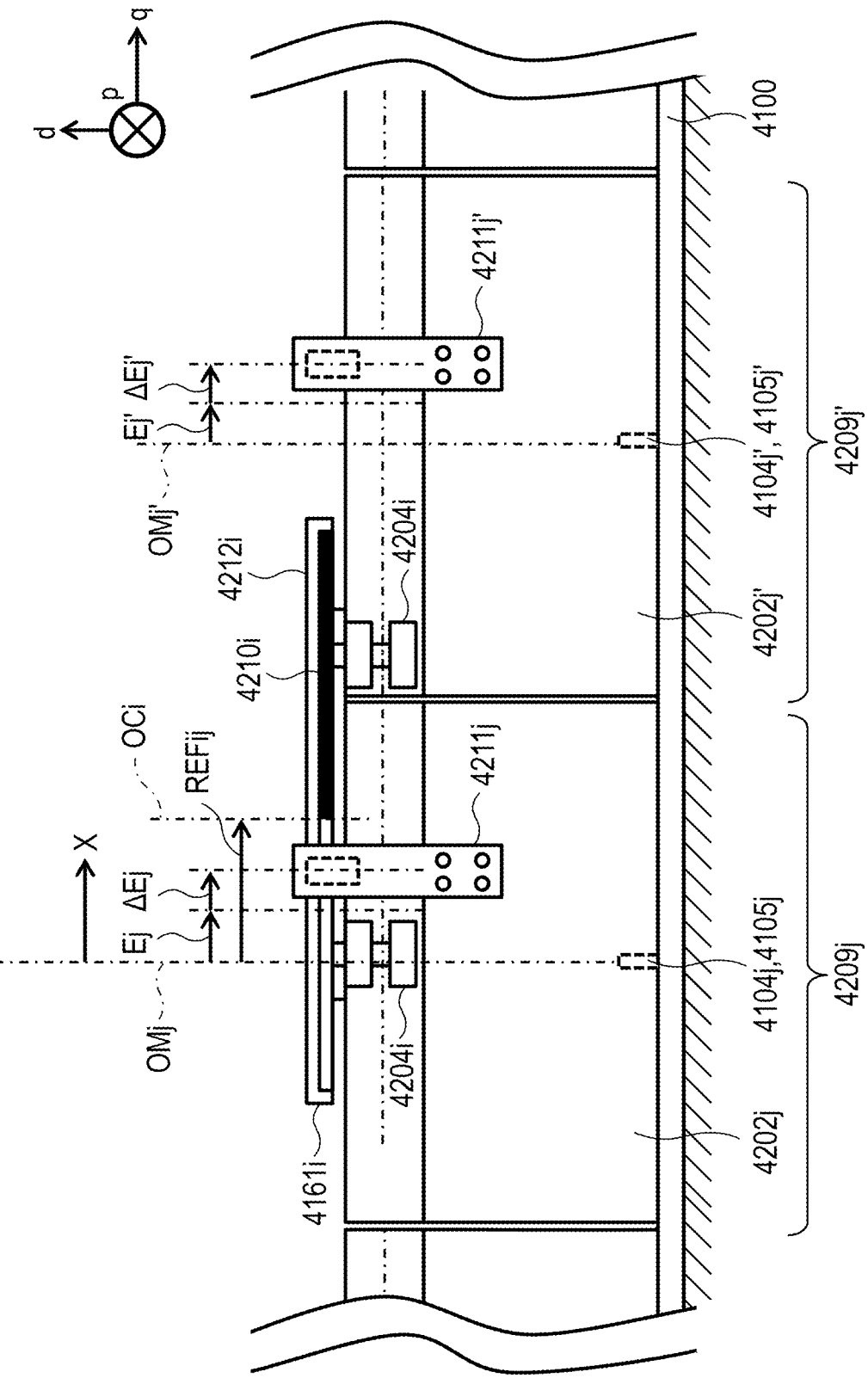
FIG. 30 is a schematic diagram illustrating a positioning method of the carriage in the transport module according to the fifth embodiment of the present invention.

FIG. 30 is a schematic diagram illustrating a positioning method of the carriage 4161i in the transport module 4209j installed in the transport path 4102. Note that FIG. 30 illustrates the case in which the transport module 4209j and the transport module 4209j' are installed adjacently. References related to the transport module 4209j' are denoted with "'" being appended to the same reference numerals as those related to the transport module 4209j.

First, the transport controller 4121 instructs the stop position REFij of the carriage 4161i to the transport module 4209j. In response, the motor controller 4306j extracts $\Delta Xj$ from the carriage motion error storage unit 4314j in the transport module 4209j that has received the instruction of the stop position REFij from the transport controller 4121.

Further, the motor controller 4306j controls the position of the carriage 4161i by using $\Delta Xj$ according to the following Equation (12-1) based on Equation (12). Yij here is a position of the carriage 4161i calculated based on information of the encoder 4211j of the transport module 4209j. Note that the motor controller 4306j can use any calculation as long as it controls the position of the carriage 4161i based on $\Delta Xj$ and may use not $\Delta Xj$ itself but the processed data obtained by performing a predetermined process on $\Delta Xj$ in position control of the carriage 4161i.

$$Yij = REFij + \Delta Xj \qquad (12\text{-}1)$$

With such control using $\Delta Xj$, the reference position OCi of the carriage 4161i in the control range of the transport module 4209j is controlled to match the stop position REFij that is a target position in the transport module 4209j. In such a way, the motor controller 4306j accurately controls the position of the carriage 4161i and stops the carriage 4161i at the stop position REFij.

The transport module 4209j may be replaced with another transport module 4209k due to a failure, version upgrade, or the like, for example. Also in this case, the carriage motion error storage unit 4314k of another transport module 4209k replaced has acquired and stored a carriage motion error of each transport module 4209, that is, a carriage motion error $\Delta Xk$ specific to the transport module 4209k in advance. More specifically, in the carriage motion error storage unit 4314k of the transport module 4209k, a carriage motion error $\Delta Xk$ specific to the encoder 4211k of the transport module 4209k is acquired and stored in advance.

Also in the replaced transport module 4209k, in the same manner as in the transport module 4209j described above, the motor controller 4306k controls the position of the carriage 4161i to position the carriage 4161i by using the value of $\Delta Xk$. Therefore, the carriage 4161i can be stopped at the target position with high reproducibility even on the transport module 4209k after the replacement, likewise in the case of being controlled on the transport module 4209j.

As described above, according to the present embodiment, even in the case where the transport module 4209 is replaced, readjustment of the target stop position is not necessary, and the transport module can be replaced without difficulty. Therefore, according to the present embodiment, the operation time, the number of jigs, or the like required for replacing the transport module 4209 can be significantly reduced.

Further, according to the present embodiment, since the carriage motion error specific to the transport module 4209 needs to be acquired only for the number of the transport modules 4209 as the carriage motion error of each transport module, the man-hours for startup of the transport system 4002 can be significantly reduced.

Sixth Embodiment

A sixth embodiment of the present invention will be described by using FIG. 31A and FIG. 31B. Note that similar components to those of the fifth embodiment described above are labeled with the same references and the description thereof will be omitted or simplified.

When $\delta j(X)$ that is the second term of the right side of the above Equation (15) is not sufficiently small, it is preferable to change X to acquire the carriage motion error $\Delta Xj$ (X) specific to the transport module 4209j. In the present embodiment, the case of acquiring the carriage motion error $\Delta Xj(X)$ by changing X will be described.

Figure 31A:
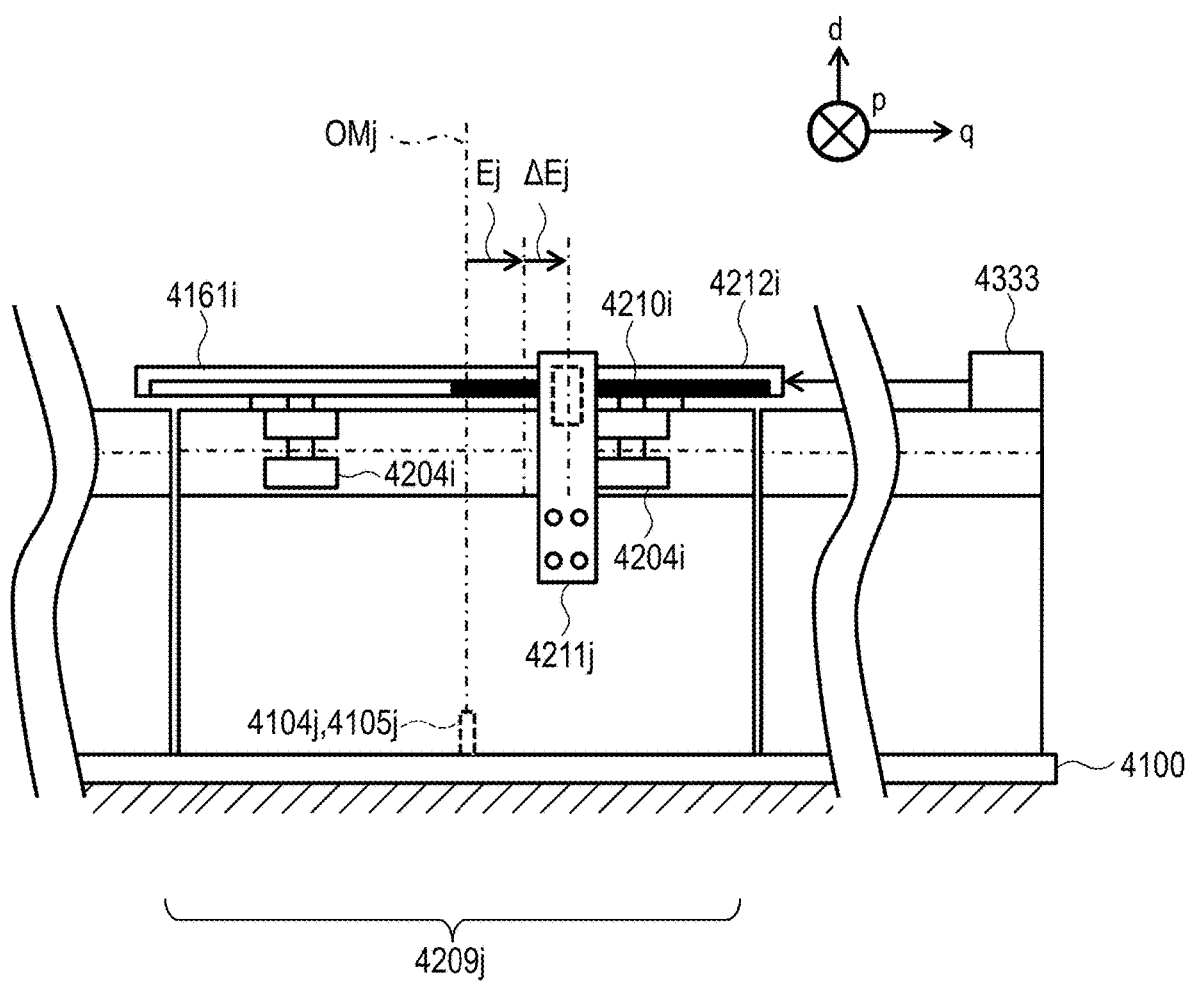
FIG. 31A is a schematic diagram illustrating a state of measuring a carriage movement error specific to a transport module using a laser interferometer according to a sixth embodiment of the present invention.

In the present embodiment, as illustrated in FIG. 31A, when the carriage motion error $\Delta Xj(X)$ is measured, a laser interferometer 4333 is installed to the carriage 4161i on the transport module 4209j whose carriage motion error $\Delta Xj(X)$ is to be measured. The laser interferometer 4333 can accurately measure the true position X of the carriage 4161i on the transport module 4209j. The present embodiment is different from the fifth embodiment in that the carriage motion error $\Delta Xj(X)$ can be measured on the entire movement stroke of the carriage 4161i.

For example, depending on the attachment error of the encoder 4211j of the transport module 4209j, the attachment angle of the encoder 4211j and the gap between the encoder 4211j and the scale 4210 of the carriage 4161 may change. In such a case, the carriage motion error $\Delta Xj(X)$ is an amount depending on the motion amount of the carriage 4161, that is, depending on the true position X of the carriage 4161.

Figure 31B:
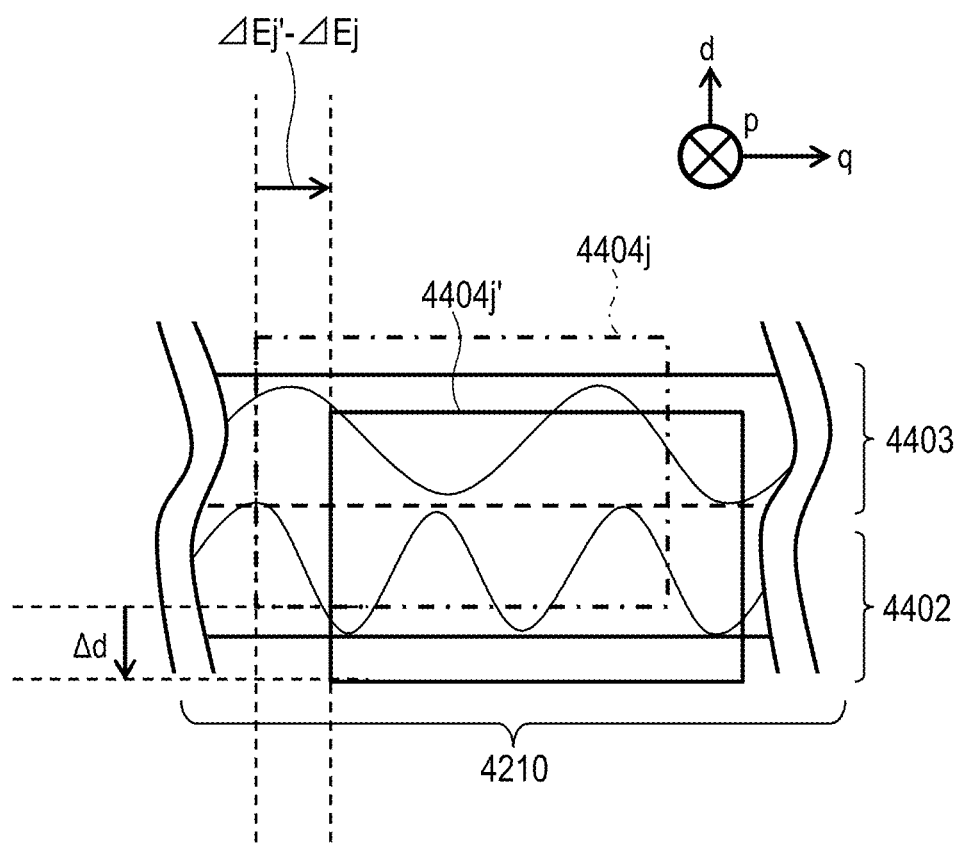
FIG. 31B is a schematic diagram illustrating the carriage motion error specific to the transport module according to the sixth embodiment of the present invention.

In particular, as illustrated in FIG. 31B, the scale 4210 of the carriage 4161 may be divided into two tracks 4402 and 4403 in parallel to the q direction. The patterns with signal intensities having cycles different from each other are formed in each of the two tracks 4402 and 4403. The encoder 4211 reads the phase information of the pattern of each of the two tracks 4402 and 4403 in the detection region 4404 and calculates the measured value. In such a case, the carriage motion error $\Delta Xj(X)$ may have a specific pattern due to the error $\Delta d$ of the attachment position of the encoder 4211j in the d-axis direction. FIG. 31B illustrates a case where the detection region 4404$j$ of the encoder 4211$j$ is a detection region 4404$j'$ shifted by Ad in the d-axis direction and shifted by ΔEj'−ΔEj in the q-axis direction.

In this case, the carriage motion error ΔXj(X) that may vary depending on X can be acquired in advance by performing the measurement of the carriage motion error in the same manner as the fifth embodiment while changing X. The carriage motion error storage unit 4314$j$ of the transport module 4209$j$ stores the carriage motion error ΔXj(X) acquired in advance.

The motor controller 4306$j$ of the transport module 4209$j$ controls the position of the carriage 4161$i$ by using ΔXj(X) according to the following Equation (12-2) based on Equation (12). Note that the motor controller 4306$j$ can use any calculation as long as it controls the position of the carriage 4161$i$ based on ΔXj(X) and may use not ΔXj(X) itself but the processed data obtained by performing a predetermined process on ΔXj(X) in position control of the carriage 4161$i$.

$$Yij=REFij+\Delta Xj(REFij) \qquad (12\text{-}2)$$

With such control using ΔXj(X), also in the present embodiment, the reference position of the carriage 4161$i$ in the control range of the transport module 4209$j$ is controlled to match the stop position REFij that is the target position in the transport module 4209$j$. In such a way, the motor controller 4306$j$ accurately controls the position of the carriage 4161$i$ and stops the carriage 4161$i$ at the stop position REFij.

Further, in the present embodiment, the transport module 4209$j$ may be replaced with another transport module 4209$k$. Even in such a case, the carriage motion error storage unit 4314$k$ of replaced another transport module 4209$k$ has acquired and stored the carriage motion error ΔXk(X) specific to the encoder 4211$j$ of the transport module 4209$k$ in advance.

Also in the replaced transport module 4209$k$, in the same manner as in the transport module 4209$j$ described above, the motor controller 4306$k$ controls the position of the carriage 4161$i$ to position the carriage 4161$i$ by using the value of ΔXk(X). Therefore, the carriage 4161$i$ can be stopped at the target position with high reproducibility even on the replaced transport module 4209$k$ in the same manner as in the case where it is controlled on the transport module 4209$j$.

Note that, in the present embodiment, while a case where the laser interferometer 4333 is used to measure the position X of the carriage 4161 has been described, the embodiment is not limited thereto. A measuring system other than the laser interferometer 4333, for example, a long stroke laser displacement meter or a linear scale system may be used.

Seventh Embodiment

A seventh embodiment of the present invention will be described by using FIG. 32. Note that similar components to those of the fifth embodiment and the sixth embodiment described above are labeled with the same references and the description thereof will be omitted or simplified.

In the present embodiment, a case where the attachment error ΔE of the encoder 4211 of the transport module 4209 is measured by using the adjacent transport module 4209 and the carriage 4161 will be described. Further, in the present embodiment, a case where a carriage motion error of the replaced transport module 4209 is calculated by using a difference between the attachment errors ΔE before and after the transport module 4209 is replaced will be described.

Figure 32:
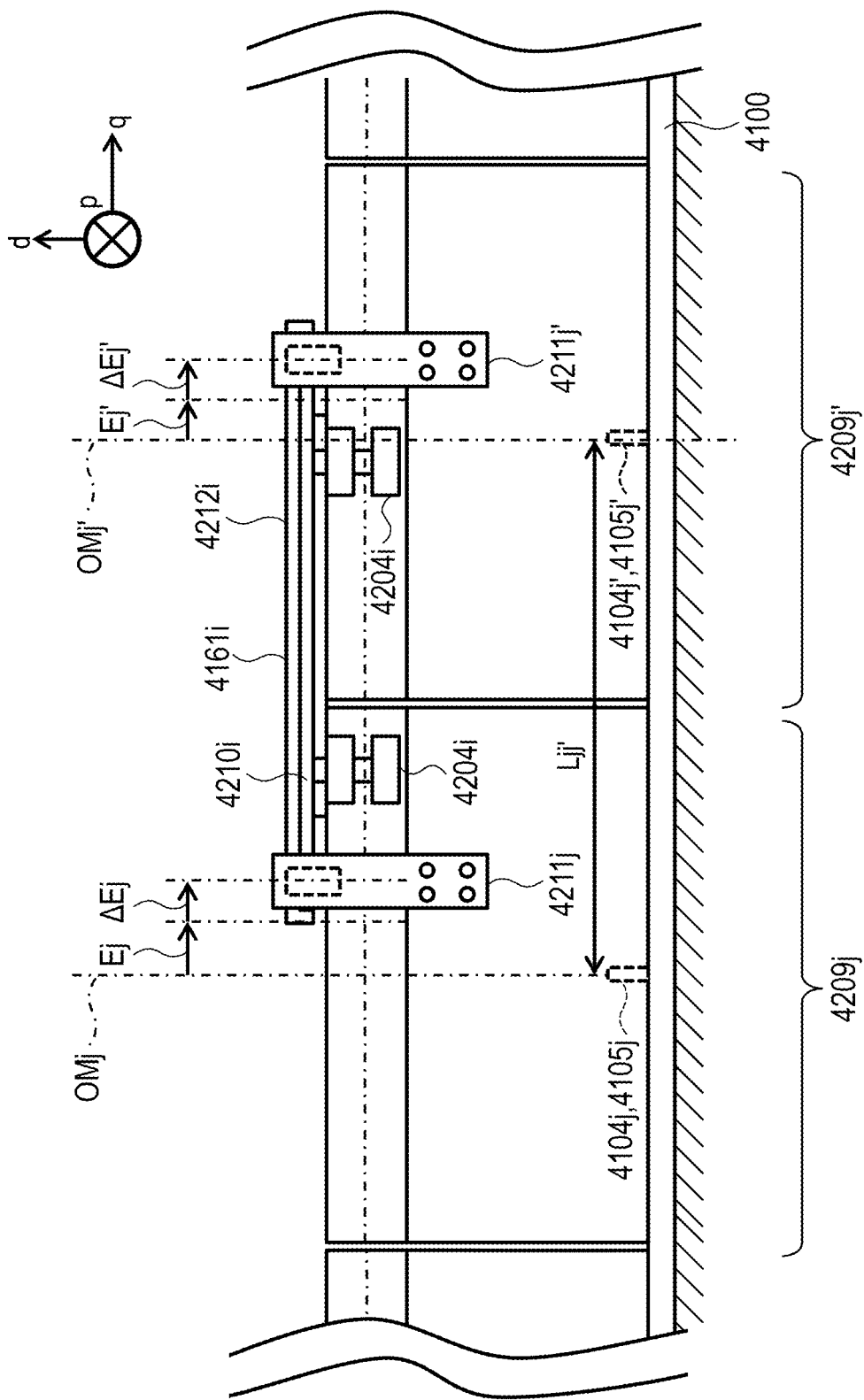
FIG. 32 is a schematic diagram illustrating a state of measuring an attachment error of an encoder in a transport module according to a seventh embodiment of the present embodiment.

FIG. 32 is a schematic diagram illustrating that an attachment error ΔEj' of the encoder 4211$j'$ in the transport module 4209$j'$ to be replaced is measured by the adjacent transport module 4209$j$ and the carriage 4161$i$.

The gap between the encoders 4211$j$ and 4211$j'$ adjacent to the transport modules 4209$j$ and 4209$j'$ forming the transport path 4102 is smaller than the scale length of the scale 4210$i$ of the carriage 4161$i$. Alternatively, a carriage 4161 having a scale length of the scale 4210 larger than the gap of all the encoders 4211 for measurement may be prepared.

First, the attachment error ΔEj' of the encoder 4211$j'$ in the transport module 4209' to be replaced is measured in advance. For this purpose, the carriage 4161$i$ is moved to a position that can be detected by both of the encoders 4211$j$ and 4211$j'$. Then, the values of the two encoders 4211$j$ and 4211$j'$ are required at the same time. When the transport module 4209$j$ is considered as a reference, ΔEj can be set to zero.

Further, a position of the carriage 4161$i$ calculated based on information on the encoder 4211$j$ of the transport module 4209$j$ is denoted as Yij, and a position of the carriage 4161$i$ calculated based on information on the encoder 4211$j'$ of the transport module 4209$j'$ is denoted as Yij'. Further, the attachment error of the encoder 4211$j'$ in the transport module 4209$j'$ is denoted as ΔEj'. Further, a gap between the reference position OMj of the transport module 4209$j$ and the reference position OMj' of the transport module 4209$j'$ is denoted as Ljj'.

Then, the following Equation (18) is established. Note that, it is assumed that the designed attachment positions Ej and Ej' of the encoders 4211$j$ and 4211$j'$ are set to zero in Equation (18).

$$Yij'-Yij=Ljj'-\Delta Ej' \qquad (18)$$

According to Equation (18), the attachment error ΔEj' of the encoder 4211$j'$, that is, ΔXj' described in the fifth embodiment can be measured. In the same manner as the fifth embodiment, ΔXj' can be handled as a carriage motion error specific to the transport module 4209$j'$.

Then, the transport module 4209$j'$ is replaced with another transport module 4209$j''$ (not illustrated). An attachment error ΔEj'' of the encoder 4211$j''$ in the replaced transport module 4209'' is also measured in the same manner as ΔEj' described above.

Then, a difference between ΔEj' and ΔEj'' measured as described above is calculated. The carriage motion error ΔXj'' specific to the replaced transport module 4209$j''$ can be calculated from the following Equation (19) by using the carriage motion error ΔXj' specific to the transport module 4209$j'$ to be replaced and the difference between ΔEj' and ΔEj''. Note that the carriage motion error ΔXj' is stored in the transport module 4209$j'$ before replacement.

$$\Delta Xj''=\Delta Xj'+(\Delta Ej'-\Delta Ej'') \qquad (19)$$

The carriage motion error ΔXj'' calculated as described above is stored in the carriage motion error storage unit 4314'' of the transport module 4209$j''$. In the replaced transport module 4209$j''$, in the same manner as the fifth embodiment, the carriage 4161 can be stopped at the stop position by controlling the position of the carriage 4161$i$ using the carriage motion error ΔXj''. In such a way, the carriage 4161$i$ can be stopped at the same position as the transport module 4209$i$ to be replaced.

Note that a scale having a base material made of a metal, a glass, or the like having a small coefficient of linear expansion can be used as the scale 4210 of the carriage 4161.

By using the scale 4210 made of such a base material, it is possible to suppress an error caused by the expansion of the scale 4210 of the carriage 4161 due to the temperature and thereby control the position of the carriage 4161 with high accuracy and high reproducibility.

Further, while the case where measurement is performed using the carriage 4161i has been described in the above description, the present invention is not limited thereto. A jig having a scale similar to the scale 4210 may be used for measurement instead of the carriage 4161i.

Further, when the carriage motion error depends on X as described in the sixth embodiment, the carriage motion error $\Delta Xj''$ (X) can be measured with reference to the encoder 4211j in the same manner as in the sixth embodiment.

Eighth Embodiment

An eighth embodiment of the present invention will be described. Note that similar components to those of the fifth to seventh embodiments described above are labeled with the same references and the description thereof will be omitted or simplified.

In the seventh embodiment illustrated in FIG. 32, the attachment error $\Delta Ej'$ of the encoder 4211j' in the transport module 4209j' is measured by using the adjacent transport module 4209j. For the transport path 4102 on which a plurality of transport modules 4209j are installed, an operation in the same manner as the operation of measuring the attachment error $\Delta Ej'$ in the seventh embodiment can be performed repeatedly over multiple times on a series of a plurality of installed transport modules 4209j. In such a way, the carriage motion error $\Delta Xj$ by the encoder 4211j of any of the transport modules 4209j on the transport path 4102 can be measured in the same manner as the seventh embodiment.

In this case, the gap of the adjacent encoders 4211 of the transport modules 4209 forming the transport path 4102 is smaller than the scale length of the scale 4210 of the carriage 4161 in the same manner as the seventh embodiment. Alternatively, a carriage 4161 having a scale length of the scale 4210 longer than the gap of all the encoders 4211 for measurement may be prepared for travelling.

For example, the position of the transport module 4209j to the frame 4100 may change due to vibration of the frame 4100 or deformation due to heat, deformation of the positioning pins 4104, or the like due to long-time operation. Even in such a case, according to the present embodiment, $\Delta Xj$ can be measured with the carriage 4161 travelling, and thereby, $\Delta Xj$ corresponding to the change of the position of the transport module 4209j can be acquired.

The measured $\Delta Xj$ is stored in the carriage motion error storage unit 4314j of the transport module 4209j in the same manner as other embodiments. The motor controller 4306j of the transport module 4209j controls the position of the carriage 4161i by using the value of $\Delta Xj$ to position the carriage 4161i. Thereby, the carriage 4161i can be stopped accurately at the target position.

Ninth Embodiment

A ninth embodiment of the present invention will be described by using FIG. 33. Note that similar components to those of the fifth to eighth embodiments described above are labeled with the same references and the description thereof will be omitted or simplified.

The carriage motion error $\Delta Xi(X)$ specific to the carriage 4161i may include the attachment error $\Delta Si$ of the scale 4210i of the carriage 4161i. In the present embodiment, a case where the attachment error $\Delta Si$ of the scale 4210i of the carriage 4161i is considered as a carriage motion error specific to the carriage 4161i will be described. The attachment error $\Delta Si$ can be taken into consideration in any of the first to fourth embodiments.

Figure 33:
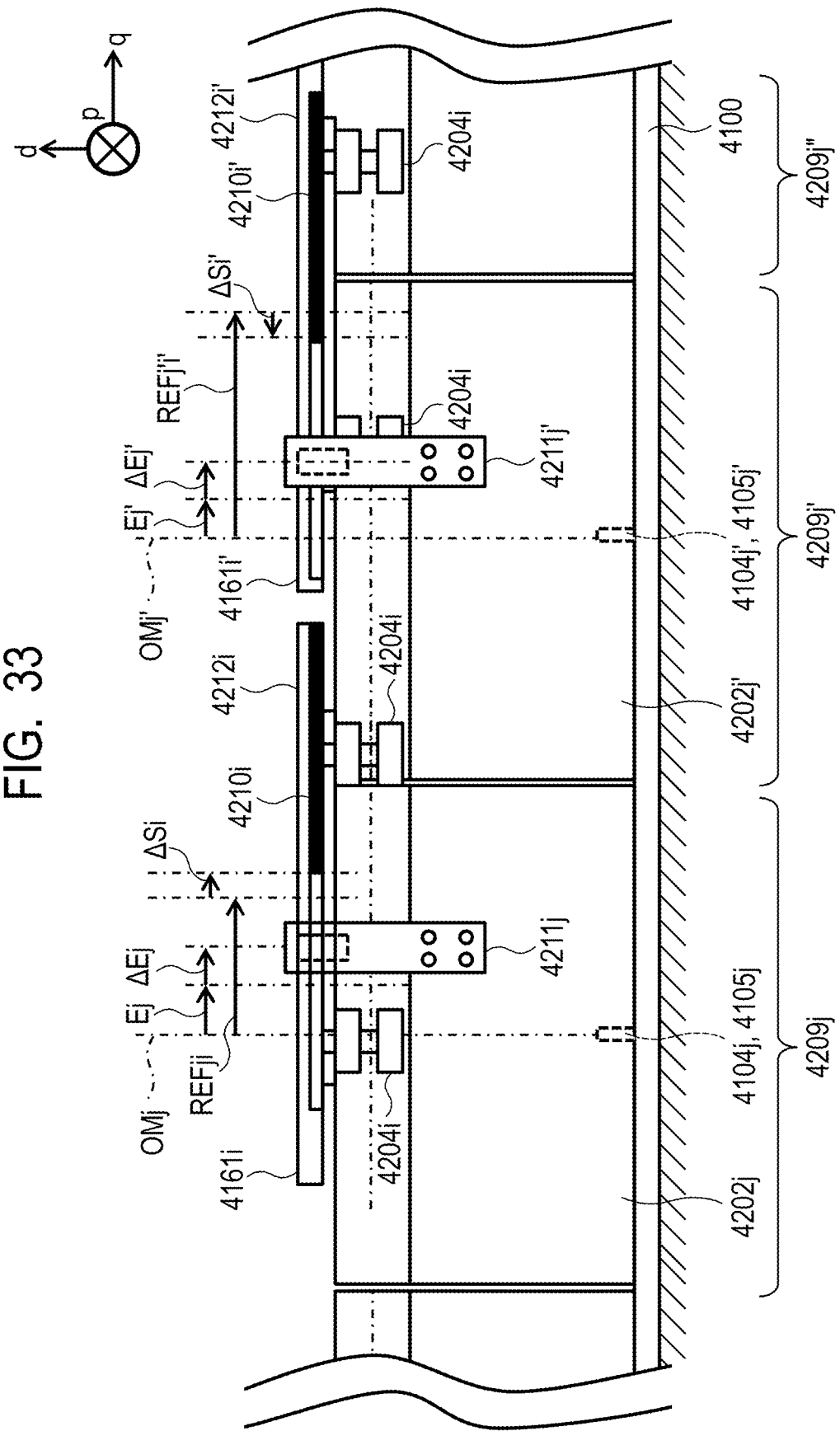
FIG. 33 is a schematic diagram illustrating an attachment error of a scale of a carriage.

FIG. 33 is a schematic diagram illustrating an attachment error $\Delta Si$ of the scale 4210i of the carriage 4161i. As illustrated in FIG. 33, a plurality of carriages 4161i and 4161i' are stopped on a plurality of transport modules 4209j, 4209j', and 4209j''.

The attachment position of the scale 4210i of the carriage 4161i may have an error $\Delta Si$ with respect to the reference position of the carriage 4161i, for example. In that case, the stop position of the carriage 4161i changes by the amount of the attachment error $\Delta Si$ that is an error specific to such a carriage 4161i.

Here, when the attachment error $\Delta Si$ of the scale 4210i for each carriage 4161i is not sufficiently small relative to the required positioning accuracy $\delta p$, it is preferable to measure $\Delta Si$ in advance and control the position of the carriage 4161 also using the value of $\Delta Si$. When the value of $\Delta Si$ is also used for position control of the carriage 4161, the motor controller 4306j of the transport module 4209j uses $\Delta Xj$ and $\Delta Si$ to control the position of the carriage 4161i according to the following Equation (12-3) based on Equation (12). Note that the motor controller 4306j can control the position of the carriage 4161i based on $\Delta Xj$ and $\Delta Si$. For position control of the carriage 4161i, the motor controller 4306j can use not $\Delta Xj$ and $\Delta Si$ themselves but the processed data obtained by performing a predetermined process on $\Delta Xj$ and $\Delta Si$, respectively. Further, also in the present embodiment, in the same manner as in the sixth embodiment, $\Delta Xj(X)$ that may vary depending on X or the processing data obtained by performing a process on $\Delta Xj(X)$ can be used instead of $\Delta Xj$.

$$Yij = REFij + \Delta Xj + \Delta Si \qquad (12\text{-}3)$$

Such control with addition of $\Delta Xj$ and $\Delta Si$ enables the motor controller 4306j to accurately control the position of the carriage 4161i on any of the transport modules 4209j and stop the carriage 4161i at the stop position REFij.

Note that the attachment error $\Delta Si$ that is a specific error to the carriage 4161i can be measured for each carriage 4161i in advance by using a measurement jig. For example, it is possible to acquire $\Delta Si$ by measuring the difference between the reference position of the carriage 4161i and the reference position of the scale 4210i using a microscope or the like.

Further, as long as the attachment error $\Delta Si$ measured in advance can be used for the position control of the carriage 4161i by the motor controller 4306j of the transport module 4209j as described above, the storage unit which stores it is not particularly limited.

For example, the transport controller 4121 may have a storage unit to store the attachment error $\Delta Si$. In this case, when an instruction for controlling the carriage 4161i is transmitted to the motor controller 4306j, the transport controller 4121 also transmits the attachment error $\Delta Si$ specific to the carriage 4161i together to the motor controller 4306j. The motor controller 4306j can control the position of the carriage 4161i using also the attachment error $\Delta Si$ transmitted from the transport controller 4121. Further, the carriage motion error storage unit 4314j in the transport module 4209j may store the attachment error $\Delta Si$ for each carriage 4161i.

Modified Embodiments

The present invention is not limited to the embodiments described above, and various modifications are possible.

For example, while the case where the carriage motion error storage unit 4314 that stores the carriage move error ΔXj or ΔXj(X) is provided in each transport module 4209j has been described as an example in the above embodiments, the invention is not limited thereto. For example, the transport controller 4121 may have a storage unit which stores all or a part of the carriage move error ΔXj or ΔXj(X).

In such a case, the transport module 4209j has identification information (ID) that can identify the transport module 4209j. The transport controller 4121 can store the ID and the carriage motion error associated with the ID in the storage unit. The transport controller 4121 transmits the carriage motion error associated with the ID to the transport module 4209j. The transport module 4209j can control the position of the carriage 4161 by using the carriage motion error transmitted from the transport controller 4121 in the same manner as the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-230990, filed Nov. 30, 2017, No. 2017-183891, filed Sep. 25, 2017, and No. 2017-183583, filed Sep. 25, 2017, which are hereby incorporated by reference herein in their entirety.

What is claimed is:

1. A transport system comprising:
   at least one transport module forming a transport path on which a carriage that transports a workpiece travels;
   a control unit that controls a position of the carriage on the at least one transport module based on a drive instruction; and
   a state detection unit that detects a position of the carriage and a position of the workpiece on the carriage,
   wherein the control unit controls a stop position of the carriage based on the position of the carriage and the position of the workpiece on the carriage detected by the state detection unit.

2. The transport system according to claim 1, wherein the control unit controls the stop position of the carriage based on a difference between the position of the carriage and the position of the workpiece on the carriage detected by the state detection unit.

3. The transport system according to claim 1,
   wherein the control unit pre-stores transport information, and
   wherein the control unit controls the stop position of the carriage based on the transport information and the position of the carriage and the position of the workpiece on the carriage detected by the state detection unit.

4. The transport system according to claim 3, wherein the transport information is at least one of a normal mode, a velocity hold mode, an acceleration hold mode, and a low load mode.

5. The transport system according to claim 1,
   wherein the at least one transport module is a plurality of transport modules,
   wherein the control unit pre-stores a carriage motion error for each of the plurality of transport modules, and
   wherein the control unit controls the stop position of the carriage based on the carriage motion error and the position of the carriage and the position of the workpiece on the carriage detected by the state detection unit.

6. The transport system according to claim 1, wherein the control unit determines the stop position after control while the carriage is traveling based on the drive instruction.

7. A processing system comprising:
   the transport system according to claim 1; and
   a process apparatus that performs predetermined processing on the workpiece transported by the transport system according to claim 1.

8. A transport system comprising:
   at least one transport module forming a transport path on which a plurality of carriages travel, each of the plurality of carriages transporting at least one workpiece;
   a control unit that controls a position of the carriage on the transport module; and
   a first storage unit that, for the plurality of carriages, stores a plurality of motion errors based on respective particular positions of the workpieces as a reference,
   wherein the control unit selects a motion error of one of the plurality of carriages as a target carriage, a position of which is to be controlled, from the plurality of motion errors stored in the first storage unit, and corrects a stop position of the target carriage based on the selected motion error.

9. The transport system according to claim 8,
   wherein the transport module has a group of coils,
   wherein each of the plurality of carriages has a magnet that receives electromagnetic force from the group of coils, and
   wherein the control unit controls a current applied to the group of coils to control a position of a carriage on the transport module.

10. The transport system according to claim 8,
    wherein the plurality of motion errors are determined for the plurality of carriages in accordance with respective stop reference positions of the carriages and types of the workpieces transported by the carriages, and
    wherein the control unit controls the stop position of the target carriage based on the selected motion error in accordance with the stop reference position of the target carriage and the type of the workpiece transported by the target carriage.

11. The transport system according to claim 8,
    wherein each of the plurality of carriages has at least one holding unit that holds the at least one workpiece,
    wherein the plurality of motion errors are determined for the plurality of carriages in accordance with stop reference positions of the plurality of carriages and types of the holding units, and
    wherein the control unit controls the stop position of the target carriage based on the selected motion error in accordance with the stop reference position of the target carriage and the type of the at least one holding unit the target carriage has.

12. The transport system according to claim 8 further comprising a higher-level control unit capable of communicating with the control unit,
    wherein the higher-level control unit has the first storage unit that stores the plurality of motion errors.

13. The transport system according to claim 12,
    wherein the higher-level control unit generates an instruction based on the plurality of motion errors and transmits the instruction to the control unit, and wherein the control unit controls a position of each of the plurality of carriages in accordance with the instruction transmitted from the higher-level control unit.

14. The transport system according to claim 8 further comprising a second storage unit that stores transport order of the plurality of carriages.

15. The transport system according to claim 14, wherein each of the plurality of carriages further has a third storage unit that stores identification information used for identifying a carriage in interest, the transport system further comprising:
 a reading unit that reads the identification information from the storage unit of the carriage; and
 an identifying unit that identifies the carriage from the identification information read by the reading unit.

16. The transport system according to claim 8 further comprising a plurality of the transport modules,
 wherein the control unit pre-stores a carriage motion error for each of the plurality of transport modules, and the stop position of each of the plurality of carriages has been controlled based on the carriage motion error.

17. A processing system comprising:
 the transport system according to claim 8; and
 a process apparatus that performs predetermined processing on the workpiece transported by the transport system according to claim 8.

18. A method of performing processing on a workpiece to manufacture an article using the processing system according to claim 7, comprising:
 performing the predetermined processing on the workpiece by the processing apparatus after stopping the carriage at the stop position after control.

19. A method of performing processing on a workpiece to manufacture an article using the processing system according to claim 17, comprising:
 performing the predetermined processing on the workpiece by the processing apparatus after stopping the carriage at the stop position after control.

* * * * *